United States Patent
Qian et al.

(10) Patent No.: US 12,074,632 B2
(45) Date of Patent: Aug. 27, 2024

(54) METHOD AND APPARATUS FOR PROCESSING SIGNALS IN A COMMUNICATION SYSTEM

(71) Applicant: Samsung Electronics Co., Ltd., Gyeonggi-do (KR)

(72) Inventors: Chen Qian, Beijing (CN); Di Su, Beijing (CN); Peng Lin, Beijing (CN); Chuang Zhang, Beijing (CN)

(73) Assignee: Samsung Electronics Co., Ltd (KR)

( * ) Notice: Subject to any disclaimer, the term of this patent is extended or adjusted under 35 U.S.C. 154(b) by 141 days.

(21) Appl. No.: 17/908,677

(22) PCT Filed: Feb. 25, 2021

(86) PCT No.: PCT/KR2021/002422
§ 371 (c)(1),
(2) Date: Sep. 1, 2022

(87) PCT Pub. No.: WO2021/177664
PCT Pub. Date: Sep. 10, 2021

(65) Prior Publication Data
US 2023/0124786 A1    Apr. 20, 2023

(30) Foreign Application Priority Data

Mar. 3, 2020 (CN) .......................... 202010140170.5
Apr. 30, 2020 (CN) .......................... 202010365429.6

(51) Int. Cl.
*H04B 1/525* (2015.01)
*H04L 25/02* (2006.01)
(Continued)

(52) U.S. Cl.
CPC ......... *H04B 1/525* (2013.01); *H04L 25/0204* (2013.01); *H04L 25/0224* (2013.01); *H04L 25/03006* (2013.01); *H04L 27/2613* (2013.01)

(58) Field of Classification Search
CPC . H04B 1/525; H04L 25/0204; H04L 25/0224; H04L 25/03006; H04L 27/2613
See application file for complete search history.

(56) References Cited

U.S. PATENT DOCUMENTS

2013/0286903 A1* 10/2013 Khojastepour ........ H04B 1/123
370/280
2013/0301487 A1* 11/2013 Khandani ............ H04B 7/0413
370/278
(Continued)

FOREIGN PATENT DOCUMENTS

CN           113079122 A  *  7/2021  ......... H04L 25/0226
WO     WO 2010/132455         11/2010
(Continued)

OTHER PUBLICATIONS

PCT/ISA/210 Search Report issued on PCT/KR2021/002422, Jun. 7, 2021, pp. 4.
(Continued)

*Primary Examiner* — Freshteh N Aghdam
(74) *Attorney, Agent, or Firm* — The Farrell Law Firm, P.C.

(57) ABSTRACT

The present disclosure provides a method and an apparatus for self-interference cancellation, a terminal and a base station are disclosed. The method includes truncating a signal based on a detection window, where the signal comprises a receive signal and a self-interference signal which is associated with a transmit signal, and a length of the detection window is less than a symbol length, performing self-interference channel estimation to obtain an estimation of a self-interference channel, based on the truncated signal and a first reference signal which is carried by the transmit signal and used for self-interference channel estimation, where the first reference signal has a comb structure in frequency domain, and performing self-interference cancel-
(Continued)

lation based on the transmit signal and the estimation of the self-interference channel. The method can reduce the influence on the accuracy of self-interference channel estimation due to inter-symbol interference caused by timing misalignment. And, the present disclosure provides a method and device for transmitting a first physical signal in a wireless communication system, the method including: mapping a sequence of each antenna port for the first physical signal to a same plurality of subcarriers on same one or more OFDM symbols based on a frequency-domain mapping pattern of the first physical signal; and transmitting the first physical signal.

20 Claims, 28 Drawing Sheets

(51) Int. Cl.
*H04L 25/03* (2006.01)
*H04L 27/26* (2006.01)

(56) References Cited

U.S. PATENT DOCUMENTS

| | | |
|---|---|---|
| 2015/0349999 A1 | 12/2015 | Kobatke et al. |
| 2016/0295596 A1* | 10/2016 | Masmoudi ............ H04B 1/525 |
| 2017/0041060 A1 | 2/2017 | Kim et al. |
| 2017/0317704 A1 | 11/2017 | Noh et al. |
| 2018/0167239 A1 | 6/2018 | Kim et al. |

FOREIGN PATENT DOCUMENTS

| | | | |
|---|---|---|---|
| WO | WO 2013/173250 | 11/2013 | |
| WO | WO-2015160333 A1 * | 10/2015 | ............ H04B 1/525 |
| WO | WO 2018/183384 | 10/2018 | |

OTHER PUBLICATIONS

PCT/ISA/237 Written Opinion issued on PCT/KR2021/002422, Jun. 7, 2021, pp. 3.
European Search Report dated Jul. 4, 2023 issued in counterpart application No. 21764337.8-1203, 9 pages.

* cited by examiner

[Fig. 1]
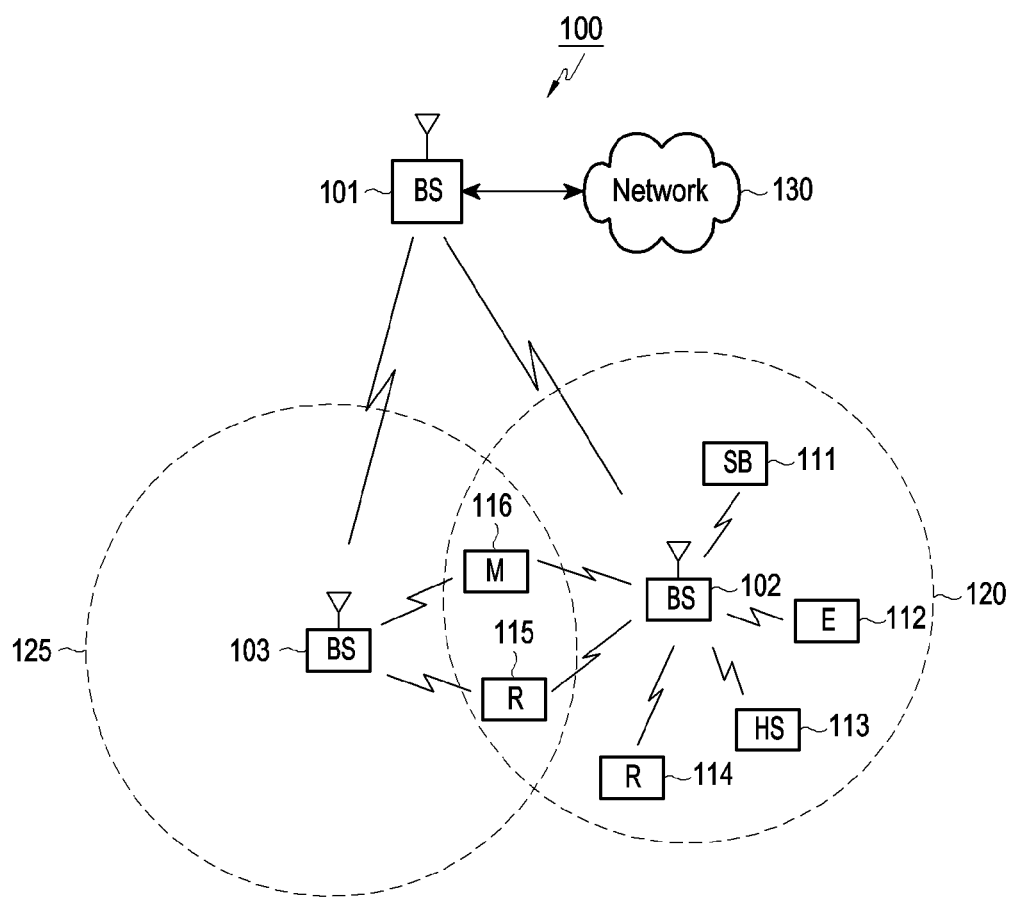

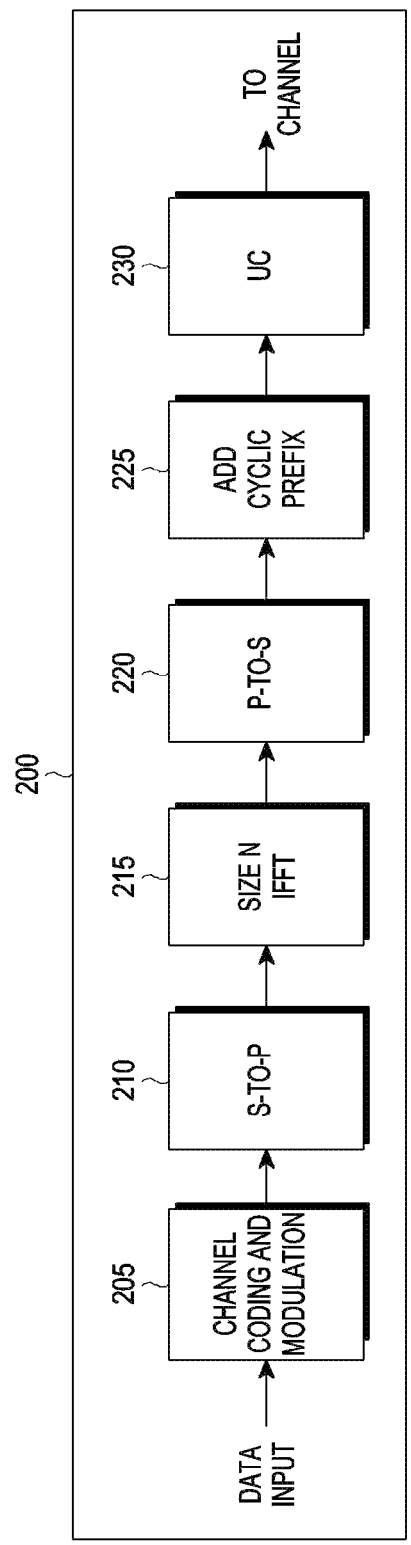
[Fig. 2A]

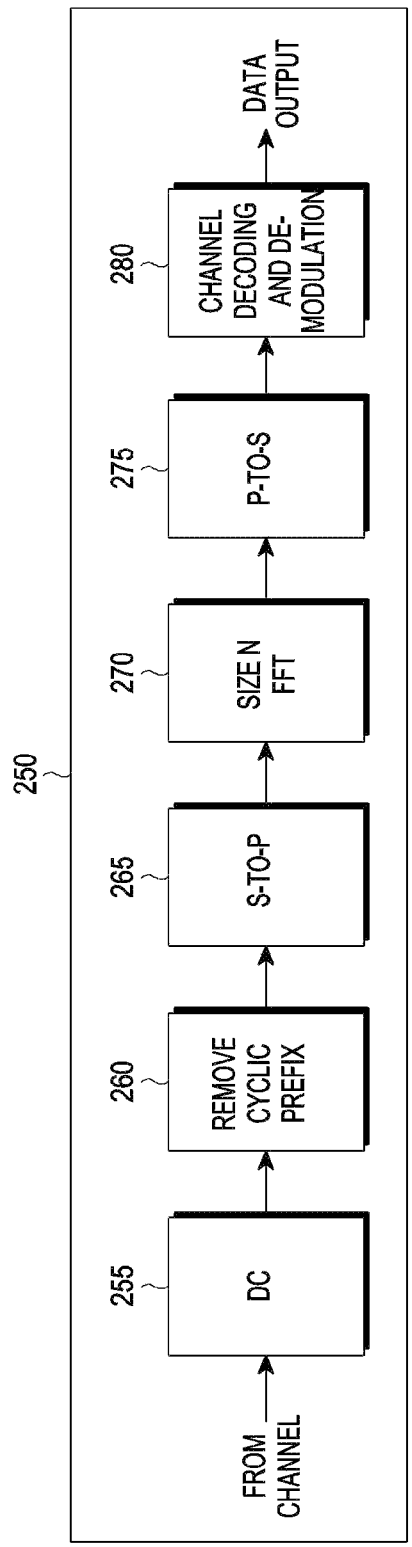
[Fig. 2B]

[Fig. 3A]
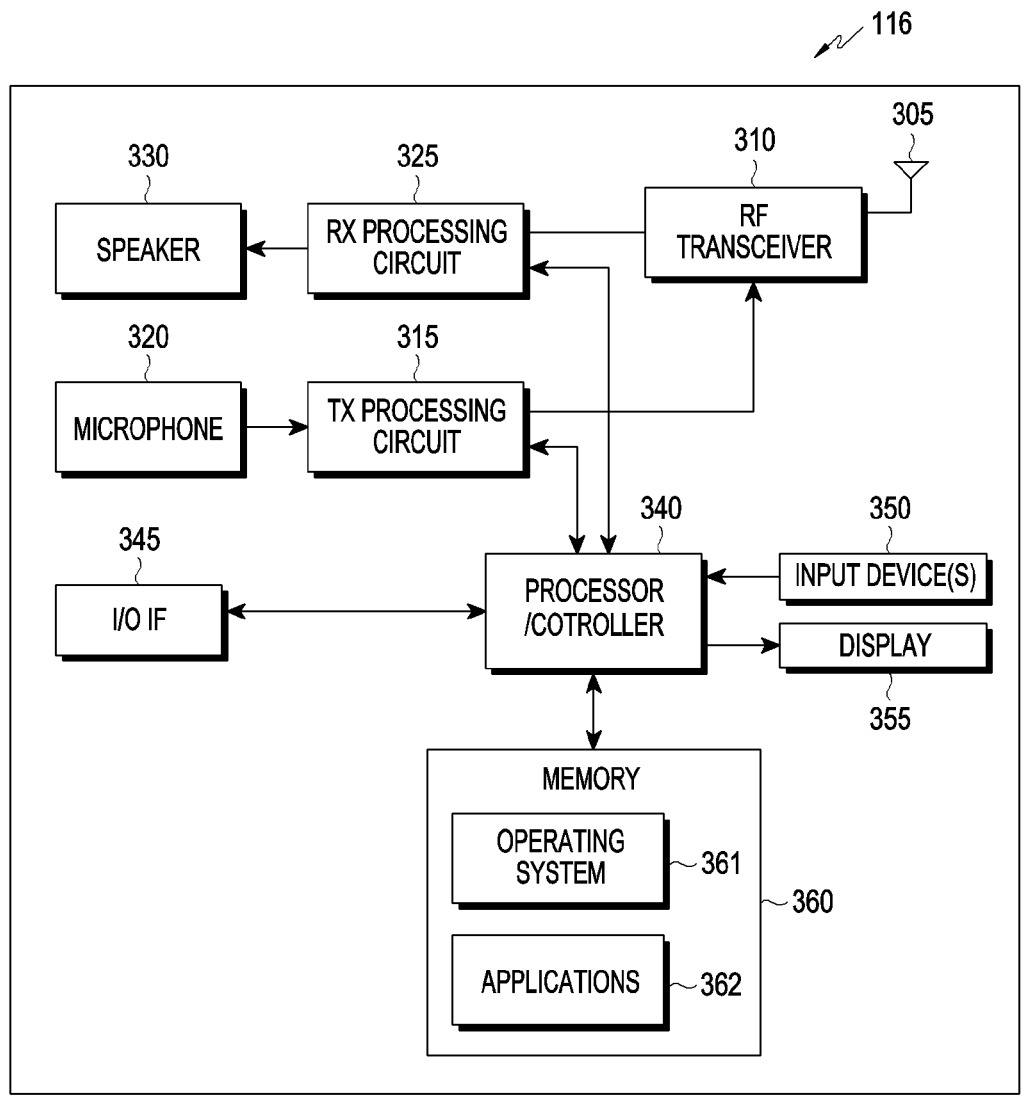

[Fig. 3B]
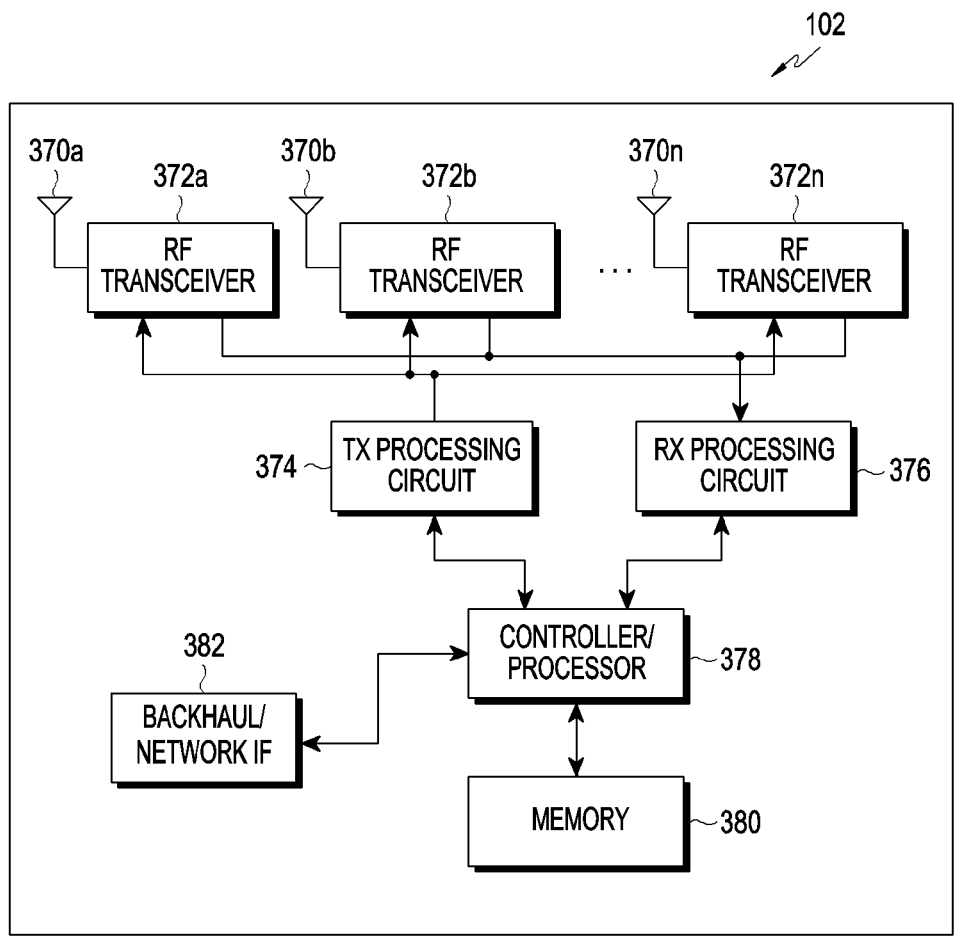
[Fig. 4A]
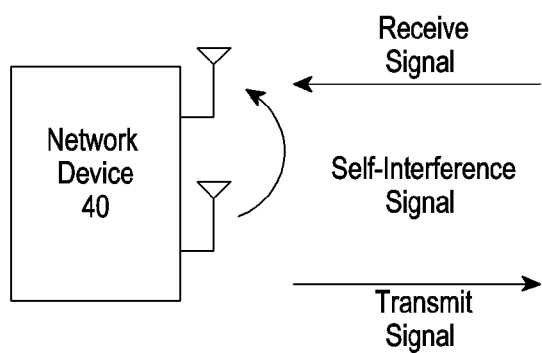

[Fig. 4B]
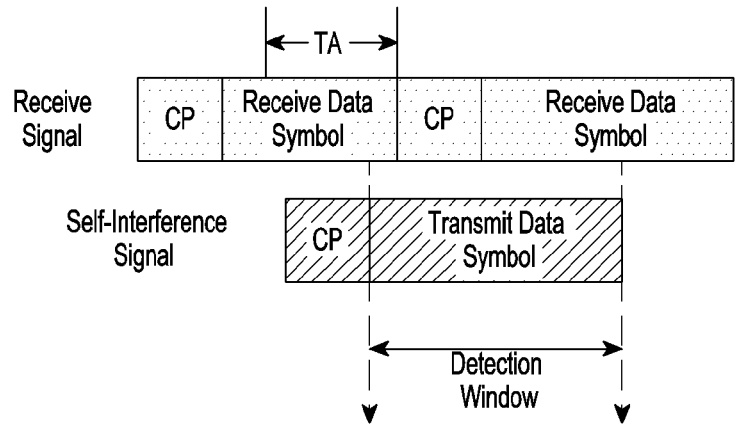
[Fig. 5A]
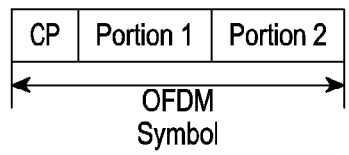
[Fig. 5B]
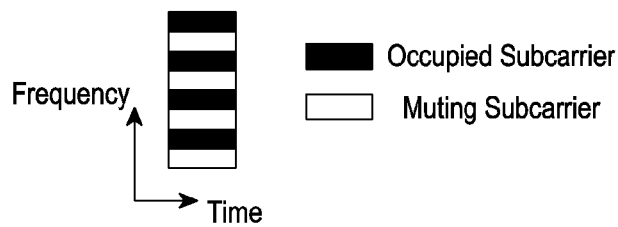
[Fig. 6A]
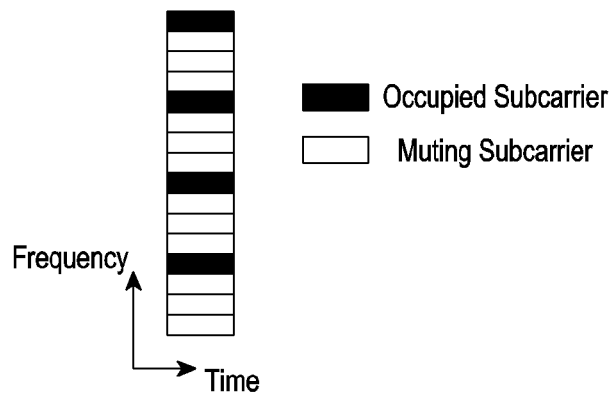
[Fig. 6B]
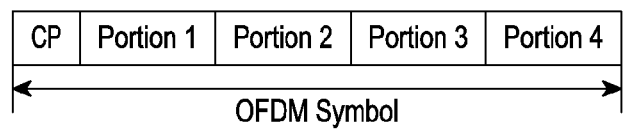

[Fig. 7A]
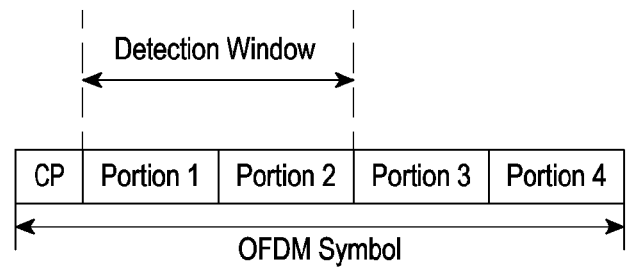
[Fig. 7B]
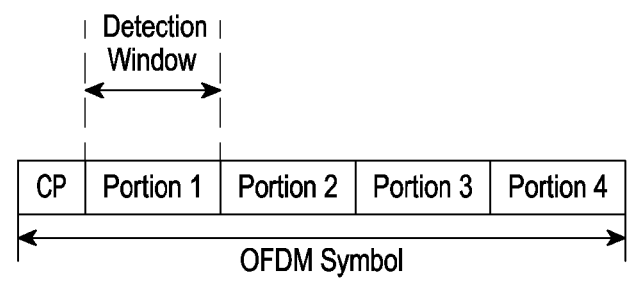

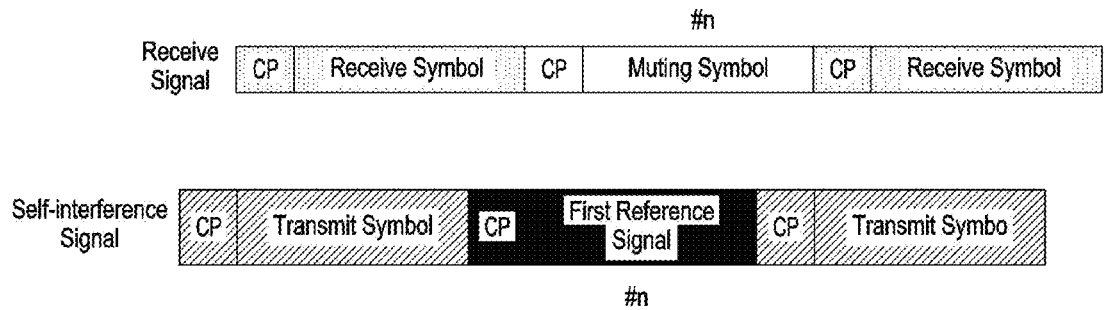
[Fig. 8]
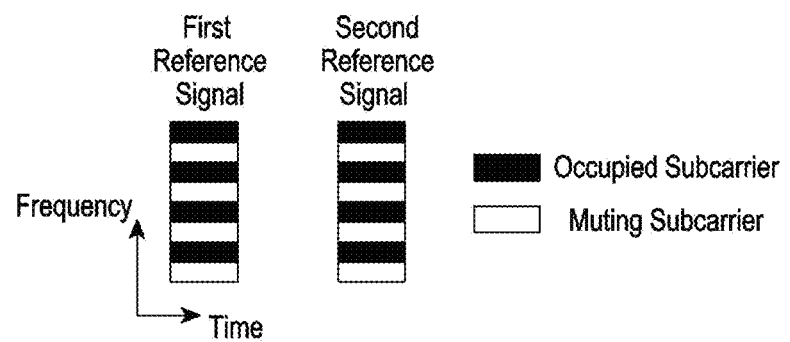
[Fig. 9A]

[Fig. 9B]
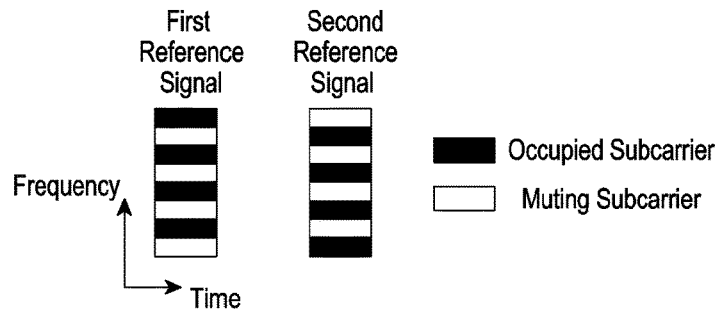
[Fig. 10]
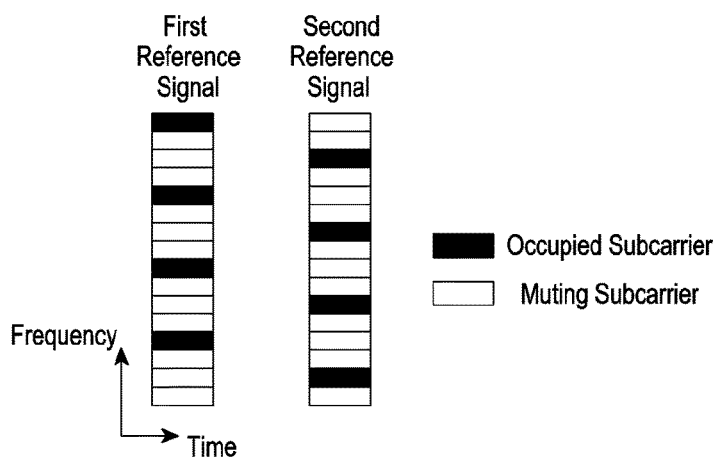
[Fig. 11A]
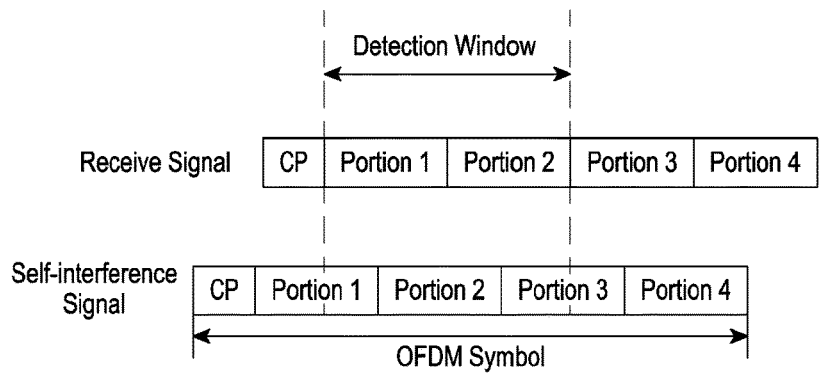
[Fig. 11B]
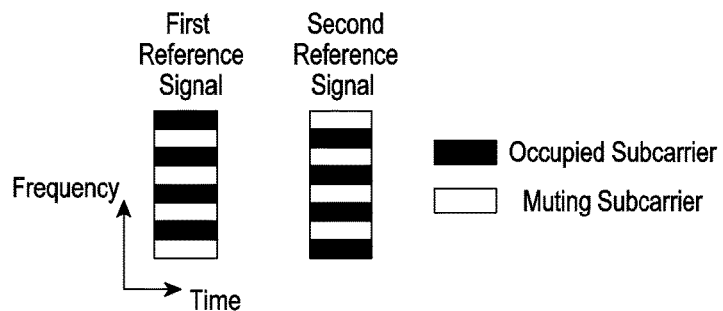

[Fig. 12]
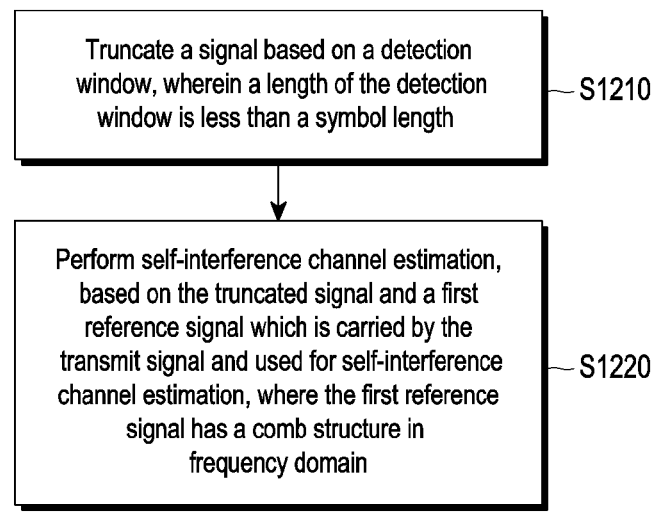
[Fig. 13]
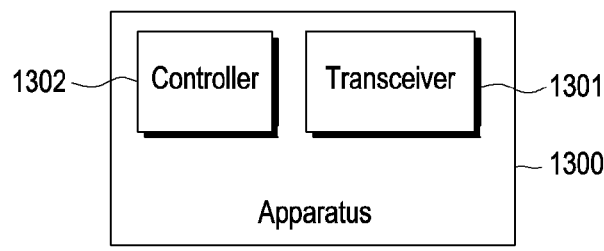
[Fig. 14]
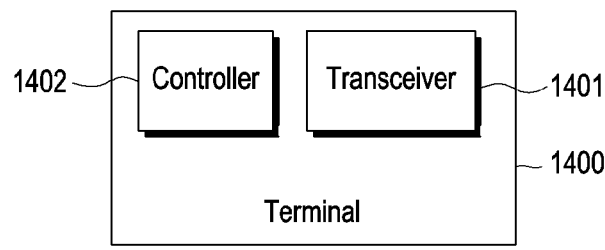
[Fig. 15]
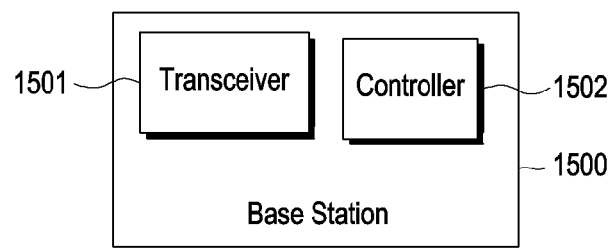

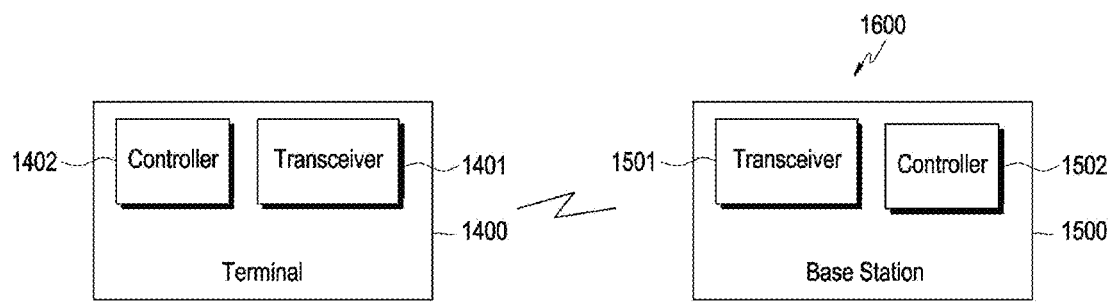
[Fig. 16]
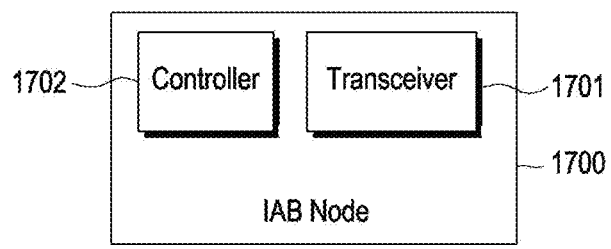
[Fig. 17]

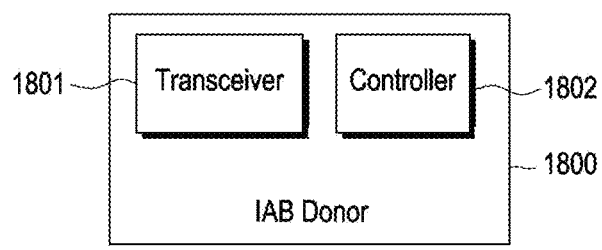
[Fig. 18]
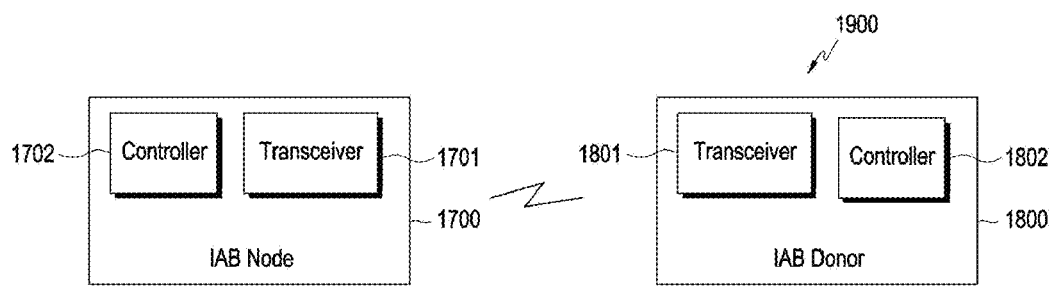
[Fig. 19]

[Fig. 20]
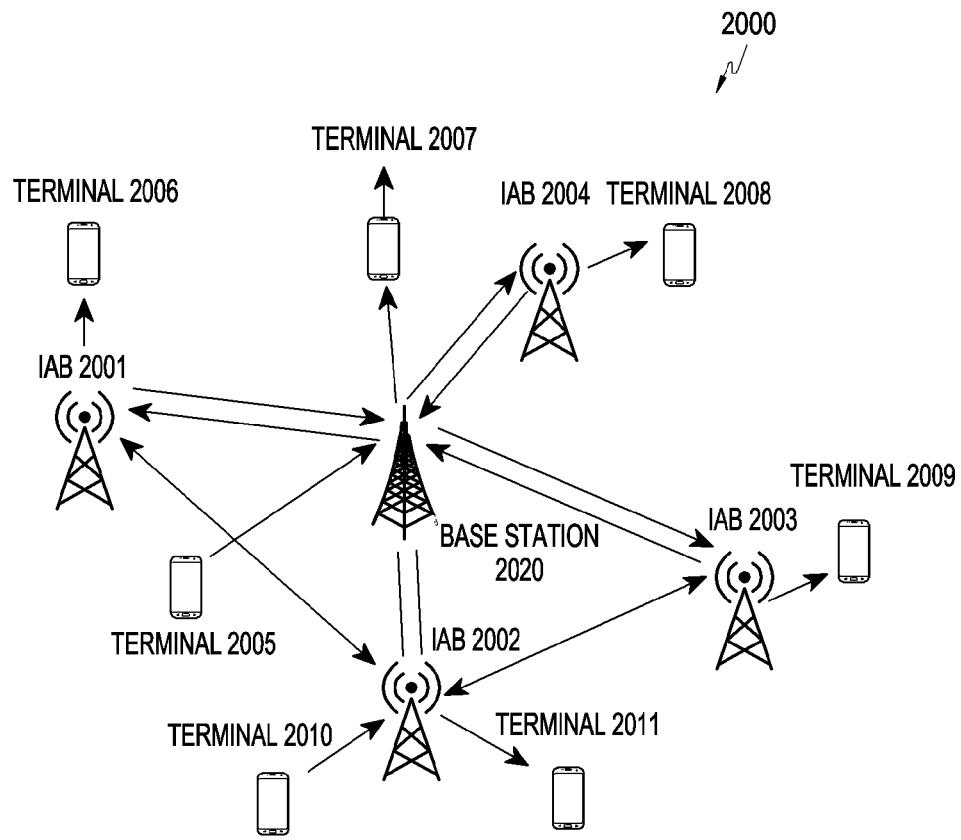
[Fig. 21]
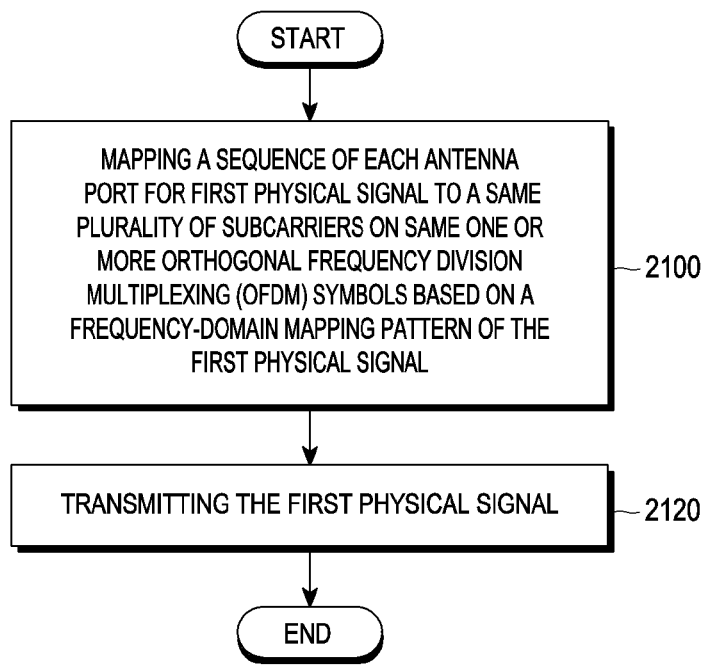

[Fig. 22]
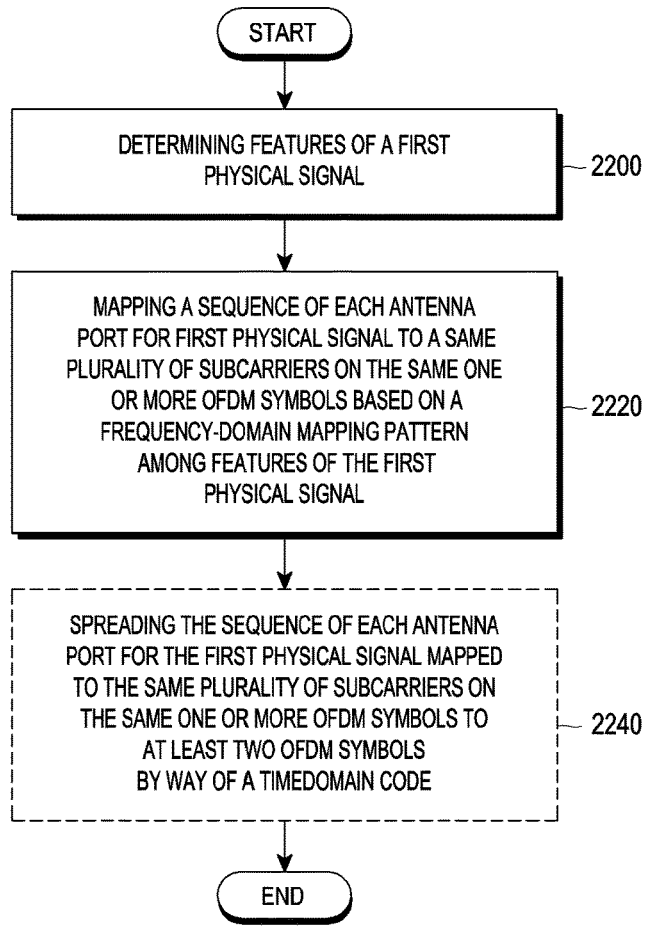
[Fig. 23]
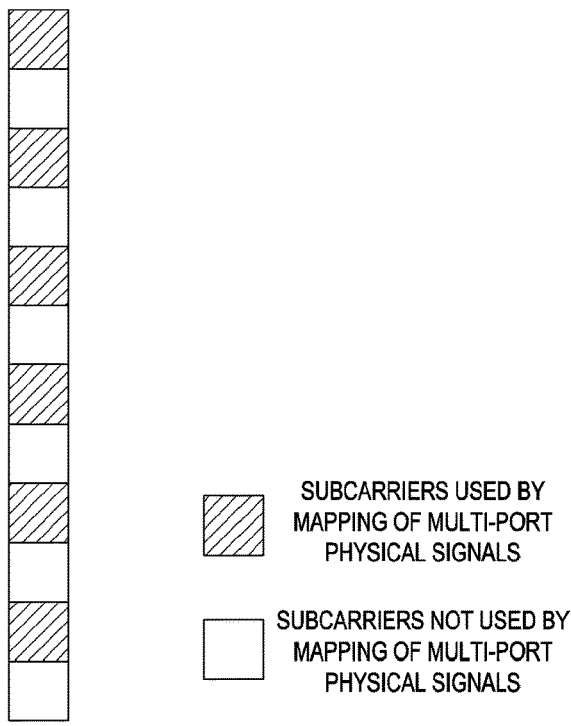

[Fig. 24]
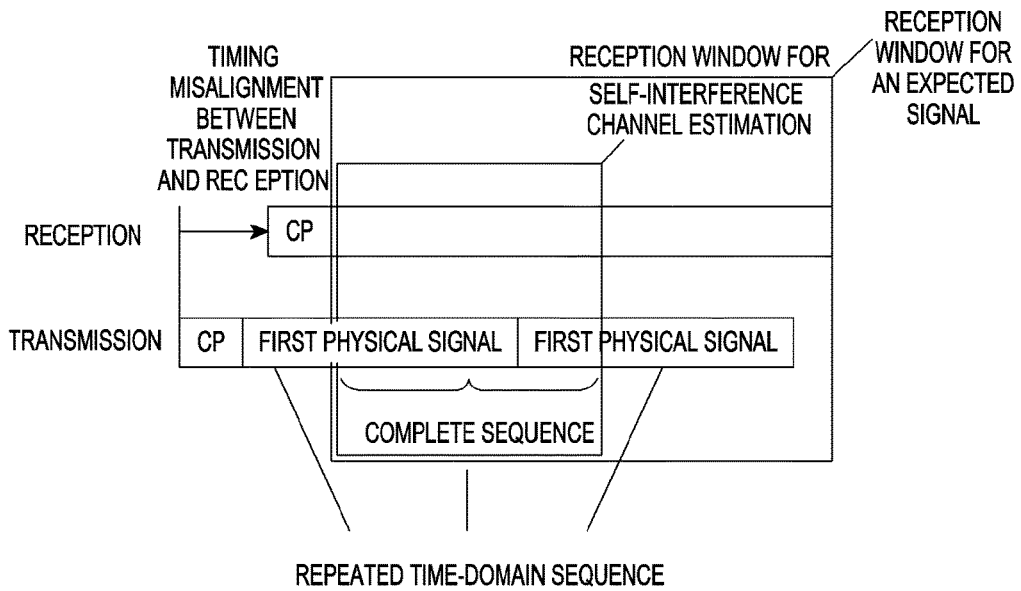
[Fig. 25]
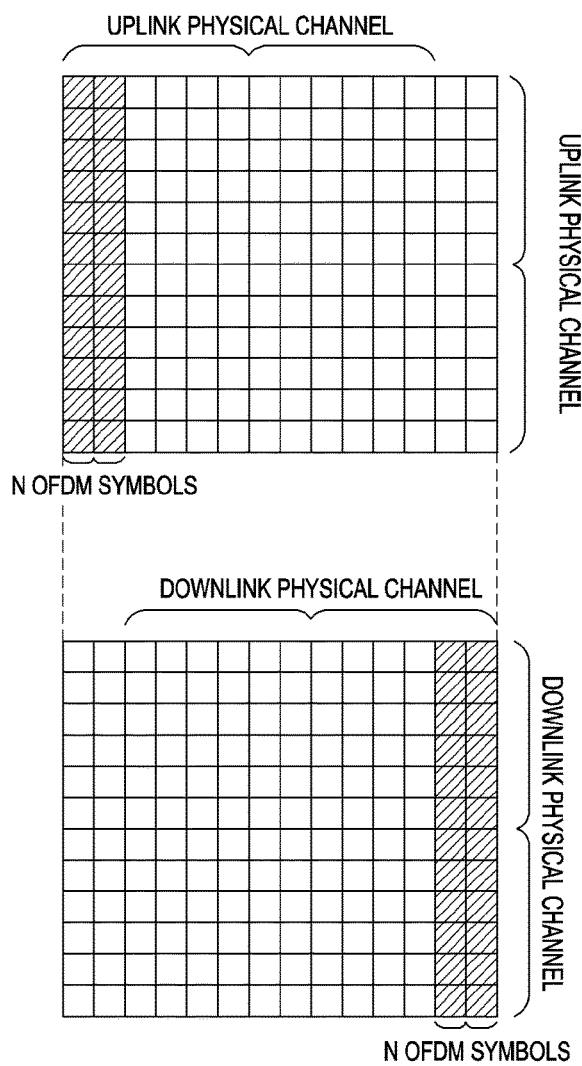

[Fig. 26]
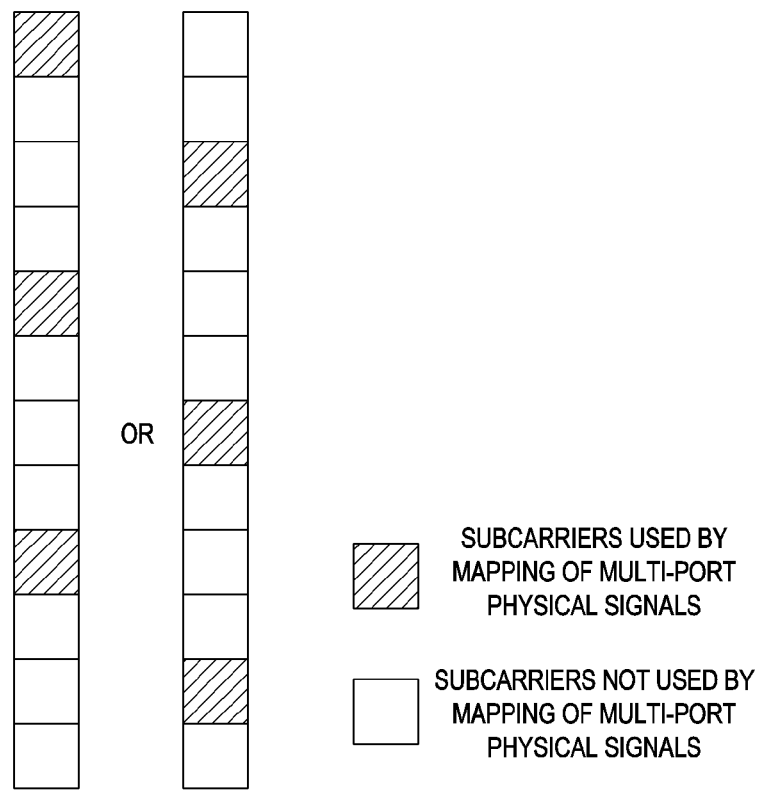

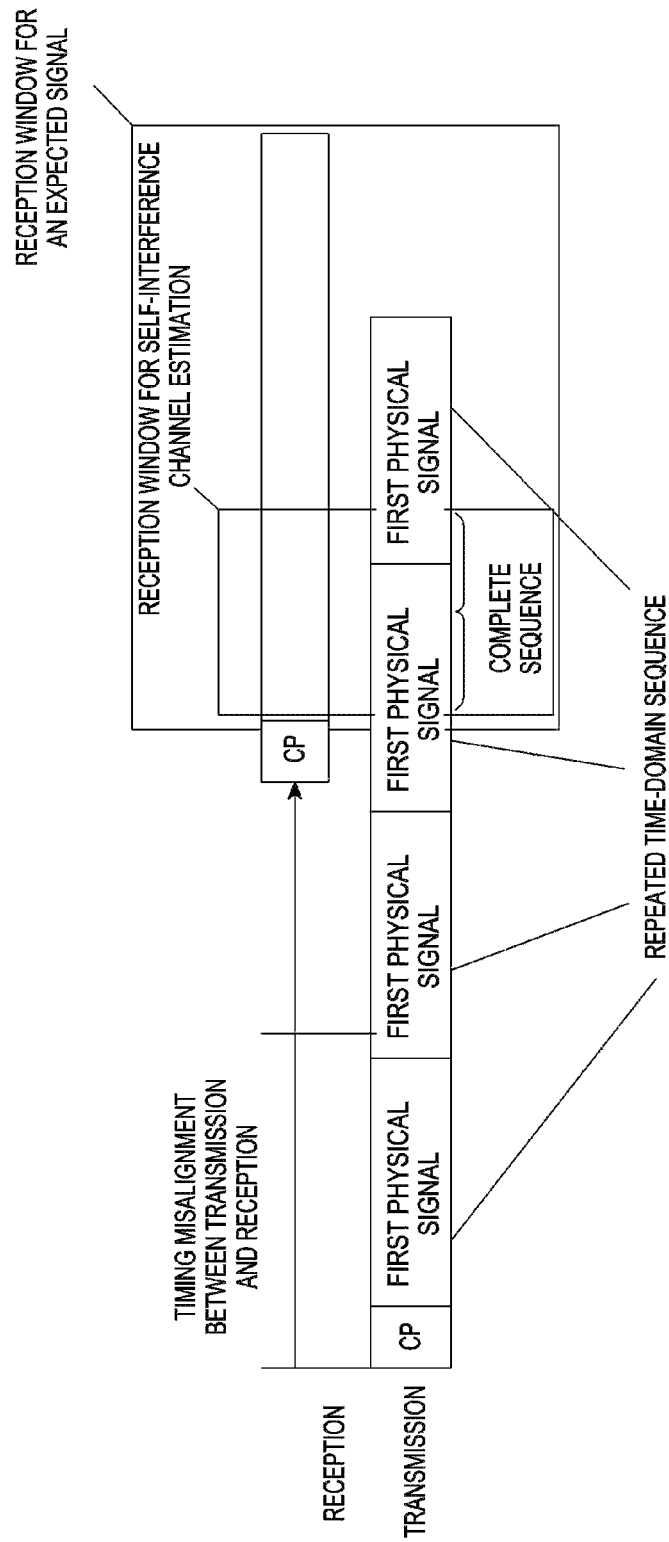
[Fig. 27]

[Fig. 28]
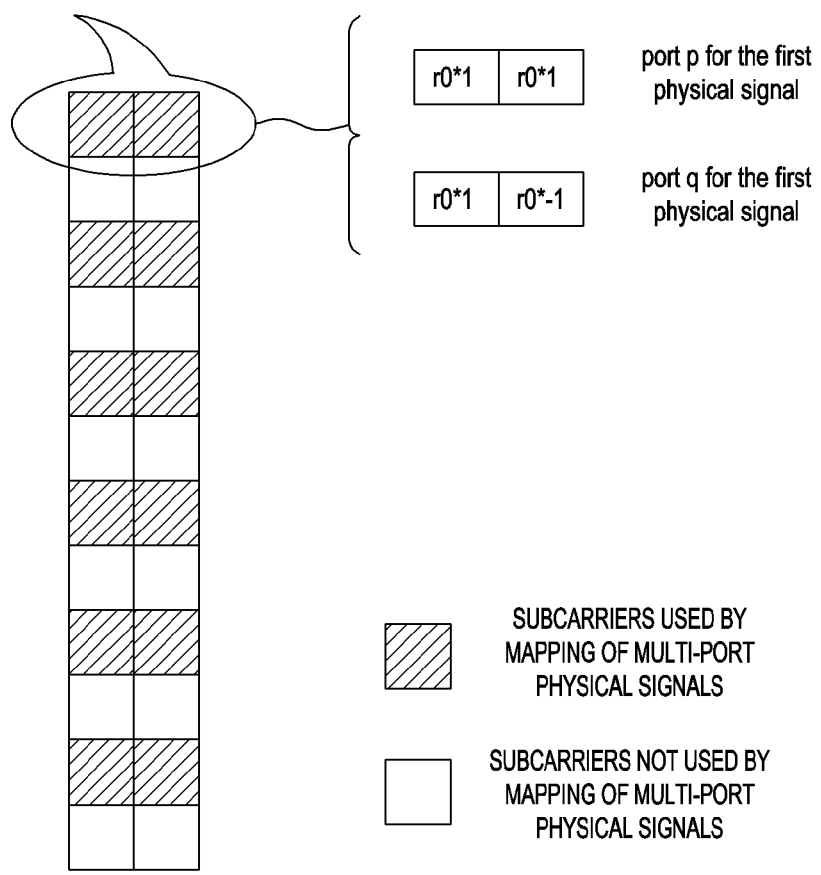

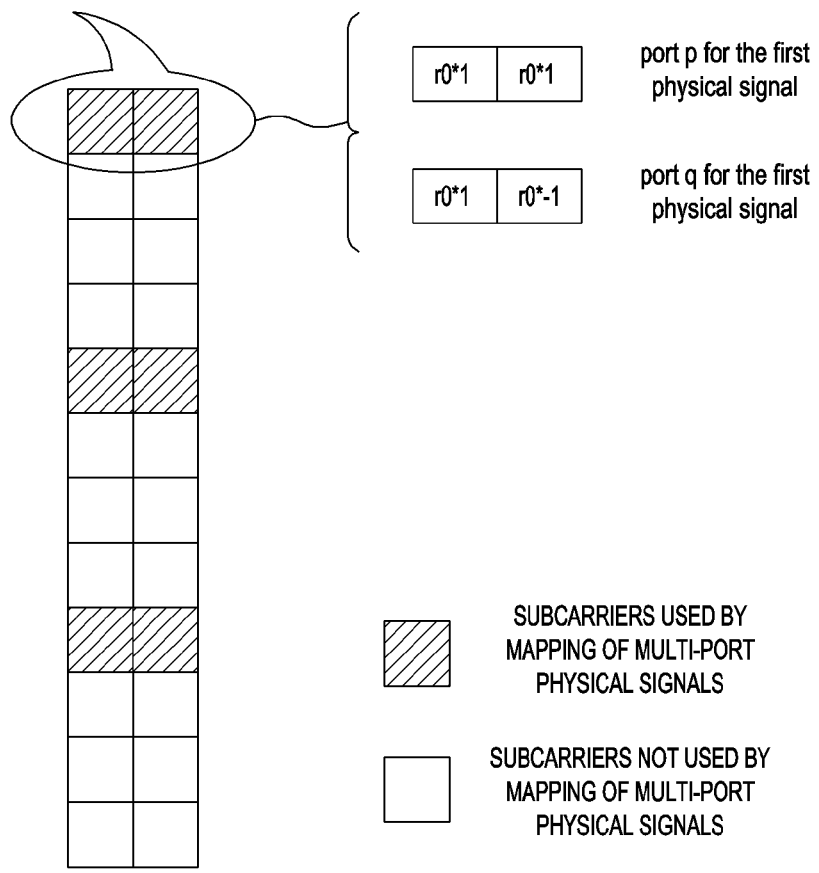

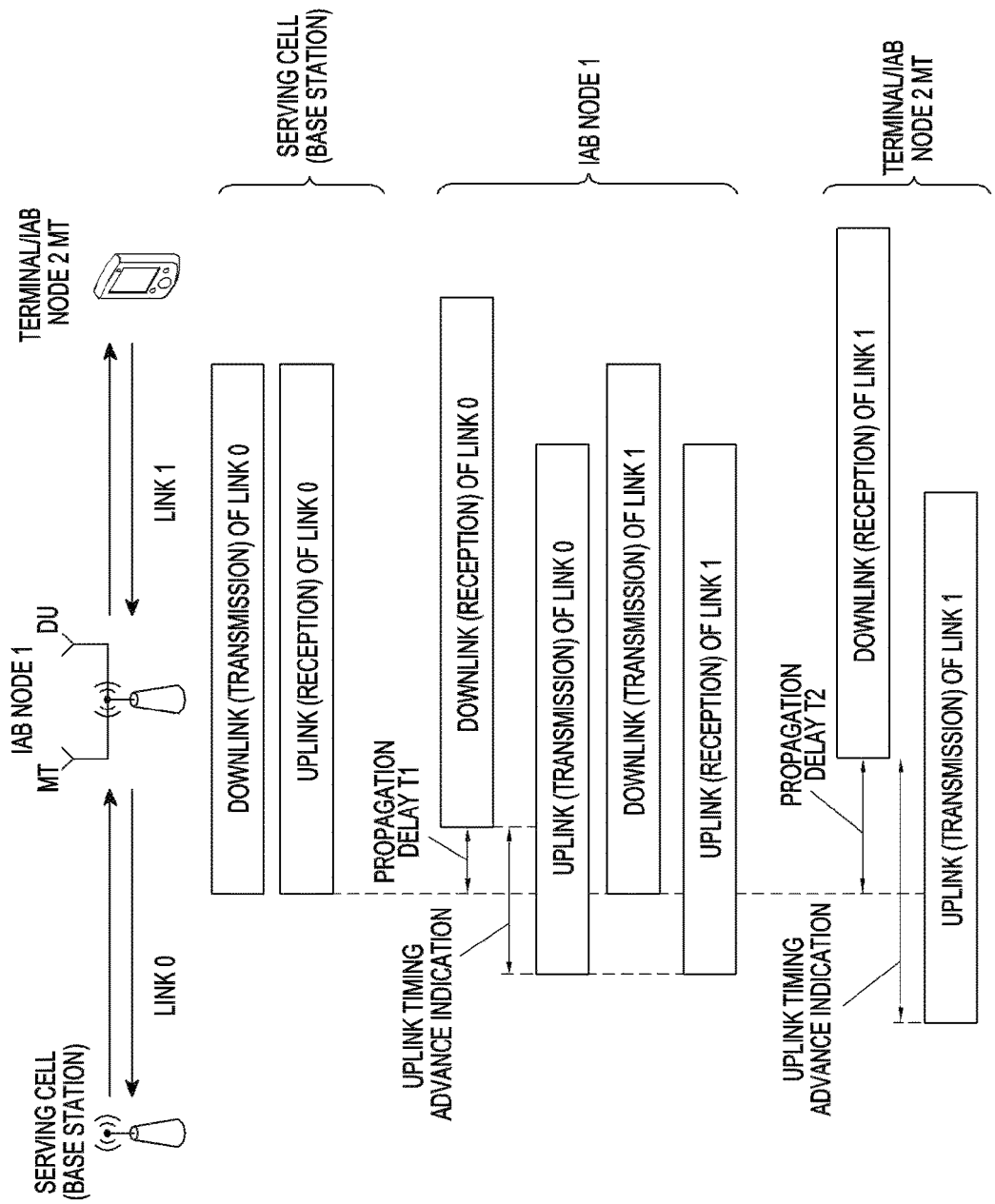
[Fig. 29B]

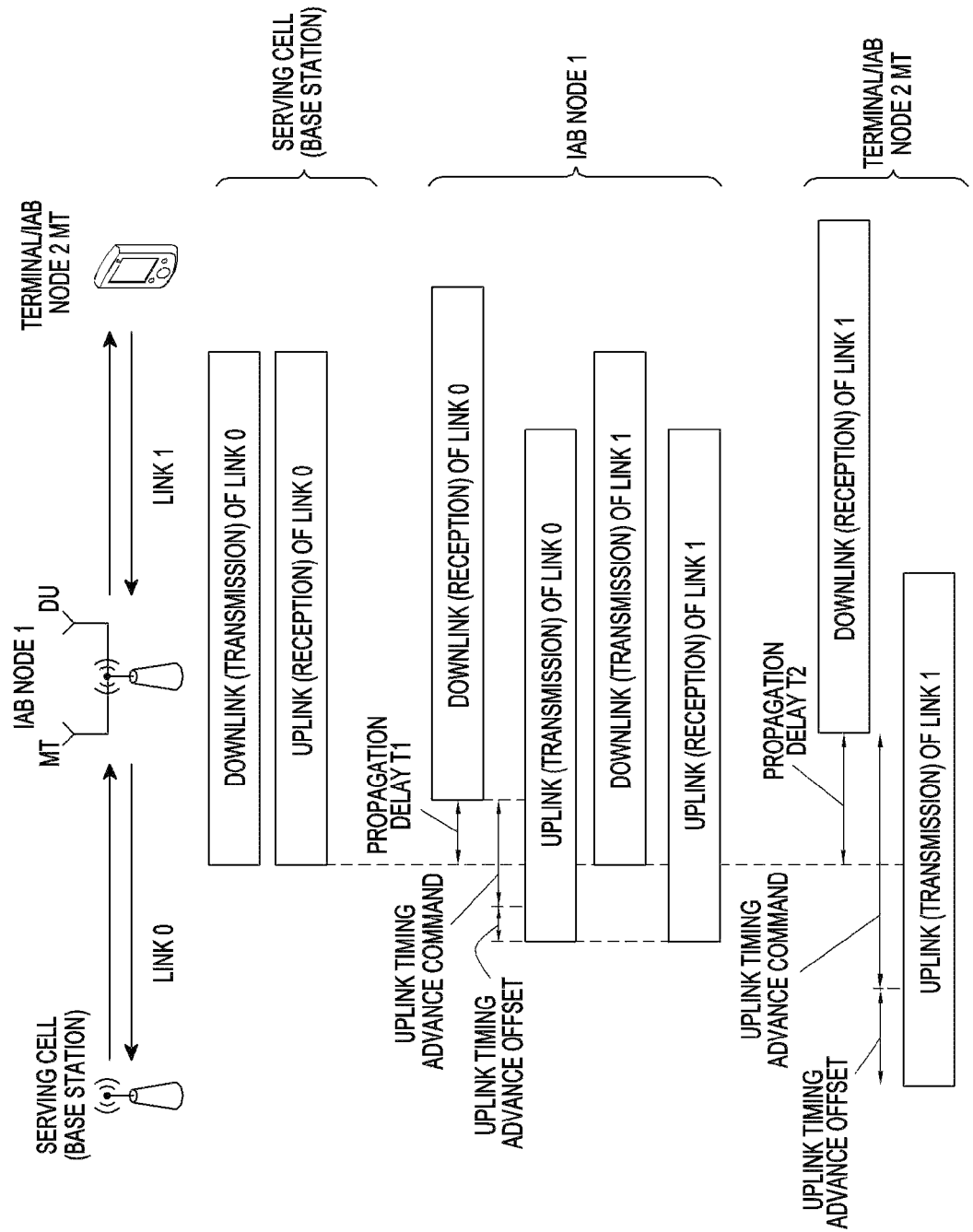
[Fig. 29C]

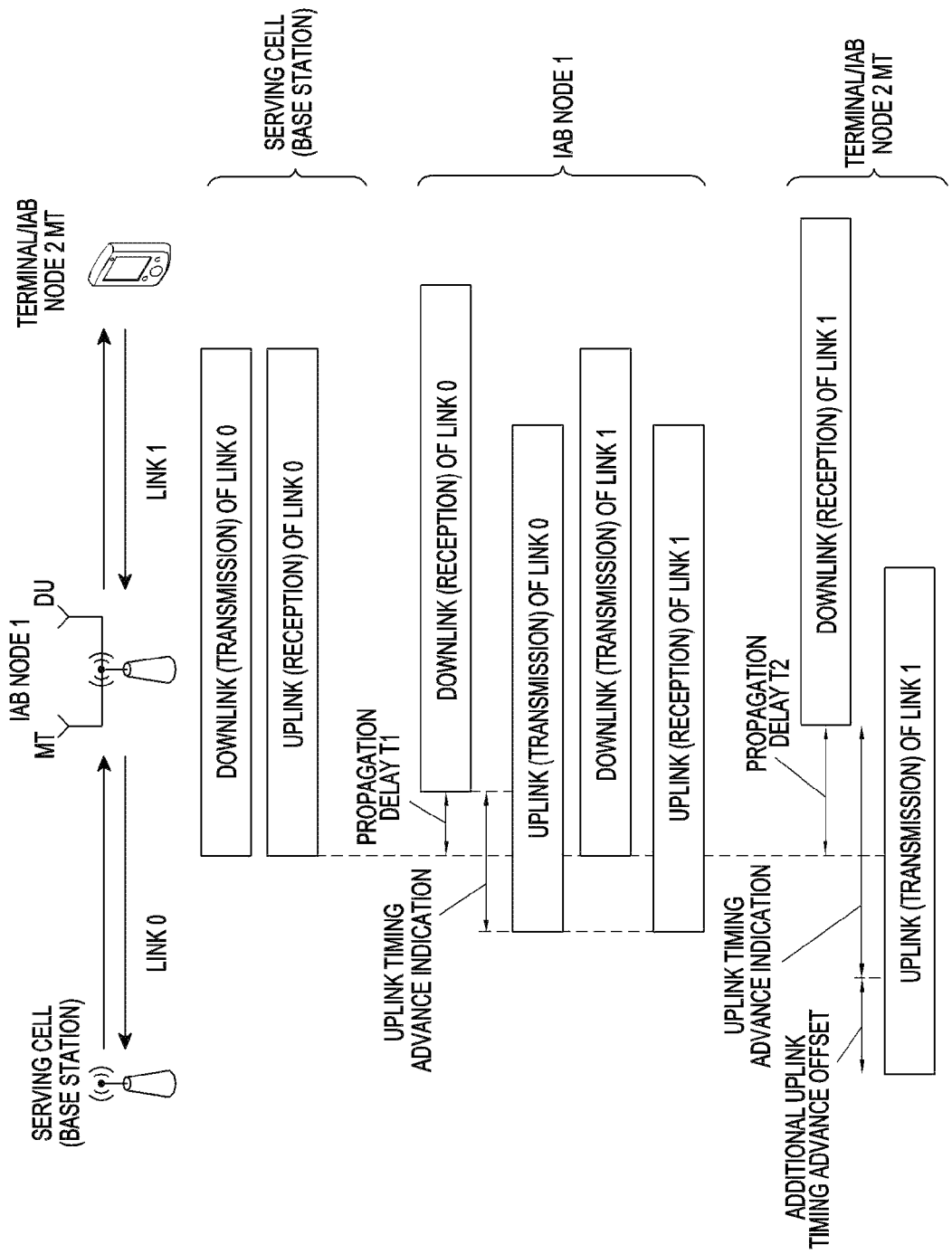
[Fig. 29D]

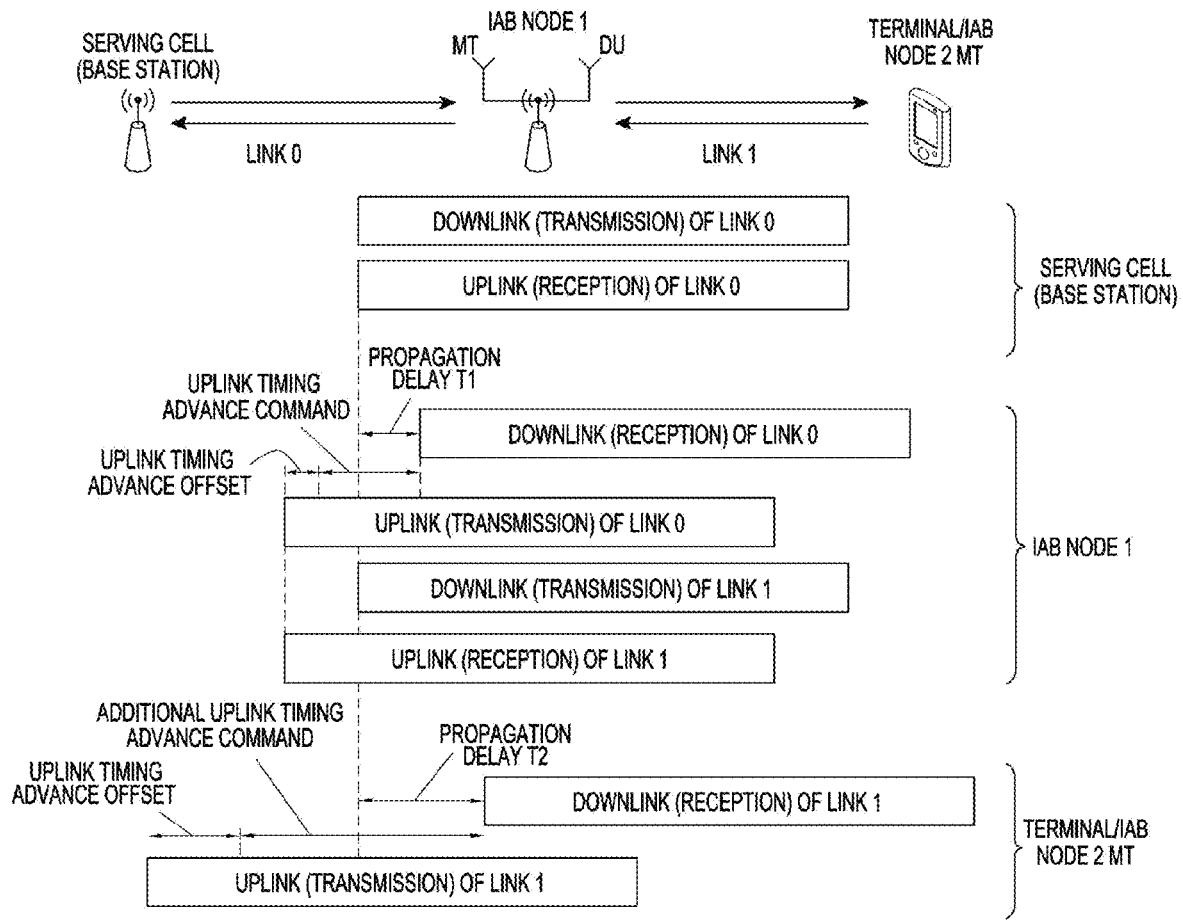
[Fig. 29E]
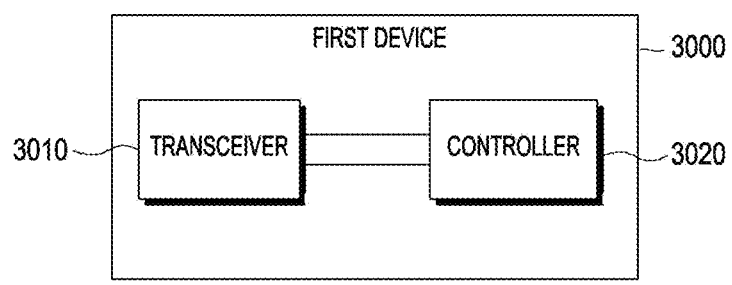
[Fig. 30]

[Fig. 31]
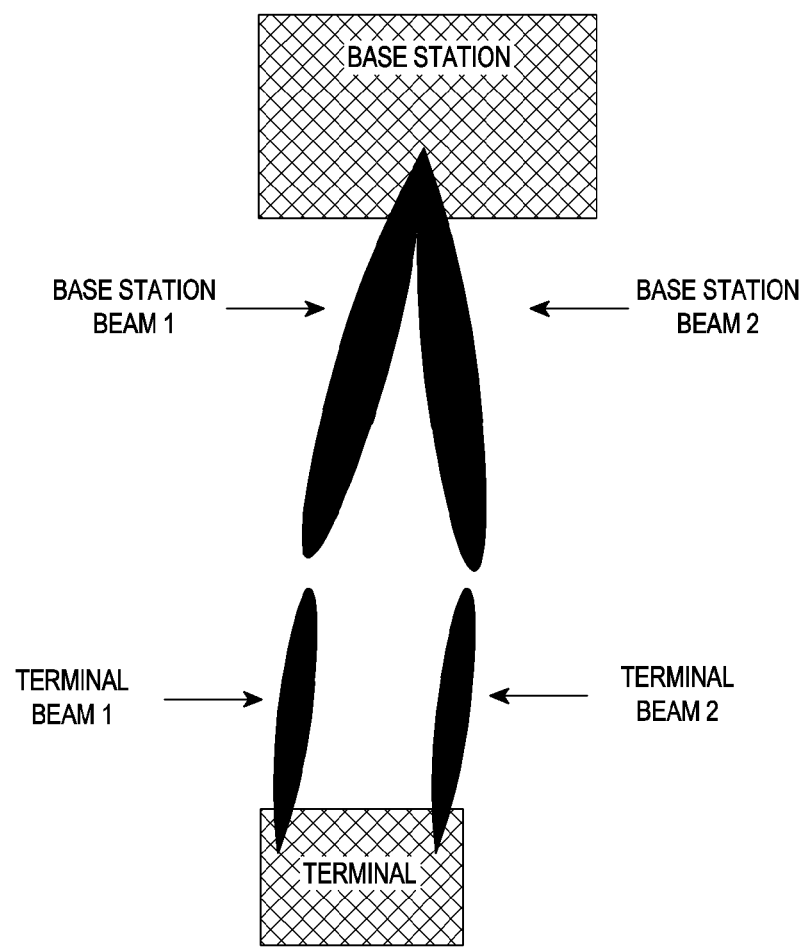

[Fig. 32]
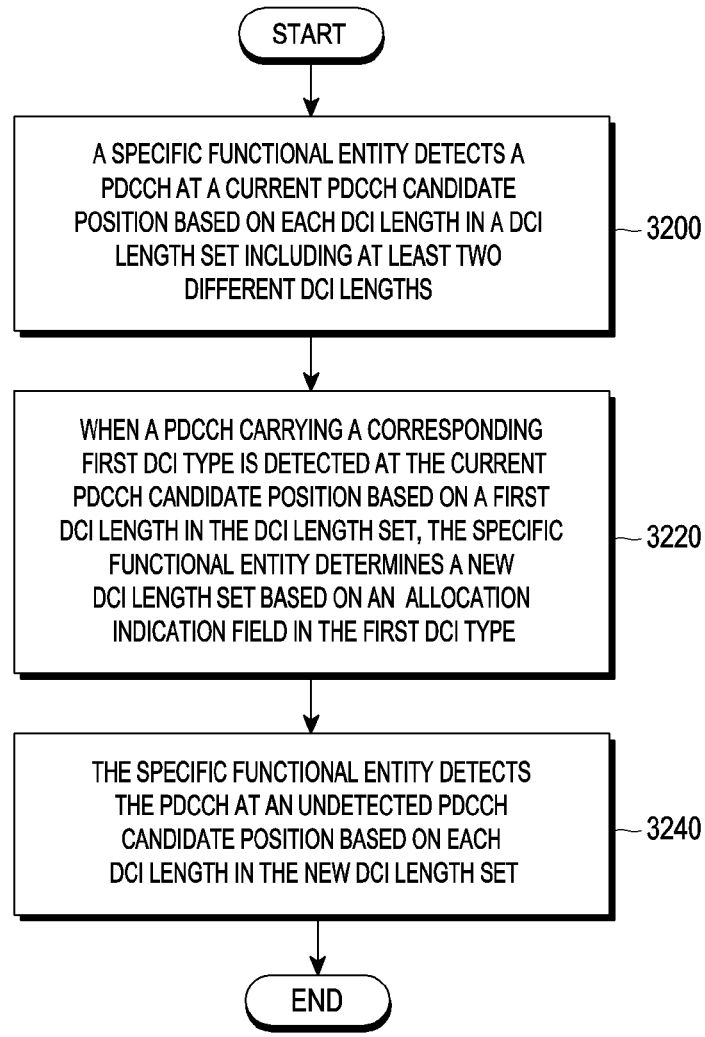

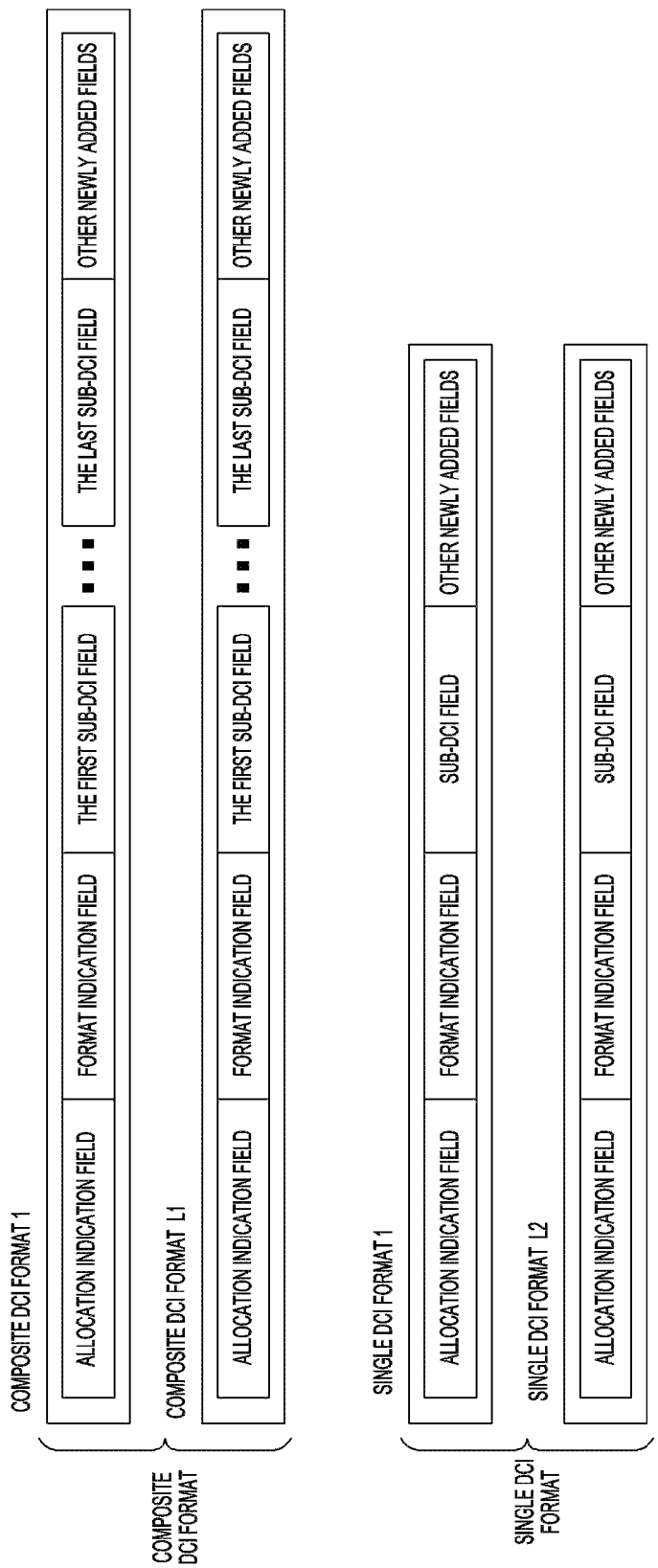
[Fig. 33]

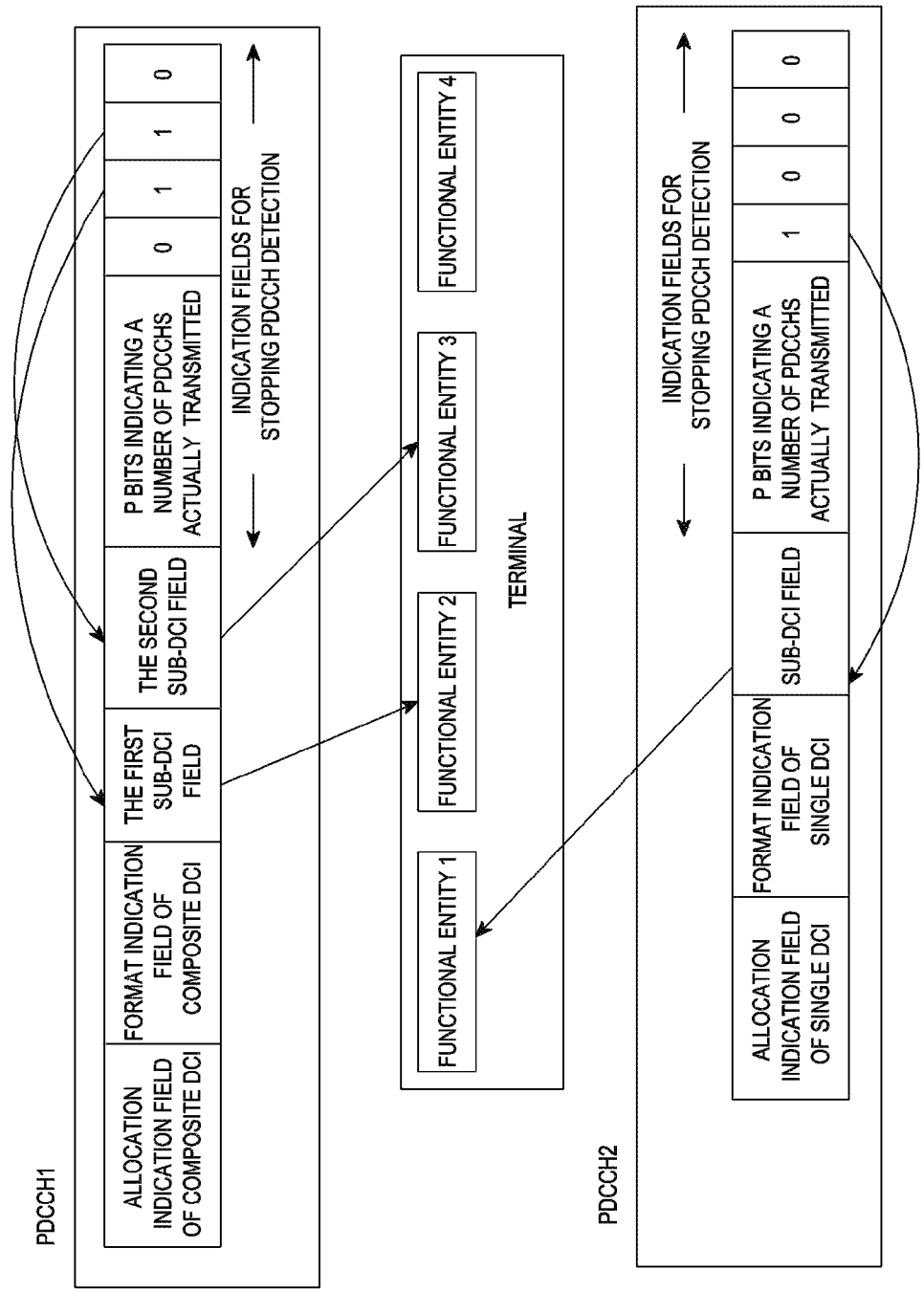
[Fig. 34]

[Fig. 35]
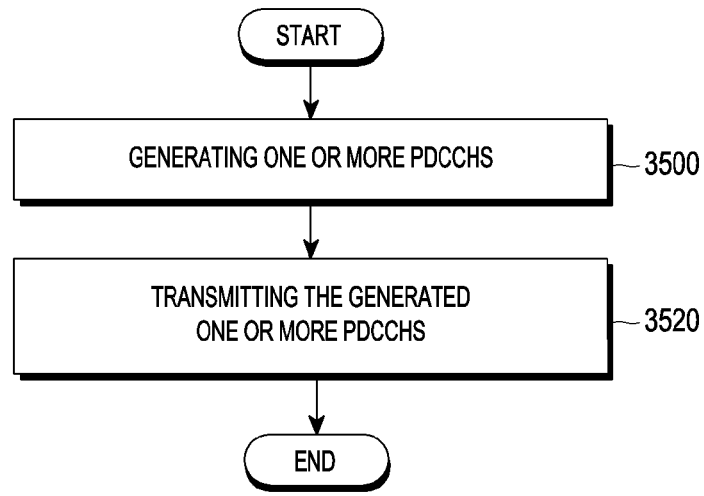
[Fig. 36]
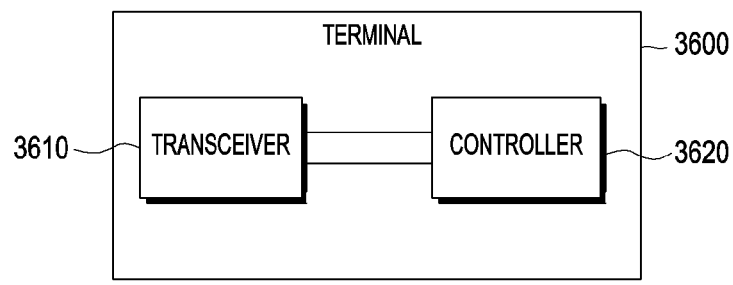
[Fig. 37]
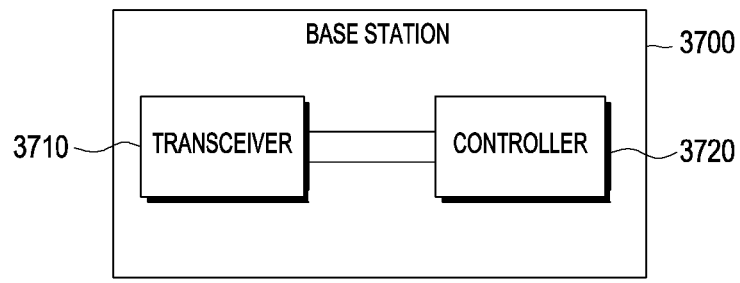

METHOD AND APPARATUS FOR PROCESSING SIGNALS IN A COMMUNICATION SYSTEM

CROSS-REFERENCE TO RELATED APPLICATION(S)

This application is a U.S. National Phase Entry of PCT International Application No. PCT/KR2021/002422, which was filed on Feb. 25, 2021, and claims priority to Chinese Patent Application Nos. 202010140170.5 and 202010365429.6, which were filed in the Chinese Intellectual Property Office on Mar. 3, 2020 and Apr. 30, 2020, respectively, the entire disclosure of each of which is incorporated herein by reference.

TECHNICAL FIELD

Embodiments of the present disclosure relate to a technical field of wireless communication, and particularly, to method and an apparatus for processing signals in a wireless communication system.

Embodiments of the present disclosure relate to a method and an apparatus for self-interference cancellation in a wireless communication system.

Embodiments of the present disclosure relate to a method and an apparatus for transmitting and receiving signals in a wireless communication system.

BACKGROUND ART

As the international telecommunication union (ITU) estimates, by 2020, the global monthly mobile data traffic will reach 62 exa byte (EB), in which 1 EB=230 GB (gigabyte). According to the "IMT traffic estimates for the years 2020 to 2030, Report ITU-R M.2370-0" issued by the ITU, from 2020 to 2030, global mobile data services will grow at an annual rate of about 55%. In addition, the proportion of video services and machine-to-machine communication services in mobile data services will gradually increase. It is expected that by 2030, the video business will be six times the non-video business, and the machine-to-machine communication business will account for about 12% of the mobile data business.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In addition, in order to meet requirements for wireless data communication service, a beyond 5G (B5G) or 6G communication system is being developed.

DISCLOSURE OF INVENTION

Technical Problem

The embodiments herein is to present disclosure method and apparatus for processing signals in a wireless communication system.

And, the embodiments herein is to present disclosure method and apparatus for self-interference cancellation in a wireless communication system.

And, the embodiments herein is to present disclosure method and apparatus for pattern, transmission and resource allocation of physical reference signals in a wireless communication system.

Solution to Problem

According to at least one embodiment of the present disclosure, a method for self-interference cancellation is provided. The method may comprise: truncating a signal based on a detection window, where the signal comprises a receive signal and a self-interference signal which is associated with a transmit signal, and a length of the detection window is less than a symbol length; based on the truncated signal and a first reference signal which is carried by the transmit signal and used for self-interference channel estimation, performing self-interference channel estimation to obtain an estimation of a self-interference channel, where the first reference signal has a comb structure in a frequency domain; and performing self-interference cancellation based on the transmit signal and the estimation of the self-interference channel.

According to at least one embodiment of the present disclosure, an apparatus for self-interference cancellation is also provided. The apparatus includes a transceiver configured to transmit and receive signals; and a controller configured to truncate a signal based on a detection window, where the signal comprises a receive signal and a self-interference signal which is associated with a transmit signal, and a length of the detection window is less than a symbol length, perform self-interference channel estimation to obtain an estimation of a self-interference channel, based on the truncated signal and a first reference signal which is carried by the transmit signal and used for self-interference channel estimation, where the first reference signal has a comb structure in a frequency domain, and perform self-interference cancellation based on the transmit signal and the estimation of the self-interference channel.

For example, in some implementations, the length of the detection window is ½ or ¼ of the symbol length.

For example, in some implementations, a repetition factor of the comb structure of the first reference signal is an integer power of 2, where the repetition factor is a difference between indexes of two adjacent occupied subcarriers in the comb structure.

For example, in some implementations, a symbol of the receive signal of which a time domain index is the same as that of a symbol of the first reference signal is a muting symbol.

For example, in some implementations, the controller is configured to determine a position of the detection window based on a timing of the receive signal, and truncate the signal based on the position of the detection window and the length of the detection window.

For example, in some implementations, the controller is configured to process the first reference signal based on a timing advance to generate the processed first reference signal, and perform the self-interference cancellation based on the processed first reference signal and the detected signal.

For example, in some implementations, a second reference signal in the receive signal at a time domain index corresponding to a time domain index of the first reference signal has a comb structure in the frequency domain, where the second reference signal is carried by the receive signal and used for channel estimation of the receive signal, and the comb structure of the first reference signal has a repetition factor the same as the comb structure of the second reference signal.

For example, in some implementations, a root sequence for generating the first reference signal is the same as a root sequence for generating the second reference signal, and a cyclic shift for generating the first reference signal is different from a cyclic shift for generating the second reference signal.

For example, in some implementations, the cyclic shift for generating the first reference signal, and the cyclic shift for generating the second reference signal are determined based on one or more of a timing advance, a cyclic prefix (CP) length and the symbol length.

For example, in some implementations, the root sequence and the cyclic shift for generating the first reference signal, and the root sequence and the cyclic shift for generating the second reference signal are configured respectively.

For example, in some implementations, the root sequence and the cyclic shift for generating the first reference signal are configured together with the root sequence and the cyclic shift for generating the second reference signal.

For example, in some implementations, the root sequence and the cyclic shift for generating the first reference signal and the root sequence and the cyclic shift for generating the second reference signal are configured based on a predefined rule.

For example, in some implementations, an offset of the comb structure of the first reference signal is different from an offset of the comb structure of the second reference signal.

For example, in some implementations, the difference between the offset of the comb structure of the first reference signal and the offset of the comb structure of the second reference signal is an even.

For example, in some implementations, the repetition factor and the offset of the comb structure of the first reference signal, and the repetition factor and the offset of the comb structure of the second reference signal are configured respectively.

For example, in some implementations, the repetition factor and the offset of the comb structure of the first reference signal, and the repetition factor and the offset of the comb structure of the second reference signal are configured based on a predefined rule.

For example, in some implementations, the repetition factor of the comb structure of the first reference signal, and the repetition factor of the comb structure of the second reference signal are determined based on one or more of a timing advance, a cyclic prefix (CP) length and the symbol length.

For example, in some implementations, the controller is configured to reconstruct the self-interference signal based on the transmit signal and the estimation of the self-interference channel, and obtain a signal after self-interference cancellation based on the reconstructed self-interference signal and the receive signal.

For example, in some implementations, the apparatus is one of a terminal or a base station.

For example, in some implementations, the apparatus is one of an integrated access and backhaul (IAB) node or an IAB donor.

According to at least one embodiment of the present disclosure, a terminal is also provided. The terminal includes a transceiver configured to transmit and receive signals; and a controller configured to truncate a signal based on a detection window, where the signal comprises a receive signal and a self-interference signal which is associated with a transmit signal, and a length of the detection window is less than a symbol length, perform self-interference channel estimation to obtain an estimation of a self-interference channel, based on the truncated signal and a first reference signal which is carried by the transmit signal and used for self-interference channel estimation, where the first reference signal has a comb structure in a frequency domain, and perform self-interference cancellation based on the transmit signal and the estimation of the self-interference channel.

According to at least one embodiment of the present disclosure, a base station is also provided. The base station includes a transceiver configured to transmit and receive signals; and a controller configured to truncate a signal based on a detection window, where the signal comprises a receive signal and a self-interference signal which is associated with a transmit signal, and a length of the detection window is less than a symbol length, perform self-interference channel estimation to obtain an estimation of a self-interference channel, based on the truncated signal and a first reference signal which is carried by the transmit signal and used for self-interference channel estimation, where the first reference signal has a comb structure in the frequency domain, and perform self-interference cancellation based on the transmit signal and the estimation of the self-interference channel.

According to at least one embodiment of the present disclosure, an IAB node is also provides. The IAB node includes a transceiver configured to transmit and receive signals; and a controller configured to truncate a signal based on a detection window, where the signal comprises a receive signal and a self-interference signal which is associated with a transmit signal, and a length of the detection window is less than a symbol length, perform self-interference channel estimation to obtain an estimation of a self-interference channel, based on the truncated signal and a first reference signal which is carried by the transmit signal and used for self-interference channel estimation, where the first reference signal has a comb structure in the frequency domain, and perform self-interference cancellation based on the transmit signal and the estimation of the self-interference channel.

According to at least one embodiment of the present disclosure, an IAB donor is also provided. The IAB donor includes a transceiver configured to transmit and receive signals; and a controller configured to truncate a signal based on a detection window, where the signal comprises a receive signal and a self-interference signal which is associated with a transmit signal, and a length of the detection window is less than a symbol length, perform self-interference channel estimation to obtain an estimation of a self-interference channel, based on the truncated signal and a first reference signal which is carried by the transmit signal and used for self-interference channel estimation, where the first reference signal has a comb structure in the frequency domain, and perform self-interference cancellation based on the transmit signal and the estimation of the self-interference channel.

According to at least one embodiment of the present disclosure, a wireless communication system is also provided. The wireless communication system may include the above-mentioned terminal and the above-mentioned base station.

According to at least one embodiment of the present disclosure, a wireless communication system is also provided. The wireless communication system may include the above-mentioned IAB node and the above-mentioned IAB donor.

According to at least one embodiment of the present disclosure, there is provided a method for transmitting a first physical signal by a first device in a wireless communication system, the method including: mapping a sequence of each antenna port for the first physical signal to a same plurality of subcarriers on same one or more orthogonal frequency division multiplexing (OFDM) symbols based on a frequency-domain mapping pattern of the first physical signal; and transmitting the first physical signal.

For example, in some implementations, the step of mapping a sequence of each antenna port for the first physical signal to the same plurality of subcarriers on the same one or more OFDM symbols includes: mapping all sequences of all antenna ports for the first physical signal to the plurality of subcarriers on the same one or more OFDM symbols at an interval of 1 subcarrier, when the frequency-domain mapping pattern of the first physical signal is a first frequency-domain mapping pattern.

For example, in some implementations, neither of an expected signal and a second physical signal is mapped to the same one or more OFDM symbols, wherein the expected signal is a signal transmitted by at least one second device communicating with the first device and expected to be received by the first device, and wherein the second physical signal is a signal transmitted by the at least one second device and not expected to be received by the first device.

For example, in some implementations, the step of mapping a sequence of each antenna port for the first physical signal to the same plurality of subcarriers on the same one or more OFDM symbols includes: mapping all sequences of all antenna ports for the first physical signal to the plurality of subcarriers on the same one or more OFDM symbols at an interval of 3 subcarriers, when the frequency-domain mapping pattern of the first physical signal is a second frequency-domain mapping pattern.

For example, in some implementations, at least one of an expected signal and a second physical signal is mapped to subcarriers each spaced by 1 subcarrier from the plurality of subcarriers on the same one or more OFDM symbols, and wherein the expected signal is a signal transmitted by at least one second device communicating with the first device and expected to be received by the first device, and wherein the second physical signal is a signal transmitted by the at least one second device and not expected to be received by the first device.

For example, in some implementations, when sequences of at least two antenna ports for the first physical signal are different, the sequences of the at least two antenna ports are sequences orthogonal to each other.

For example, in some implementations, the sequences orthogonal to each other are Zadoff-Chu (ZC) sequences with a same root sequence and different cyclic shifts.

For example, in some implementations, the method further includes: spreading the sequence of each antenna port for the first physical signal mapped to the same plurality of subcarriers on the same one or more OFDM symbols to at least two OFDM symbols by way of a time-domain code, and wherein time-domain codes corresponding to any two antenna ports are the same or orthogonal.

For example, in some implementations, when sequences of two antenna ports for the first physical signal are orthogonal to each other, time-domain codes corresponding to the two antenna ports are the same; and when the sequences of the two antenna ports for the first physical signal are the same, the time-domain codes corresponding to the two antenna ports are orthogonal.

For example, in some implementations, a mapping mode in time-domain of the first physical signal and the second physical signal transmitted by at least one second device is one of the followings: the first physical signal being mapped to a first N OFDM symbols in allocated time-domain symbols, and the second physical signal being mapped to a last M OFDM symbols in the allocated time-domain symbols; or the first physical signal being mapped to the last M OFDM symbols in the allocated time-domain symbols, and the second physical signal being mapped to the first N OFDM symbols in the allocated time-domain symbols, and wherein both N and M are integers greater than 0.

For example, in some implementations, features of the first physical signal are determined by the first device based on obtained configuration information, which can be configured by higher layer signaling and/or physical layer signaling, and wherein the features of the first physical signal include the frequency-domain mapping pattern of the first physical signal.

For example, in some implementations, the configuration information is configuration information indicating a type of the first physical signal and/or configuration information related to full-duplex.

For example, in some implementations, the features of the first physical signal are determined by the first device based on a number of antenna ports for the first physical signal, and wherein the features of the first physical signal include the frequency-domain mapping pattern of the first physical signal.

For example, in some implementations, when the number of antenna ports for the first physical signal is greater than a predetermined value, the frequency-domain mapping pattern of the first physical signal is determined as a first frequency-domain mapping pattern; and when the number of antenna ports for the first physical signal is smaller than or equal to the predetermined value, the frequency-domain mapping pattern of the first physical signal is determined as a second frequency-domain mapping pattern.

For example, in some implementations, the features of the first physical signal further include at least one of the followings: a time-domain mapping pattern of each antenna port, a time-domain code of each antenna port, a frequency-domain orthogonal code of each antenna port, a sequence of each antenna port and a cyclic shift of the sequence of each antenna port for the first physical signal.

For example, in some implementations, the first device is one of a terminal, a base station and an integrated access and backhaul node (IAB).

According to at least one embodiment of the present disclosure, there is provided a first device for transmitting a first physical signal in a wireless communication system, the first device including: a transceiver, configured to transmit and receive signals to and from external; and a processor, configured to control to map a sequence of each antenna port for the first physical signal to a same plurality of subcarriers on same one or more orthogonal frequency division multiplexing (OFDM) symbols based on a frequency-domain mapping pattern of the first physical signal, and control the transceiver to transmit the first physical signal.

For example, in some implementations, the processor is further configured to: map all sequences of all antenna ports for the first physical signal to the plurality of sub-carriers on the same one or more OFDM symbols at an interval of 1 subcarrier when the frequency-domain mapping pattern of the first physical signal is a first frequency-domain mapping pattern.

For example, in some implementations, neither of an expected signal and a second physical signal is mapped to the same one or more OFDM symbols, wherein the expected signal is a signal transmitted by at least one second device communicating with the first device and expected to be received by the first device, and wherein the second physical signal is a signal transmitted by the at least one second device and not expected to be received by the first device.

For example, in some implementations, the processor is further configured to: map all sequences of all antenna ports for the first physical signal to the plurality of sub-carriers on the same one or more OFDM symbols at an interval of 3 subcarriers when the frequency-domain mapping pattern of the first physical signal is a second frequency-domain mapping pattern.

For example, in some implementations, at least one of an expected signal and a second physical signal is mapped to subcarriers each spaced by 1 subcarrier from the plurality of subcarriers on the same one or more OFDM symbols, and wherein the expected signal is a signal transmitted by at least one second device communicating with the first device and expected to be received by the first device, and wherein the second physical signal is a signal transmitted by the at least one second device and not expected to be received by the first device.

For example, in some implementations, when sequences of at least two antenna ports for the first physical signal are different, the sequences of the at least two antenna ports are sequences orthogonal to each other.

For example, in some implementations, the sequences orthogonal to each other are Zadoff-Chu (ZC) sequences with a same root sequence and different cyclic shifts.

For example, in some implementations, the processor is further configured to: spread the sequence of each antenna port for the first physical signal mapped to the same plurality of subcarriers on the same one or more OFDM symbols to at least two OFDM symbols by way of a time-domain code, and wherein time-domain codes corresponding to any two antenna ports are the same or orthogonal.

For example, in some implementations, when sequences of two antenna ports for the first physical signal are orthogonal to each other, time-domain codes corresponding to the two antenna ports are the same; and when the sequences of the two antenna ports for the first physical signal are the same, the time-domain codes corresponding to the two antenna ports are orthogonal.

For example, in some implementations, a mapping mode in time-domain of the first physical signal and the second physical signal transmitted by at least one second device is one of the followings: the first physical signal is mapped to a first N OFDM symbols in allocated time-domain symbols, and the second physical signal is mapped to a last M OFDM symbols in the allocated time-domain symbols; or the first physical signal is mapped to the last M OFDM symbols in the allocated time-domain symbols, and the second physical signal is mapped to the first N OFDM symbols in the allocated time-domain symbols, and wherein both N and M are integers greater than 0.

For example, in some implementations, features of the first physical signal are determined by the first device based on obtained configuration information, which can be configured by higher layer signaling and/or physical layer signaling, and wherein the features of the first physical signal include the frequency-domain mapping pattern of the first physical signal.

For example, in some implementations, the configuration information is configuration information indicating a type of the first physical signal and/or configuration information related to full-duplex.

For example, in some implementations, the features of the first physical signal are determined by the first device based on a number of antenna ports for the first physical signal, and wherein the features of the first physical signal include the frequency-domain mapping pattern of the first physical signal.

For example, in some implementations, when the number of antenna ports for the first physical signal is greater than a predetermined value, the frequency-domain mapping pattern of the first physical signal is determined as a first frequency-domain mapping pattern; and when the number of antenna ports for the first physical signal is smaller than or equal to the predetermined value, the frequency-domain mapping pattern of the first physical signal is determined as a second frequency-domain mapping pattern.

For example, in some implementations, the features of the first physical signal further include at least one of the followings: a time-domain mapping pattern of each antenna port, a time-domain code of each antenna port, a frequency-domain orthogonal code of each antenna port, a sequence of each antenna port and a cyclic shift of the sequence of each antenna port for the first physical signal.

For example, in some implementations, the first device is one of a terminal, a base station and an integrated access and backhaul node (IAB).

According to at least one embodiment of the present disclosure, there is provided a method for receiving a physical downlink control channel (PDCCH) from a base station by a specific functional entity of a terminal including a plurality of functional entities in a wireless communication system, the method including: detecting a PDCCH at a current PDCCH candidate position based on each downlink control information (DCI) length among a DCI length set including at least two different DCI lengths; determining a new DCI length set based on an allocation indication field in a DCI format of a first DCI type when a PDCCH carrying DCI of the first DCI type is detected at the current PDCCH candidate position based on a first DCI length in the DCI length set; and detecting the PDCCH at an undetected PDCCH candidate position based on each DCI length among the new DCI length set.

For example, in some implementations, wherein, the step of "determining a new DCI length set based on an allocation indication field in a DCI format of a first DCI type" includes: determining the new DCI length set by removing the first DCI length from the DCI length set when it is determined to stop detecting PDCCHs carrying DCIs of the first DCI type based on the allocation indication field in the DCI format of the first DCI type; and determining the new DCI length set to be the same as the DCI length set when it is determined not to stop detecting PDCCHs carrying DCIs of the first DCI type based on the allocation indication field in the DCI format of the first DCI type.

For example, in some implementations, the allocation indication field includes a first indication field, which indicates a total number of PDCCHs carrying DCIs of the first DCI type transmitted by the base station for all functional entities of the terminal.

For example, in some implementations, when a number of PDCCHs carrying DCIs of the first DCI type having been detected currently by the specific functional entity is equal to the total number of PDCCHs carrying DCIs of the first DCI type transmitted by the base station for all functional entities of the terminal, the specific functional entity determines to stop detecting PDCCHs carrying DCIs of the first DCI type, and, when the number of PDCCHs carrying DCIs of the first DCI type having been detected currently by the specific functional entity is smaller than the total number of PDCCHs carrying DCIs of the first DCI type transmitted by the base station for all functional entities of the terminal, the specific functional entity determines not to stop detecting PDCCHs carrying DCIs of the first DCI type.

For example, in some implementations, the allocation indication field includes a first indication field, which indicates whether to stop detecting PDCCHs carrying DCIs of the first DCI type.

For example, in some implementations, when the first indication field indicates to stop detecting PDCCHs carrying DCIs of the first DCI type, the specific functional entity determines to stop detecting PDCCHs carrying DCIs of the first DCI type, and, when the first indication field indicates not to stop detecting PDCCHs carrying DCIs of the first DCI type, the specific functional entity determines not to stop detecting PDCCHs carrying DCIs of the first DCI type.

For example, in some implementations, the first DCI type includes one or more DCI formats.

For example, in some implementations, each DCI format of the first DCI type includes one or more sub-DCI fields.

For example, in some implementations, the DCI format of the first DCI type further includes a bitmap field, which indicates a correspondence between the one or more sub-DCI fields and the plurality of functional entities.

For example, in some implementations, the DCI format of the first DCI type further includes a format indication field, which indicates that whether each sub-DCI field of the one or more sub-DCI fields included in the DCI format of the first DCI type is used for uplink data transmission, downlink data transmission or full-duplex data transmission respectively.

For example, in some implementations, the sub-DCI field for full-duplex data transmission further includes a secondary DCI field for uplink data transmission and a secondary DCI field for downlink data transmission.

For example, in some implementations, the first DCI type is a composite DCI type, and each DCI format of the composite DCI type has multiple sub-DCI fields.

For example, in some implementations, the first DCI type is a single DCI type, and each DCI format of the single DCI type has one sub-DCI field.

For example, in some implementations, the DCI length set includes a first DCI length and a second DCI length.

For example, in some implementations, the method further includes: if the new DCI length set is empty, the specific functional entity distributes all the sub-DCI fields on all the detected PDCCHs to corresponding functional entities.

According to at least one embodiment of the present disclosure, there is provided a method for transmitting a physical downlink control channel (PDCCH) by a base station to a terminal including a plurality of functional entities in a wireless communication system, the method including: generating one or more PDCCHs; and transmitting the one or more PDCCHs to the terminal, and wherein each PDCCH carries one DCI of one DCI type, and the one DCI of the one DCI type has one DCI length among a DCI length set including at least two different downlink control information (DCI) lengths, and DCI of each DCI type is of a same DCI length.

For example, in some implementations, a DCI format of the DCI type includes an allocation indication field, which is configured to indicate to the terminal whether to stop detecting PDCCHs carrying DCI of the DCI type.

For example, in some implementations, the allocation indication field includes a first indication field, which indicates a total number of PDCCHs carrying DCI of the DCI type transmitted by the base station for all functional entities of the terminal.

For example, in some implementations, the allocation indication field includes a first indication field, which is configured to indicate to the terminal whether to stop detecting PDCCHs carrying DCI of the DCI type.

For example, in some implementations, the DCI format of the DCI type includes one or more sub-DCI fields.

For example, in some implementations, the DCI format of the DCI type further includes a bitmap field, which is configured to indicate to the terminal a correspondence between the one or more sub-DCI fields and the plurality of functional entities.

For example, in some implementations, the DCI format of the DCI type further includes a format indication field, which is configured to indicate to the terminal whether each sub-DCI field of the one or more sub-DCI fields included in the DCI format of the DCI type is used for uplink data transmission, downlink data transmission or full-duplex data transmission respectively.

For example, in some implementations, the sub-DCI field for full-duplex data transmission further includes a secondary DCI field for uplink data transmission and a secondary DCI field for downlink data transmission.

For example, in some implementations the DCI type is a composite DCI type, and each DCI format of the composite DCI type has multiple sub-DCI fields.

For example, in some implementations, the DCI type is a single DCI type, and each DCI format of the single DCI type has one sub-DCI field.

For example, in some implementations, the DCI length set includes a first DCI length and a second DCI length.

According to at least one embodiment of the present disclosure, there is provided a terminal including a transceiver and a processor. The transceiver is configured to transmit and receive signals to and from external. The processor is configured to: detect a PDCCH at a current PDCCH candidate position based on each DCI length among a DCI length set including at least two different DCI lengths; determine a new DCI length set based on an allocation indication field in a DCI format of a first DCI type, when a PDCCH carrying DCI of the first DCI type is detected at the current PDCCH candidate position based on a first DCI length in the DCI length set; and detect the PDCCH at an undetected PDCCH candidate position based on each DCI length among the new DCI length set.

According to at least one embodiment of the present disclosure, there is provided a base station including a transceiver and a processor. The transceiver is configured to transmit and receive signals to and from external. The processor is configured to generate one or more PDCCHs and control the transceiver to transmit the generated one or more PDCCHs to the terminal.

BRIEF DESCRIPTION OF DRAWINGS

In order to more clearly illustrate the technical solutions of the embodiments of the present disclosure, the drawings of the embodiments will be briefly introduced below. Apparently, the drawings in the following description only relate to some embodiments of the present disclosure, rather than limiting the present disclosure. In the drawings:

FIG. 1 illustrate a schematic diagram of an example wireless network according to some embodiments of the present disclosure;

FIGS. 2A and 2B illustrate example wireless transmit and receive paths according to some embodiments of the present disclosure;

FIG. 3A illustrates an example user equipment (UE) according to some embodiments of the present disclosure;

FIG. 3B illustrates an example gNB according to some embodiments of the present disclosure;

FIG. 4A illustrates a schematic diagram of self-interference generation of network devices operating in a full duplex mode, according to some embodiments of the present disclosure;

FIG. 4B illustrates a schematic diagram of an inter-symbol interference problem when self-interference channel estimation is performed, according to some embodiments of the present disclosure;

FIGS. 5A and 5B illustrate a mapping manner for the first reference signal in the frequency domain and the time domain structure of a signal corresponding to the first reference signal, respectively, according to some embodiments of the present disclosure;

FIGS. 6A and 6B illustrate a mapping manner for the first reference signal in the frequency domain and the time domain structure of the signal corresponding to the first reference signal, according to some embodiments of the present disclosure;

FIGS. 7A and 7B illustrate a schematic diagram of a position of a detection window according to some embodiments of the present disclosure;

FIG. 8 illustrates a schematic diagram of the position of a muting symbol in a receive signal according to some embodiments of the present disclosure;

FIGS. 9A and 9B illustrate comb structures for a first reference signal used for self-interference channel estimation and a second reference signal at a corresponding position of a receive signal in a case of adopting the comb structures with a repetition factor of 2 according to some embodiments of the present disclosure;

FIG. 10 illustrates comb structures for a first reference signal and a second reference signal in a case where the repetition factor of the comb structures is 4 according to some embodiments of the present disclosure;

FIG. 11A illustrates an example of the position of a detection window according to some embodiments of the present disclosure, and FIG. 11B illustrates the subcarrier occupancy condition of a sequence within a detection window according to some embodiments of the present disclosure;

FIG. 12 illustrates a flowchart of a method for self-interference cancellation according to some embodiments of the present disclosure;

FIG. 13 illustrates a block diagram of an apparatus for self-interference cancellation according to some embodiments of the present disclosure;

FIG. 14 illustrates a block diagram of a configuration of a terminal according to some embodiments of the present disclosure;

FIG. 15 illustrates a block diagram of a configuration of a base station according to some embodiments of the present disclosure;

FIG. 16 illustrates a block diagram of a configuration of a wireless communication system according to some embodiments of the present disclosure;

FIG. 17 illustrates a block diagram of a configuration of an IAB node according to some embodiments of the present disclosure;

FIG. 18 illustrates a block diagram of the configuration of an IAB donor according to some embodiments of the present disclosure; and FIG. 19 illustrates a block diagram of a configuration of a wireless communication system according to some embodiments of the present disclosure.

FIG. 20 illustrates a full-duplex system according to some embodiments of the present disclosure.

FIG. 21 illustrates a method for transmitting a first physical signal by a first device in a wireless communication system according to some embodiments of the present disclosure.

FIG. 22 illustrates a method for transmitting a first physical signal by a first device in a wireless communication system according to seom embodiments of the present disclosure.

FIG. 23 illustrates a first frequency-domain mapping pattern according to some embodiments of the present disclosure.

FIG. 24 illustrates a reception window for self-interference channel estimation according to some embodiments of the present disclosure.

FIG. 25 illustrates a time-domain resource allocation according to some embodiments of the present disclosure.

FIG. 26 shows a second frequency-domain mapping pattern according to some embodiments of the present disclosure.

FIG. 27 illustrates a reception window for self-interference channel estimation according to some embodiments of the present disclosure.

FIG. 28 illustrates a time-domain mapping according to some embodiments of the present disclosure.

FIG. 29A illustrates a time-domain mapping according to some embodiments of the present disclosure.

FIG. 29B illustrates transmission and reception timings between nodes according to some embodiments of the present disclosure.

FIG. 29C illustrates transmission and reception timings between nodes according to some embodiments of the present disclosure.

FIG. 29D illustrates transmission and reception timings between nodes according to some embodiments of the present disclosure.

FIG. 29E illustrates transmission and reception timings between nodes according to some embodiments of the present disclosure.

FIG. 30 illustrates a block diagram showing a structure of a first device according to some embodiments of the present disclosure.

FIG. 31 illustrates a scenario in which a base station communicates with a terminal having a plurality of functional entities according to some embodiments of the present disclosure.

FIG. 32 illustrates a method for detecting a PDCCH in a wireless communication system by a terminal according to some embodiments of the present disclosure.

FIG. 33 illustrates a DCI format according to some embodiments of the present disclosure.

FIG. 34 illustrates a correspondence between a bit bitmap and functional entities according to some embodiments of the present disclosure.

FIG. 35 illustrates a flowchart showing a method for transmitting a PDCCH by a base station to a terminal including a plurality of functional entities according to some embodiments of the present disclosure.

FIG. 36 illustrates a block diagram showing a structure of a terminal according to some embodiments of the present disclosure.

FIG. 37 illustrates a block diagram showing a structure of a base station according to some embodiments of the present disclosure.

MODE FOR THE INVENTION

The following description with reference to the accompanying drawings is provided to assist in a comprehensive understanding of various embodiments of the present disclosure as defined by the claims and their equivalents. The following description includes various specific details to assist understanding, but these are merely exemplary. Accordingly, those skilled in the art will recognize that various changes and modifications may be made to the various embodiments described herein without departing from the scope of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Therefore, it will be apparent to those skilled in the art that the following descriptions of the various embodiments of the present disclosure are provided for illustrative purposes only and are not intended to limit the present disclosure as defined by the appended claims and their equivalents.

Unless otherwise defined, the technical or scientific terms used in the present disclosure shall have the ordinary meanings understood by those having ordinary skills in the field to which the invention belongs. The terms "first", "second", and the like used in this disclosure do not indicate any order, quantity, or importance, but are only used to distinguish different components. Similarly, "a", "an", or "the" and the like do not indicate a limit on quantity, but rather indicate that there is at least one. Words such as "including" or "comprising" mean that the element or item appearing before the word encompasses the element or item appearing after the word and the equivalent thereof without excluding other elements or items. Words such as "connected" or "interconnected" are not limited to physical or mechanical connections, but may include electrical connections, whether direct or indirect. "Upper", "lower", "left", "right", etc. are only used to indicate the relative positional relationship, and in a case where the absolute position of the object to be described is changed, the relative positional relationship may also be changed accordingly.

The advantages and features of one or more embodiments of the present disclosure and implementation methods thereof can be more easily understood by referring to the following detailed description of the embodiments and the accompanying drawings. In this regard, the embodiment may have different forms and should not be construed as being limited to the descriptions set forth herein. Rather, these embodiments are provided so that this disclosure will be thorough and complete, and will fully convey the concept of the embodiments to those skilled in the art, and the scope of protection of this disclosure will be limited only by the appended claims.

Here, it will be understood that a flowchart or a combination of blocks in a process flowchart may be executed by computer program instructions. These computer program instructions can be loaded into a processor of a general purpose computer, special purpose computer, or another programmable data processing device, so the instructions executed by a computer or a processor of another programmable data processing device are created for execution unit of functions described in flowchart block(s). Computer program instructions may be stored in a computer-usable or computer-readable memory capable of directing a computer or another programmable data processing device to perform a function in a particular manner, and therefore, instructions stored in the computer-usable or computer-readable memory can also produce manufacturing items that contain instruction units for performing the functions described in the flowchart block. Computer program instructions may also be loaded into a computer or another programmable data processing device, and therefore, in a case where a series of operations are performed in the computer or the other programmable data processing device, instructions of the computer or the other programmable data processing device operated by generating a process performed by the computer can provide operations for performing the functions described in the flowchart block.

In addition, each block may represent module, segment, or portion of code, where the module, segment, or code includes one or more executable instructions for performing specified logical function(s). It should also be noted that in some alternative implementations, the functions mentioned in the block may not appear in order. For example, two blocks shown in sequence may in fact be executed concurrently, or the blocks may sometimes be executed in a reverse order according to corresponding functions.

The term "unit" in an embodiment of the present disclosure means a software component or a hardware component (such as a field programmable gate array (FPGA) or an application specific integrated circuit (ASIC)) that performs a specific function. However, the term "unit" is not limited to software or hardware. A "unit" may be formed to be in an addressable storage medium or may be formed to operate one or more processors. Thus, for example, the term "unit" may refer to components such as software components, object-oriented software components, class components, and task components, and may include procedures, functions, properties, programs, sub-routines, program code segments, drivers, firmware, microcode, circuits, data, databases, data structures, tables, arrays, or variables. The functions provided by components and "units" can be associated with fewer components and "units", or can be divided into additional components and "units". In addition, components and "units" may be embodied as reproducing one or more central processing units (CPUs) in a device or a secure multimedia card. Furthermore, in embodiments, a "unit" may include at least one processor.

In the description of the present disclosure, when it is considered that some detailed explanations about functions or configurations may unnecessarily obscure the essence of the present disclosure, these detailed explanations will be omitted. All terms (including descriptive or technical terms) used herein should be interpreted as having apparent meanings to those of ordinary skill in the art. However, these terms may have different meanings according to the intention of those of ordinary skill in the art, precedents or the emergence of new technologies, and therefore, the terms used herein must be defined based on the meanings of these terms together with the description throughout the specification. Hereinafter, for example, the base station may be at least one of the following: a gNode B, an eNode B, a Node B, a radio access unit, a base station controller, and a node on a network. The terminal may include a user equipment (UE), a mobile station (MS), a mobile phone, a smart phone, a computer or multimedia system capable of performing communication functions. In some embodiments of the present disclosure, the downlink (DL) is a wireless transmission path through which signals are transmitted from a base station to a terminal, and the uplink (UL) is a wireless transmission path through which signals are transmitted from the terminal to the base station. In some embodiments of the present disclosure, considering the application in an IAB scenario, an IAB node (for example, an IAB MT or LAB) serves as a relay between an IAB donor (or an IAB base station or a donor base station) and a terminal. In this case, for convenience of description, for signal transmission between an IAB node and an IAB donor, the downlink (DL) may refer to a wireless transmission path through which signals are transmitted from the IAB donor to the IAB node, and the uplink (UL) may refer to a wireless transmission path through which signals are transmitted from the IAB node to the IAB donor. In addition, one or more embodiments of the present disclosure may be applied to 5G wireless communication technologies (5G, new radio (NR)) developed after LTE-A, or to new wireless communication technologies proposed on the basis of 4G or 5G (for example, B5G (beyond 5G) or 6G).

Hereinafter, one or more embodiments of the present disclosure will be described with reference to the accompanying drawings.

FIG. 1 illustrates an example wireless network according to some embodiments of the present disclosure. The embodiment of the wireless network shown in FIG. 1 is for illustration only. Other embodiments of the wireless network 100 can be used without departing from the scope of this disclosure.

The wireless network includes an gNodeB (gNB) 101, an gNB 102, and an gNB 103. The gNB 101 communicates with the gNB 102 and the gNB 103. The gNB 101 also communicates with at least one internet protocol (IP) 130, such as the Internet, a proprietary IP network, or other data network.

Depending on the network type, other well-known terms such as "base station" or "access point" can be used instead of "gNodeB" or "gNB." For the sake of convenience, the terms "gNodeB" and "gNB" are used in this patent document to refer to network infrastructure components that provide wireless access to remote terminals. Also, depending on the network type, other well-known terms such as "mobile station," "subscriber station," "remote terminal," "wireless terminal," or "user device" can be used instead of the term "user equipment" or "UE". For example, the terms "terminal," "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, WiFi, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As will be described in more detail below, one or more of the gNB 101, the gNB 102, and the gNB 103 includes a 2D antenna array as described in embodiments of the present disclosure. In some embodiments, one or more of gNB 101, gNB 102, and gNB 103 supports codebook design and structure for a system with a 2D antenna array.

Although FIG. 1 illustrates one example of a wireless network, various changes may be made to FIG. 1. For example, the wireless network can include any number of gNBs and any number of UEs in any suitable arrangement. Also, the gNB 101 can communicate directly with any number of UEs and provide those UEs with wireless broadband access to the network 130. Similarly, each of the gNBs 102-103 can communicate directly with the network 130 and provide UEs with direct wireless broadband access to the network 130. Further, the gNBs 101, 102, and/or 103 can provide access to other or additional external networks, such as external telephone networks or other types of data networks.

FIGS. 2A and 2B illustrate example wireless transmit and receive paths according to some embodiments of the present disclosure. In the following description, a transmit path 200 can be described as being implemented in a gNB, such as the gNB 102, and a receive path 250 can be described as being implemented in a UE, such as the UE 116. However, it should be understood that the receive path 250 can be implemented in an gNB and the transmit path 200 can be implemented in a UE. In some embodiments, the receive path 250 is configured to support codebook design and structure for a system with a 2D antenna array as described in embodiments of the present disclosure.

The transmit path 200 includes a channel coding and modulation block 205, a serial-to-parallel (S-to-P) block 210, a size N inverse fast fourier transform (IFFT) block 215, a parallel-to-serial (P-to-S) block 220, an add cyclic prefix block 225, and an up-converter (UC) 230. The receive path circuitry 250 comprises a down-converter (DC) 255, a remove cyclic prefix block 260, a serial-to-parallel (S-to-P) block 265, a size N fast fourier transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding) and modulates the input bits (such as with quadrature phase shift keying (QPSK) or quadrature amplitude modulation (QAM)) to generate a sequence of frequency-domain modulation symbols. The serial-to-parallel block 210 converts (i.e., de-multiplexes) the serial modulated symbols to parallel data to generate N parallel symbol streams where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 to generate a serial time-domain signal. The add cyclic prefix block 225 inserts a cyclic prefix to the time-domain signal. The up-converter 230 modulates (such as up-converts) the output of the add cyclic prefix block 225 to RF frequency for transmission via a wireless channel. The signal may also be filtered at baseband before conversion to RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as discrete fourier transform (DFT) and inverse discrete fourier transform (IDFT) functions, can be used. It will be appreciated that the value of the variable N may be any integer number (such as 1, 2, 3, 4, or the like) for DFT and IDFT functions, while the value of the variable N may be any integer number that is a power of 2 (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

FIG. 3A illustrates an example UE 116 according to some embodiments of the present disclosure. The embodiment of the UE 116 illustrated in FIG. 3A is for illustration only, and the UEs 111-115 of FIG. 3A can have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and a receive (RX) processing circuitry 325. The UE 116 also includes a speaker 330, a processor/controller 340, an input/output (I/O) interface (IF) 345, an input device 350, a display 355, and a memory 360. The memory 360 includes a basic operating system (OS) program 361 and one or more applications 362.

The RF transceiver 310 receives, from the antenna 305, an incoming RF signal transmitted by an gNB of the wireless network 100. The RF transceiver 310 down-converts the incoming RF signal to generate an intermediate frequency (IF) or baseband signal. The IF or baseband signal is transmitted to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor/controller 340 for further processing (such as for web browsing data).

The TX processing circuitry 315 receives analog or digital voice data from the microphone 320 or other outgoing baseband data (such as web data, e-mail, or interactive video game data) from the processor/controller 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor/controller 340 can include one or more processors or other processing devices and execute the basic OS 361 stored in the memory 360 in order to control the overall operation of the UE 116. For example, the processor/controller 340 can control the reception of forward channel signals and the transmission of reverse channel signals by the RF transceiver 310, the RX processing circuitry 325, and the TX processing circuitry 315 in accordance with well-known principles. In some embodiments, the processor/controller 340 includes at least one microprocessor or microcontroller.

The processor/controller 340 is also capable of executing other processes and programs resident in the memory 360, such as operations for channel quality measurement and reporting for a system having a 2D antenna array as described in embodiments of the present disclosure. The processor/controller 340 can move data into or out of the memory 360 as required by an executing process. In some embodiments, the processor/controller 340 is configured to execute the applications 362 based on the OS 361 or in response to a signal received from a gNB or an operator. The processor/controller 340 is also coupled to the I/O interface 345, which provides the UE 116 with the ability to connect to other devices such as a laptop computer and a handheld computer. The I/O interface 345 is the communication path between these accessories and the processor/controller 340.

The processor/controller 340 is also coupled to an input device(s) 350 and a display 355. The operator of the UE 116 can use the input device(s) 350 to enter data into the UE 116. The display 355 may be a liquid crystal display or other display capable of rendering text and/or at least limited graphics, such as from web sites. The memory 360 is coupled to the processor/controller 340. Portion of the memory 360 can include a random access memory (RAM), and another portion of the memory 360 can include a Flash memory or other read-only memory (ROM).

Although FIG. 3A illustrates one example of UE 116, various changes may be made to FIG. 3A. For example, various components in FIG. 3A can be combined, further subdivided, or omitted and additional components can be added according to particular needs. As a particular example, the processor/controller 340 can be divided into multiple processors, such as one or more central processing units (CPUs) and one or more graphics processing units (GPUs). Also, while FIG. 3A illustrates the UE 116 configured as a mobile telephone or smartphone, UEs can be configured to operate as other types of mobile or stationary devices.

FIG. 3B illustrates an example gNB 102 according to some embodiments of the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of this disclosure to any particular implementation of an gNB. It is noted that gNB 101 and gNB 103 can include the same or similar structure as gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. For instance, the controller/processor 378 can perform the blind interference sensing (BIS) process, such as performed by a BIS algorithm, and decodes the received signal subtracted by an interfering signal. Any of a wide variety of other functions can be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for a system having a 2D antenna array as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as portion of a cellular communication system (such as one supporting 5G, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. Portion of the memory 380 can include a RAM, and another portion of the memory 380 can include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) support communication with aggregation of FDD cells and TDD cells.

Although FIG. 3B illustrates one example of an gNB 102, various changes may be made to FIG. 3B. For example, the gNB 102 can include any number of each component shown in FIG. 3. As a particular example, an access point can include a number of interfaces 382, and the controller/processor 378 can support routing functions to route data between different network addresses. As another particular example, while shown as including a single instance of TX processing circuitry 374 and a single instance of RX processing circuitry 376, the gNB 102 can include multiple instances of each (such as one per RF transceiver).

Exemplary embodiments of the present disclosure are further described below with reference to the accompanying drawings. The following methods and apparatuses of the present disclosure can be implemented in a communication system supporting 6G or 5G or new radio access technologies or NR, LTE or LTE-A, etc.

Text and drawings are provided as examples only to help readers understand the present disclosure. They are not intended and should not be interpreted as limiting the scope of this disclosure in any way. Although certain embodiments and examples have been provided, based on the present disclosure herein, it will be apparent to those skilled in the art that changes may be made to the shown embodiments and examples without departing from the scope of the present disclosure.

In order to meet the growing demand of mobile services, it is necessary to propose new wireless communication technologies (e.g., B5G and 6G) based on 4G or 5G wireless communication systems to further improve the transmission rate and throughput of wireless communication systems. The improvement of duplex technology is an important means to further improve the transmission rate and throughput of wireless communication system. Duplex technologies adopted by existing systems and protocols include frequency division multiplexing (FDM) and time division multiplexing (TDM). However, neither FDM nor TDM can fully utilize the available time-frequency resources, and their resource utilization efficiency is less than 50%.

In order to improve resource utilization efficiency, the flexible (or dynamic) time division duplex (TDD) technology may be adopted, that is, the transmission direction (uplink or downlink) for each slot may be flexibly changed according to factors such as service data or demand. By configuring the transmission direction of slots in a semistatic or dynamic way, the flexibility of time-frequency resource allocation can be improved, thereby the system performance can be improved.

In addition, the full duplex technology may also be adopted to improve resource utilization efficiency. Unlike the traditional half-duplex system, which uses orthogonal division in the time domain (e.g., time division duplex (TDD)) or frequency domain (e.g., frequency division duplex (FDD)) for the uplink (UL) and downlink (DL), the full-duplex system may allow the uplink and downlink for a network device (e.g., a terminal) to be simultaneously transmitted in the same resource. Therefore, the full duplex system can theoretically achieve twice the throughput of the half-duplex system. However, when the uplink and downlink are in the same frequency at the same time, the transmit signal of the full duplex system will cause strong self-interference to the receive signal. In some cases, the self-interference signal is even about 120 dB higher than the noise floor. Therefore, in order to make the full duplex system work, it is necessary to cancel the self-interference so that the power of the self-interference signal is at least reduced to the same level as the noise floor.

Hereinafter, some embodiments of a method and apparatus for self-interference cancellation among some embodiments of the present disclosure will be described with reference to FIGS. 4A to 19.

FIG. 4A illustrates a schematic diagram of self-interference generation of a network device operating in the full duplex mode according to some embodiments of the present disclosure. In FIG. 4A, the network device 40 may include a terminal, a base station, a backhaul link node, a relay link node or other full-duplex devices. For example, the network device may include an IAB node, an IAB access point (e.g., IAB-AU), or an IAB donor.

For example, in the full duplex mode, the network device can simultaneously transmit and receive data signals on the same time-frequency resource.

Referring to FIG. 4A, due to a self-interference of a transmit signal, a signal received by the network device operating in the full duplex mode may include a self-interference signal and a receive signal.

It should be noted that, in the embodiments of the present disclosure, if not otherwise defined, for convenience of description, a transmit signal may refer to a signal transmitted to another network device through a communication link, and a receive signal may refer to a signal received from another network device through a communication link. In addition, a self-interference signal may refer to the interference of a transmit signal on a receive signal.

For example, in the case where the network device 40 that is a terminal communicates with a base station (e.g., an IAB node), the receive signal may refer to a signal received by the terminal from the base station through the downlink, and the transmit signal may refer to a signal transmitted by the terminal to the base station through the uplink.

For example, in a case where the network device 40 that is a base station (e.g., an IAB node) communicates with a terminal, the receive signal may refer to a signal received by the base station from the terminal through the uplink, and the transmit signal may refer to a signal transmitted by the base station to the terminal through the downlink.

For example, when the network device 40 that is an IAB node communicates with an IAB donor, the receive signal may refer to a signal received by the IAB node from the IAB donor through the downlink, and the transmit signal may refer to a signal transmitted by the IAB node to the IAB donor through the uplink.

For example, in a case where the network device 40 that is an IAB donor communicates with an IAB node, the receive signal may refer to a signal received by the IAB donor from the IAB node through the uplink, and a transmit signal may refer to the signal transmitted by the IAB donor to the IAB node through the downlink.

In general, taking into account that the amplitude of the self-interference signal is much larger than the noise floor or even the receive signal, the self-interference cancellation needs multi-level cancellation to minimize the influence of the self-interference signal on the receive signal. The traditional self-interference cancellation includes the antenna domain cancellation, the radio frequency domain cancellation and the digital domain cancellation. The antenna domain cancellation is used to directly reduce the power of self-interference signal received by the receive antenna through a reasonable antenna isolation design. The radio frequency domain cancellation continues to cancel the residual self-interference signal, ensuring that the power delivered to the filter, analog-digital convertor (ADC) and mixer is low, thus not saturating the device. For the digital domain cancellation, the residual self-interference after the antenna domain cancellation and radio frequency domain cancellation is received, so that the power of the canceled self-interference signal is as close to the noise floor as possible. For example, the digital self-interference cancellation may include: estimating the self-interference channel; reconstructing the residual self-interference signal in the digital domain based on the estimated self-interference channel and the transmitted self-interference signal; and subtracting the reconstructed signal from the signal received, in order to complete digital self-interference cancellation. Therefore, the accuracy of digital self-interference cancellation may depend on the accuracy of digital self-interference channel estimation.

When self-interference channel estimation is performed, there may be an inter-symbol interference problem. The inter-symbol interference problem existing when self-interference channel estimation is performed will be described with reference to FIG. 4B below.

FIG. 4B illustrates a schematic diagram of an inter-symbol interference problem when self-interference channel estimation is performed according to some embodiments of the present disclosure.

There is a time delay when the signal is transmitted in the wireless transmission environment. If the transmit signal and the receive signal are aligned (i.e., the symbol boundaries of the transmit signal and the receive signal are aligned) at the network device 40 operating in the full duplex mode, another network device communicating with the network device 40 needs to make the transmit signal ahead of the receive signal. For example, in wireless communication, the timing advance (TA) can be used to realize that the transmit signal is ahead of the receive signal. When one of the network device 40 and the other network device performs digital self-interference channel estimation with time misalignment, the inter-symbol interference problem may occur, which will seriously affect the accuracy of channel estimation of the self-interference channel.

As shown in FIG. 4B, due to timing misalignment, the timing of the self-interference signal is ahead of the receive signal. Therefore, if the position of the detection window is determined according to the timing of the transmit signal (i.e., the timing of the self-interference signal), two adjacent received data symbols will be included in the detection window at the same time, resulting in the inter-symbol interference problem. If the position of the detection window is determined according to the receive signal, a complete transmit data symbol cannot be included in the detection window, which will also result in the inter-symbol interference problem.

The inter-symbol interference problem described above may exist in a terminal, a base station, a backhaul link node or a relay link node. For example, the inter-symbol interference problem described above may exist in an IAB node, an IAB access point (e.g., IAB-AU), or an IAB donor.

In order to solve at least the above problems, embodiments of the present disclosure provide a design method for a reference signal. The reference signal can be used for self-interference channel estimation, for example. In addition, the embodiments of the present disclosure also provide a method for performing self-interference channel estimation based on the reference signal. Hereinafter, for convenience of description, a reference signal used for self-interference channel estimation will refer to a first reference signal.

FIGS. 5A and 6A illustrate a mapping manner of a first reference signal in the frequency domain according to some embodiments of the present disclosure. FIGS. 5B and 6B illustrate a time domain structure of a signal corresponding to a first reference signal according to some embodiments of the present disclosure.

In embodiments of the present disclosure, a comb structure in the frequency domain may be adopted for the first reference signal. That is, the frequency domain resources (or frequency domain positions) for the first reference signal may have a comb structure. For example, the comb structure in the frequency domain may mean that the occupied subcarriers are arranged at equal intervals. A subcarrier between adjacent occupied subcarriers is a muting subcarrier. The signal may not be mapped to muting subcarriers. In this case, the difference between indexes of two adjacent occupied subcarriers can be defined as the repetition factor of the comb structure. That is, the repetition factor of the comb structure is the interval between two adjacent occupied subcarriers plus 1.

In addition, FFT or DFT may be considered to have the following properties. For a signal of which frequency domain resources have the comb structure, if the size of IFFT or FFT is an integral multiple of the repetition factor, after the signal is processed by IDFT or IFFT and added a cyclic prefix (CP), a corresponding time domain signal is obtained. A symbol of the corresponding time domain signal includes repeated portions. Therefore, when the first reference signal adopts the comb structure in the frequency domain as mentioned above, the symbol of the corresponding time domain signal, which is obtained after the first reference signal is processed by IDFT or IFFT and added the CP, includes repeated portions.

Referring to FIG. 5A, the repetition factor of the comb structure shown in FIG. 5A is 2, that is, the interval between two adjacent occupied subcarriers is 1. In this case, a time domain signal (i.e., the corresponding time domain signal obtained after IDFT or IFFT (of which the size is a power of 2) and adding a CP) corresponding to a first reference signal has a structure as shown in FIG. 5B. Referring to FIG. 5B, the corresponding time domain signal includes two portions (portion 1 and portion 2) except for the CP, and the two portions are completely identical. That is, the portion 2 is a repetition of the portion 1.

Referring to FIG. 6A, the repetition factor of the comb structure shown in FIG. 6A is 4, that is, the interval between two adjacent occupied subcarriers is 3. In this case, a time-domain signal (that is, the corresponding time-domain signal obtained after IDFT or IFFT (of which the size is a power of 2) and adding a CP) corresponding to a first reference signal has a structure as shown in FIG. 6B. Referring to FIG. 6B, the corresponding time-domain signal includes four portions (portion 1, portion 2, portion 3, and portion 4) except for the CP, and the four portions are completely identical. That is, the portion 2, the portion 3, and the portion 4 are all repetitions of the portion 1.

When the first reference signal having the comb structure in the frequency domain as described above is adopted, a detection window having a length shorter than the symbol length (for example, OFDM symbol length) may be adopted when receiving a signal. For example, a detection window having a length half of the OFDM symbol length may be adopted. In this case, if the repetition factor of the first reference signal is 4, the detection window may include two identical portions (sequences) (as shown in FIG. 7A), and the corresponding frequency domain structure is a comb structure with a repetition factor of 2, which corresponds to the length of the original sequence. Alternatively, a detection window having a length of ¼ of the OFDM symbol length may also be adopted. In this case, the detection window may include one of two identical sequences (as shown in FIG. 7B), and the corresponding frequency domain structure is a comb structure with a repetition factor of 1, which corresponds to ¼ of the length of the original sequence. In embodiments of the present disclosure, the OFDM symbol length may refer to, for example, the length of the OFDM symbol excluding the CP length.

As mentioned above, for the first reference signal with a repetition factor of 4, whether a detection window with a length of half of the OFDM symbol or a detection window with a length of ¼ of the OFDM symbol is adopted, the whole reference signal sequence in the time domain is capable of being truncated within the detection window. Therefore, the design method for the reference signal provided by the embodiments of the present disclosure can effectively improve the accuracy of self-interference channel estimation.

It should be noted that the mapping manners of the first reference signal in the frequency domain described above with reference to FIGS. 5A, 5B, 6A, and 6B are only examples. On this basis, various changes can be made. For example, the value of the repetition factor may be changed.

In some implementations, the repetition factor may be an integer power of 2. That is, the repetition factor can be $2_k$, where k is a positive integer. By setting the repetition factor of the first reference signal to an integer power of 2, it can be ensured that the symbol of the corresponding time domain signal has a structure including a plurality of repeated portions.

In some implementations, the first reference signal may be generated based on a Zadoff-Chu (ZC) sequence (or ZC root sequence).

For example, the ZC root sequence may be expressed by the following equation:

$$x_q(m) = e^{-j\frac{\pi q m(m+1)}{N_{ZC}}}$$

In the above equation, $x_q(m)$ represents the m-th value of ZC root sequence, and $N_{zc}$ represents the length of ZC root sequence. For example, $N_{zc}$ and q can be configured by the base station.

In some implementations, the first reference signal may be generated based on a pseudo-random sequence. For example, the pseudo-random sequence may include a Gold sequence.

For example, the Gold sequence may be expressed by the following equation:

$c(n)=(x_1(n+N_c)+x_2(n+N_c))\bmod 2$

In the above equation, $n_c$ is a fixed parameter, and $x_1$ and $x_2$ represent two m-sequences. In a case of adopting m-sequences with 31 bits, the expressions of $x_1$ and $x_2$ may be expressed as:

$x_1(n+31)=(x_1(n+3)+x_1(n))\bmod 2$, $x_2(n+31)=(x_2(n+3)+x_2(n+2)+x_2(n+1)+x_2(n))\bmod 2$ In the above equation, the initial value of sequence $x_1$ may be set as $x_1(0)=1$, $x_1(n)=0, n=1,2,3, \ldots, 30$, and the initial value of sequence $x_2$ may be configured by the base station.

In some implementations, when the design for the reference signal used for self-interference channel estimation in the previously described embodiments of the present disclosure is adopted, a time domain channel estimation method may be adopted for the self-interference channel estimation. For example, the self-interference channel may be estimated based on minimum mean square estimation (MMSE) in the time domain or based on a Rake receiver, in order to obtain the estimation of the self-interference channel. After the self-interference channel estimation is completed, the self-interference signal may be reconstructed based on the self-interference channel estimation and the transmitted time-domain signal. The reconstructed time-domain self-interference signal is then subtracted from the received time-domain signal (including the receive signal and the self-interference signal) to obtain the result after digital self-interference cancellation.

The design method for the reference signal (i.e., the first reference signal) used for self-interference channel estimation according to some embodiments of the present disclosure is described above.

Continuing to refer to FIGS. 4A and 4B, in order to reduce the influence of inter-symbol interference on the accuracy of self-interference channel estimation, the receive signal may also be processed accordingly to further improve the accuracy of digital self-interference cancellation, in addition to the design for the reference signal used for self-interference channel estimation (i.e., the first reference signal) (i.e., the reference signal design for the self-interference channel of the transmit signal).

On the basis of this, some embodiments of the present disclosure provide a method for configuring a muting symbol in a receive signal. For example, the influence of inter-symbol interference on the accuracy of self-interference channel estimation caused by timing misalignment may be reduced by using muting symbols.

A method for configuring a muting symbol in a receive signal according to some embodiments of the present disclosure will be described with reference to FIG. 8.

It may be ensured that a time domain index (e.g., a symbol index, a slot index or a mini-slot index) of a muting symbol in the receive signal is consistent with a time domain index of the first reference signal used for self-interference channel estimation, that is, the time domain index of the muting symbol in the receive signal corresponds to the time domain index of the first reference signal, thereby reducing the influence of inter-symbol interference on the accuracy of self-interference channel estimation caused by timing misalignment. For example, referring to FIG. 8, the time domain index #n of the muting symbol in the receive signal is the same as the time domain index #n of the first reference signal.

In some implementations, the time domain position of the muting symbol in the receive signal may be configured such that the time domain position of the muting symbol corresponds to the time domain position of the first reference signal used for self-interference channel estimation. For example, the time domain index of the muting symbol in the receive signal may be directly configured such that the time domain index of the muting symbol is consistent with the time domain index of the first reference signal used for self-interference channel estimation. Some exemplary configuration methods in different communication scenarios will be described below.

A situation where a base station communicates with a terminal and the base station operates in the full duplex mode is considered. For the uplink transmission (uplink reception) from the terminal to the base station, a transmit signal (a downlink transmit signal) is a self-interference signal. In this case, the base station may configure a time domain position of a muting symbol in an uplink signal (an uplink transmit signal), through downlink control information in a downlink control channel or through a higher layer signaling. For example, the time domain index of the muting symbol may be configured in the downlink control information or the higher layer signaling.

Similarly, a situation where an IAB donor communicates with an IAB node and the IAB donor operates in the full duplex mode is considered. For the uplink transmission (uplink reception) from the IAB node to the IAB donor, a transmit signal (a downlink transmit signal) is a self-interference signal. In this case, the IAB donor may configure a time domain position of a muting symbol in an uplink signal (an uplink transmit signal), through downlink control information in a downlink control channel or through a higher layer signaling. For example, the time domain index of the muting symbol may be configured in the downlink control information or the higher layer signaling.

A situation where a terminal communicates with a base station and the terminal operates in the full duplex mode is considered. For the downlink transmission (downlink reception) from the base station to the terminal, a transmit signal (an uplink transmit signal) is a self-interference signal, and a downlink signal is a receive signal. In this case, a time domain position of a muting symbol in the downlink signal may be configured in downlink control information in a downlink control channel or configured in a higher layer signaling. For example, the time domain index of the muting symbol may be configured in the downlink control information or in the higher layer signaling. The terminal may determine the time domain index of the first reference signal in the uplink transmit signal used for self-interference channel estimation based on the time domain index of the muting symbol.

Similarly, a situation where an IAB node communicates with an IAB donor and the IAB node operates in the full duplex mode is considered. For the downlink transmission (downlink reception) from the IAB donor to the IAB node, a transmit signal (uplink transmit signal) is a self-interference signal, and a downlink signal is a receive signal. In this case, a time domain position of a muting symbol in the downlink signal may be configured in downlink control information in a downlink control channel or configured in a higher layer signaling. For example, the time domain index of the muting symbol may be configured in the downlink control information or in the higher layer signaling. The IAB node may determine the time domain index of the first reference signal in the uplink transmit signal used for self-interference channel estimation based on the time domain index of the muting symbol.

In the examples of the configuration method described above, several possible modes for indexing muting symbols may be predefined or predetermined, and when it is configured by a base station or an IAB donor, the time domain indexes of muting symbols may be configured by configuring and/or signaling the corresponding mode for indexing the muting symbols.

In some implementations, the time domain position of the first reference signal for self-interference channel estimation may be configured, and the time domain position of the muting symbol in the receive signal may be determined based on the time domain position of the first reference signal. For example, the time domain index of the first reference signal for self-interference channel estimation may be configured, and the time domain index of the muting symbol in the receive signal may be determined according to the time domain index of the first reference signal, and the corresponding rate adaptation operation may be performed. Some exemplary configuration methods in different communication scenarios will be described below.

A situation where a base station communicates with a terminal and the base station operates in the full duplex mode is considered. For the uplink transmission (uplink reception) from the terminal to the base station, a transmit signal (a downlink transmit signal) is a self-interference signal. In this case, the base station may configure and/or signal a time domain index through downlink control information in a downlink control channel or through a higher layer signaling, where the first reference signal for self-interference channel estimation is transmitted on a symbol corresponding to the time domain index. After receiving the configuration information on the time domain index, the terminal may determine an uplink transmit signal based on the configuration information. For example, the terminal may set the symbol corresponding to the time domain index as a muting symbol in the uplink transmit signal, and perform the rate adaptation operation.

Similarly, a situation where an IAB donor communicates with an IAB node and the IAB donor operates in the full duplex mode is considered. For the uplink transmission (uplink reception) from the IAB node to the IAB donor, a transmit signal (a downlink transmit signal) is a self-interference signal. In this case, the IAB donor may configure and/or signal a time domain index, through downlink control information in a downlink control channel or through a higher layer signaling, where the first reference signal for self-interference channel estimation is transmitted on a symbol corresponding to the time domain index. After receiving the configuration information on the time domain index, the IAB node may determine an uplink transmit signal based on the configuration information. For example, the IAB node may set the symbol corresponding to the time domain index as a muting symbol in the uplink transmit signal, and perform the rate adaptation operation.

A situation where a terminal communicates with a base station and the terminal operates in the full duplex mode. For the downlink transmission (downlink reception) from the base station to the terminal, a transmit signal (uplink transmit signal) is a self-interference signal, and a downlink signal is a receive signal. In this case, the base station may configure and/or signal a time domain index of the first reference signal in the uplink transmit signal used for self-interference channel estimation, through downlink control information in a downlink control channel or through a higher layer signaling. The terminal may acquire a position of a muting symbol in the downlink signal based on the configured time domain index of the first reference signal, and perform digital self-interference cancellation and reception for the downlink signal.

Similarly, a situation where an IAB node communicates with an IAB donor and the IAB node operates in the full duplex mode is considered. For the downlink transmission (downlink reception) from the IAB donor to the IAB node, a transmit signal (an uplink transmit signal) is a self-interference signal, and a downlink signal is a receive signal. In this case, the IAB donor may configure and/or signal a time domain index of the first reference signal used for self-interference channel estimation in the uplink transmit signal through downlink control information in a downlink control channel or through a higher layer signaling. The IAB node may acquire a position of a muting symbol in the downlink signal based on the configured time domain index for the first reference signal, and perform digital self-interference cancellation and reception for the downlink signal.

In some implementations, when the number of symbols of the first reference signal used for self-interference channel estimation in the same slot is more than one, the position of the first reference signal may be indicated in a bitmap manner. For example, a bit sequence may be used as a bitmap indicating the position of the first reference signal. Some examples for indicating the position of the first reference signal using a bit sequence are described below.

A bit sequence of $b=[b_0, b_1, \ldots, b_{nslot}]$ may be defined, where nslot is the number of symbols in the slot, and the element of $b_i$ in the bit sequence is "0" or "1". In an example, if $b_i$ is "0", it means the symbol at the corresponding position is not used for self-interference channel estimation; and if $b_i$ is "1", it means the symbol at the corresponding position is used for self-interference channel estimation.

For example, for a network device adopting full-duplex mode, information indicated by elements in the bit sequence of b is as above, and for a network device not adopting full-duplex mode, the element of "0" in bit sequence b may indicate that the symbol at the corresponding position is not specially treated, and the element of "1" may indicate that the symbol at the corresponding position is a muting symbol.

For example, if two network devices (a first network device and a second network device) in communication both adopt the full-duplex mode, two bit sequences need to be configured. In an example, for the first network device, a bit sequence of $b_1$ is configured. For the first network device, the element of "0" in the bit sequence $b_1$ indicates that the symbol at the corresponding position is not used for self-interference channel estimation, and the element of "1" in the bit sequence $b_1$ indicates that the symbol at the corresponding position is used for self-interference channel estimation; for the second network device, the element of "0" in the bit sequence $b_1$ indicates that the symbol at the corresponding position is not special treated, and the element of "1" in the bit sequence $b_1$ indicates that the symbol at the corresponding position is a muting symbol. In this example, for the second network device, a bit sequence of $b_2$ is configured. For the second network device, the element of "0" in the bit sequence $b_2$ indicates that the symbol at the corresponding position is not used for self-interference channel estimation, and the element of "1" in the bit sequence $b_2$ indicates that the symbol at the corresponding position is used for self-interference channel estimation; for the first network device, the element of "0" in the bit sequence $b_2$ indicates that the symbol at the corresponding position is not specially treated, and the element of "1" in the bit sequence $b_2$ indicates that the symbol at the corresponding position is a muting symbol.

The method for configuring muting symbols in a receive signal according to some embodiments of the present disclosure is described above. By configuring the muting symbols in the receive signal, the influence of inter-symbol interference on the accuracy of self-interference channel estimation caused by timing misalignment can be reduced. However, the allocation of muting symbols may affect the efficiency of resource utilization, thereby affecting the data rate of the system. To solve at least this problem, some embodiments of the present disclosure also provide a method for designing a reference signal for a receive signal.

A method for designing a reference signal for a receive signal according to some embodiments of the present disclosure will be described with reference to FIGS. 9A, 9B, 10, 11A and 11B.

In some embodiments of the present disclosure, for a first reference signal used for self-interference channel estimation, the design method for the first reference signal in various embodiments described above may be adopted; for the receive symbol in the receive signal corresponding to the symbol carrying the first reference signal in the transmit signal (hereinafter, referred to as the corresponding position of the receive signal), a frequency domain structure similar to that of the first reference signal may be adopted. That is, at the corresponding position of the receive signal, a second reference signal of which frequency domain resources (frequency domain positions or frequency domain structure) have the comb structure may be adopted. Hereinafter, for convenience of description, the reference signal at corresponding position of the receive signal will be referred to as the second reference signal.

It should be noted that the embodiments of the present disclosure use the term "first reference signal" to represent the reference signal for self-interference channel estimation, and use the term "second reference signal" to represent the reference signal at the corresponding position of the receive signal, for convenience of description. In the embodiments of the present disclosure, when the self-interference signal is an uplink transmit signal, the term "first reference signal" may also refer to a reference signal for uplink transmission, and the term "second reference signal" may also refer to a reference signal for downlink transmission. In the embodiments of the present disclosure, when the self-interference signal is a downlink transmit signal, the term "first reference signal" may also refer to a reference signal for downlink transmission, and the term "second reference signal" may also refer to a reference signal for uplink transmission.

Some embodiments of the design mode for the first reference signal used for self-interference channel estimation, and the second reference signal at the corresponding position of the receive signal will be described below.

With reference to FIGS. 9A and 9B, some embodiments of the design mode for the first reference signal used for self-interference channel estimation, and the second reference signal at the corresponding position of the receive signal will be described, in which a comb structure with a repetition factor of 2 is adopted.

Referring to FIGS. 9A and 9B, the first reference signal may adopt the comb structure with the repetition factor of 2 as the frequency domain structure, and the second reference signal may adopt the comb structure with the repetition factor of 2 as the frequency domain structure as well. When the comb structure with the repetition factor of 2 is adopted, the corresponding time domain symbol includes two identical portions (sequences), as shown in FIG. 5B, for example. For example, referring to FIG. 9A, the subcarriers occupied by the second reference signal may be the same as the subcarriers occupied by the first reference signal. For example, referring to FIG. 9B, the subcarriers occupied by the second reference signal may be different from the subcarriers occupied by the first reference signal. In addition, in order to ensure orthogonality, the sequence of the second reference signal may be orthogonal to the time domain sequence of the first reference signal in the time domain. To this end, the first reference signal and the second reference signal may be generated based on ZC sequences, for example. For an example of ZC sequence, reference can be made to the previous description. Because the sequences (e.g., ZC sequences) used to generate the first reference signal and/or the second reference signal are orthogonal in both time domain and frequency domain, when the same root sequence (e.g., the same ZC root sequence) is adopted, orthogonal sequences can be obtained by adopting different cyclic shifts. Some examples of the configuration method for the first reference signal and the second reference signal will be described below.

In some implementations, the parameters for the first reference signal and the parameters for the second reference signal at the corresponding position of the receive signal may be configured respectively.

For example, the root sequence and the cyclic shift for the first reference signal, and the root sequence and the cyclic shift for the second reference signal may be configured respectively, through downlink control information of a downlink control channel or through a higher layer signaling. For another example, the root sequence for both the first reference signal and the second reference signal may be configured, through downlink control information in a downlink control channel or through a higher layer signaling, while the cyclic shift for the first reference signal and the cyclic shift for the second reference signal may be configured respectively, through control information in a downlink control channel or through a higher layer signaling. For still another example, when the root sequence for the first reference signal is different from the root sequence for the second reference signal, the root sequence for the first reference signal and the root sequence for the second reference signal may be configured, through downlink control information in a downlink control channel or through a higher layer signaling. In this case, the cyclic shift for the first reference signal and the cyclic shift for the second reference signal may not be configured.

In some implementations, the parameters for the first reference signal and the parameters for the second reference signal may be configured jointly (or the parameters for the first reference signal may be configured together with the parameters for the second reference signal).

For example, the root sequence and the cyclic shift for the first reference signal may be configured together with the root sequence and the cyclic shift for the second reference signal, through downlink control information in a downlink control channel or through a higher layer signaling. For example, the cyclic shift for the first reference signal and the cyclic shift for the second reference signal may be configured using a unified look-up table, and the root sequences for both the first reference signal and the second reference signal may be separately configured. In addition, in a case where cyclic shift for the first reference signal and the cyclic shift for the second reference signal are configured using a unified lookup table, the cyclic shift for the first reference signal and the cyclic shift for the second reference signal may be selected in the lookup table based on the configured information.

In some implementations, the parameters for the first reference signal and the parameters for the second reference signal may be configured according to a predefined rule.

For example, the relationship between the cyclic shift for the first reference signal and the cyclic shift for the second reference signal may be predefined or predetermined. In this case, one of the cyclic shift for the first reference signal and the cyclic shift for the second reference signal may be configured, and the configuration for the other may be acquired according to the predefined or predetermined relationship. A specific example is described below. The cyclic shift for the first reference signal may be specified as $C_{si}$ and the cyclic shift for the second reference signal may be specified as $C_{rx}$. For example, it may be defined that the relationship between the cyclic shift $C_{si}$ for the first reference signal and the cyclic shift $C_{rx}$ for the second reference signal satisfies the following equation:

$$c_{rx} = \mathrm{mod}(c_{si} + N, c_{MAX})$$

In the above equation, $C_{MAX}$ is the maximum cyclic shift supported, and N is the cyclic shift interval. $C_{MAX}$ or N may be configured by a base station (for example, an IAB honor). Alternatively, it may be defined that the relationship between the cyclic shift $C_{si}$ for the first reference signal and the cyclic shift $C_{rx}$ for the second reference signal satisfies the following equation:

$$c_{si} = \mathrm{mod}(c_{rx} + N, c_{MAX})$$

In the above equation, $C_{MAX}$ is the maximum cyclic shift which can be supported, and N is the cyclic shift interval. For example, $C_{MAX}$ or N may be configured by a base station (e.g., an IAB donor). When the first reference signal and the second reference signal are configured, the configuration parameter N and one of the cyclic shift $C_{si}$ or $C_{rx}$ may be configured, through downlink control information in a downlink control channel or through a higher layer signaling. The other one of $C_{si}$ or $C_{rx}$ is obtained based on the relationship between the cyclic shift $C_{si}$ and the cyclic shift $C_{rx}$ (e.g., the relationship described in the above example), which is predefined or predetermined. It should be noted that in some examples, when the cyclic shift is selected, it is necessary to consider supporting appropriate channel delay spread and timing misalignment. In addition, if the root sequence is short, it cannot provide enough cyclic shift. In this case, the root sequence for the first reference signal and the root sequence for the second reference signal may be different, and may be configured respectively.

With reference to FIGS. 10, 11A and 11B, some embodiments of the design mode for the first reference signal used for self-interference channel estimation and the second reference signal at the corresponding position of the receive signal will be described, in which a comb structure with a repetition factor greater than 2 is adopted.

When the comb structure with the repetition factor greater than 2 is adopted as the frequency domain structure for the first reference signal and the second reference signal, the orthogonality may be provided by orthogonal sequences as mentioned above. Alternatively, the orthogonality in the frequency domain may be obtained by making the first reference signal and the second reference signal occupy different subcarriers.

In some implementations, the subcarriers occupied by the first reference signal and the subcarriers occupied by the second reference signal may be the same, or be different.

For example, if the orthogonality is provided by adopting orthogonal sequences, the subcarriers occupied by the first reference signal and the subcarriers occupied by the second reference signal may be the same, or be different. In this case, the generation manner for sequences of the reference signals (the sequence of the first reference signal and the sequence of the second reference signal) may be the same as the generation manner when the repetition factor is 2. ZC sequences, for example, may be used to generate the sequences of the first reference signal and the sequence of the second reference signal.

In some implementations, the subcarriers occupied by the first reference signal are different from the subcarriers occupied by the second reference signal.

For example, if the orthogonality in the frequency domain is obtained by making the first reference signal and the second reference signal occupy different subcarriers, the subcarriers occupied by the first reference signal are different from those occupied by the second reference signal, and the number of subcarriers spaced between any one of the subcarriers occupied by the first reference signal and any one of the subcarriers occupied by the second reference signal is an odd. That is, the comb structure used by the first reference signal and the second reference signal has the same repetition factor, but the difference between the initial subcarrier index of the subcarriers occupied by the first reference signal and the initial subcarrier index of the subcarriers occupied by the second reference signal is an even. Referring to FIG. 10, the subcarriers occupied by the first reference signal are different from those occupied by the second reference signal, and the number of subcarriers spaced between any one of the subcarriers occupied by the first reference signal and any one of the subcarriers occupied by the second reference signal is an odd.

In the case where the subcarriers occupied by the first reference signal are different from those occupied by the second reference signal, and the number of subcarriers spaced between any one of the subcarriers occupied by the first reference signal and any one of the subcarriers occupied by the second reference signal is an odd, when detecting a signal (including a receive signal and a self-interference signal), if a detection window with a length of, for example, half the OFDM symbol length is adopted, the subcarriers occupied by the first reference signal and the subcarriers occupied by the second reference signal are different within the detection window, and the first reference signal and the second reference signal are completely orthogonal in the frequency domain. Similarly, when the ratio of the OFDM symbol length to the length of the detection window is larger than the repetition factor of the comb structure used by the first reference signal or the second reference signal, two sequences (the sequence of the first reference signal and the sequence of the second reference signal) which are completely orthogonal in the detection window can be obtained by adjusting the subcarrier position of the first reference signal or the second reference signal.

Hereinafter, referring to FIG. 10, examples of the comb structure for the first reference signal and the second reference signal will be described, in which the repetition factor of the comb structure is 4 and the length of the detection window is half of the symbol length.

In some implementations, when the repetition factor of the comb structure is 4 and the length of the detection window is half the length of the OFDM symbol, the comb structure configuration shown in FIG. 10 may be adopted. For example, when the length of the detection window is half the length of the OFDM symbol, it is considered that both the first reference signal and the second reference signal adopt the comb structure with the repetition factor of 4, and the difference between the starting position index of the subcarriers occupied by the first reference signal and the start position index of the subcarriers occupied by the second reference signal is 2. That is, if the starting position index (the offset index or offset) of the comb structure used by the first reference signal is X, then the starting position index of the comb structure used by the second reference signal is X+2. Referring to FIG. 10, for example, the offset index of the comb structure for the first reference signal is 0, and the offset index of the comb structure for the second reference signal is 2.

When the comb structure configuration as mentioned above is adopted and a detection window with a length half of the OFDM symbol length is used, the signal from the first reference signal and the signal from the second reference signal may be acquired simultaneously within the detection window. As described with reference to FIGS. 6A and 6B, for the comb structure with the repetition factor of 4, a time domain symbol of the signal includes four identical portions, each of which is a complete sequence. At the same time, taking into account that a ZC sequence which is orthogonal to the cyclic shift ZC sequence is adopted, the cyclically shifted ZC sequence is still a complete ZC sequence. Therefore, even if the detection window is only half of the OFDM symbol length, the detection window is capable of containing two complete sequences (the sequence of the first reference signal or the sequence of the second reference signal).

FIG. 11A illustrates an example of a position of a detection window, and FIG. 11B illustrates subcarrier occupancy of a sequence within a detection window.

For example, as shown in FIG. 11A, the starting point of the detection window may be selected according to the timing of the receive signal, and the length of the detection window may be half of the OFDM symbol. In this case, two complete portions (sequences) of the receive signal can be truncated within the detection window, and the cyclically shifted portions of the two complete portions (sequences) of the first reference signal can be truncated within the detection window. When the first reference signal and the second reference signal are generated based on ZC sequences, because a cyclically shifted ZC sequence is still a ZC sequence and orthogonal to the original sequence, sequences of the first reference signal and the second reference signal, which are orthogonal to each other, can be obtained within the detection window, by selecting a cyclic shift for the first reference signal and a cyclic shift for the second reference signal. For example, the subcarrier occupancy for the sequence of the first reference signal and the sequence of the second reference signal within the detection window may be shown in FIG. 11B. Referring to FIG. 11B, due to the selection of suitable subcarriers in the frequency domain, the truncated sequences of the first reference signal and the second reference signal still occupy different subcarriers in the frequency domain, within the detection window with the length half of the OFDM symbol length, and are orthogonal to each other in the frequency domain. In addition, continuing to refer to FIG. 11A, taking into account that the position of the detection window is somewhat offset from the first reference signal, the local first reference signal may be cyclically shifted according to the timing advance, in order to obtain the final first reference signal used for self-interference channel estimation.

Some examples for configuring the frequency domain structure of the first reference signal used for self-interference channel estimation and the second reference signal at the corresponding position of the receive signal will be described below.

In some implementations, the frequency domain structures for the first reference signal and the second reference signal may be configured respectively.

For example, the repetition factor and the offset of the comb structure may be configured for the first reference signal and the second reference signal, respectively, through downlink control information in a downlink control channel or through a higher layer signaling.

In some implementations, the frequency domain structures of the first reference signal and the second reference signal may be configured according to a predefined rule.

For example, the relationship between the offset of the comb structure used by the first reference signal and the offset of the comb structure used by the second reference signal may be predefined or predetermined. In this case, it is needed to configure only one of the offset of the comb structure used by the first reference signal and the offset of the comb structure used by the second reference signal.

Some examples for configuring the offset of the comb structure used by the first reference signal and the offset of the comb structure used by the second reference signal will be described below.

In one example, the first reference signal is a reference signal for uplink transmission, and the second reference signal is a reference signal for downlink transmission. In this case, the relationship between the offset $n_{off}^{UL}$ of the comb structure used by the first reference signal and the offset $n_{off}^{DL}$ of the comb structure used by the second reference signal may be predefined or predetermined to satisfy the following equation:

$$n_{off}^{UL} = n_{off}^{DL} + M$$

In the above equation, M indicates the relationship between the offset $n_{off}^{DL}$ and the offset $n_{off}^{UL}$. For example, the value of M can be configured by a base station (e.g., an IAB donor).

In another example, the relationship between the offset $n_{off}^{UL}$ of the comb structure used by the first reference signal and the offset $n_{off}^{DL}$ used by the second reference signal may be predefined or predetermined to satisfy the following equation:

$$n_{off}^{DL} = n_{off}^{UL} + M$$

In each of the above two examples, only one of the offset $n_{off}^{UL}$ and the offset $n_{off}^{DL}$ needs to be configured. For example, the offset $n_{off}^{UL}$ or the offset $n_{off}^{DL}$ may be configured by downlink control information in a downlink control channel or by a higher layer signaling. In this case, the other one of the offset $n_{off}^{UL}$ and the offset $n_{off}^{DL}$ may be obtained according to the predefined or predetermined relationship, so as to determine the comb structure for the first reference signal and the comb structure for the second reference signal.

It should be noted that when the comb structure with repetition factor greater than 2 is adopted, it is not necessary that the generation sequences used by the first reference signal for self-interference channel estimation and the second reference signal at the corresponding position of the receive signal are orthogonal to each other. Therefore, in this configuration manner, the configuration of the generation sequence may refer to the existing method, or adopt the configuration manner described above when the repetition factor is equal to 2.

The method for designing a reference signal for a receive signal according to some embodiments of the present disclosure is described above. By designing and configuring the first reference signal for self-interference channel estimation and a second reference signal at the corresponding position of the receive signal based on some embodiments of the present disclosure described above, the influence of inter-symbol interference on the channel estimation accuracy for the self-interference channel may be avoided.

Some embodiments of the present disclosure also relate to configuring the comb structure of reference signals (e.g., the first reference signal used for self-interference channel estimation and/or the second reference signal at the corresponding position of the receive signal). For example, some embodiments of the present disclosure also propose an adapting comb structure.

In some implementations, a suitable repetition factor of the comb structure may be selected based on timing misalignment or timing advance.

For example, because the number of repeated portions of a symbol in the time domain is determined by the repetition factor of the comb structure, the timing misalignments caused by different timing advances can be adapted by controlling the repetition factor of the comb structure.

For example, the generation manners and parameters for the reference signal sequences corresponding to repetition factors may be pre-set or predetermined, and a base station and a terminal may be informed of the generation manners and parameters for the reference signal sequences corresponding to different repetition factors, by means of a look-up table.

Examples of a method for a base station and a terminal to determine a comb structure for reference signals (for example, a first reference signal used for self-interference channel estimation and/or a second reference signal corresponding to a receive signal). It should be noted that in this example, it is assumed that the receive signal and a transmit signal are aligned at the base station side, and the transmit signal at the terminal side is earlier than the receive signal (that is, the timing advance is used at the terminal side). In this case, the method for the base station and the terminal to determine the comb structure used by the reference signals may include that: the base station determines the timing advance at the terminal side through, for example, a random access procedure, and notifies and configures the timing advance to the terminal; the terminal determines the repetition factor for the comb structure applied to the reference signal based on the lookup table and the configured timing advance; the terminal determines the frequency domain structure of the reference signal according to the offset in the configuration information transmitted by the base station; the terminal determines the frequency domain structure for the reference signal based on the determined reference signal; and the terminal transmits and receives the reference signal according to the determined frequency domain structure of the reference signal, and performs digital self-interference cancellation. In the above steps, the repetition factor for the comb structure may include the repetition factor for the first reference signal and the repetition factor for the second reference signal. In some implementations, in order to ensure the orthogonality and reduce the influence of inter-symbol interference on self-interference channel estimation, the repetition factor for the first reference signal and the repetition factor for the second reference signal may be the same. In this case, the repetition factor for the first reference signal and the repetition factor for the second reference signal may be configured by the same lookup table. In addition, in the above steps, the base station needs to configure the offset for the first reference signal and the offset for the second reference signal, and the corresponding configuration method the previous description may referred to.

An example of a look-up table for determining a comb structure will be described below. Table 1 shows an example of a possible lookup table. As shown in Table 1, the repetition factor for the reference signal and the parameters (sequence-related parameters) for generating the sequence of the reference signal are determined based on the amount of timing advance. In Table 1, the timing advances N1, N2, N3, N4, etc. may adopt the number of sampling points, or directly adopt an absolute time. The sequence-related parameters may include one or more of a sequence length, a root sequence-related parameter, an initial state of a Gold sequence, etc.

TABLE 1

An example of a Possible Lookup Table

| Timing Advance | Repetition Factor | Sequence-related Parameters |
|---|---|---|
| 0~N1 | 2 | Parameter 1 |
| N1~N2 | 2 | Parameter 2 |
| N2~N3 | 4 | Parameter 1 |
| N3~N4 | 4 | Parameter 2 |
| ... | ... | ... |

According to the amount of timing advance configured by the base station, the terminal may select the repetition factor corresponding to the timing advance range in the lookup table, and obtain the related parameters for generating the sequences of the reference signals.

Taking into account that the influence of inter-symbol interference on the estimation of self-interference channel caused by timing misalignment is related to the subcarrier spacing, i.e., related to the symbol length and the CP length, the repetition factor for the reference signals and parameters (sequence-related parameters) for generating the reference signals are configured based on the subcarrier spacing. An example for configuring the repetition factor and the sequence-related parameters based on the subcarrier spacing will be described below.

In some implementations, a lookup table similar to Table 1 may be predefined or pre-determined for each respective subcarrier interval. In this case, the terminal may select the corresponding lookup table according to the configuration for the subcarrier spacing, and obtain the repetition factor and sequence-related parameters according to the timing advance configured by the base station and the selected lookup table.

In some implementations, the repetition factor and the sequence generation parameters may be determined according to the ratio of the timing advance to the CP length, or according to the ratio of the timing advance to the symbol length.

In an example, the repetition factor and the sequence generation parameters may be determined according to the ratio of the timing advance to the CP length. In this case, a look-up table as shown in Table 2 may be adopted.

TABLE 2

Another Example of Possible Lookup Table

| Timing Advance/CP Length | Repetition Factor | Sequence-related Parameters |
|---|---|---|
| 0~M1 | 2 | Parameter 1 |
| M1~M2 | 2 | Parameter 2 |
| M2~M3 | 4 | Parameter 1 |
| M3~M4 | 4 | Parameter 2 |
| ... | ... | ... |

In table 2, M1, M2, M3 and M4 each are a ratio of a timing advance to a CP length. The values of M1, M2, M3 and M4 each may be greater than 1.

The terminal may determine the symbol structure (including CP length) according to the subcarrier spacing and other configurations configured by the base station; After obtaining the timing advance, according to the ratio of the timing advance to the CP length and the lookup table shown in Table 2, the repetition factor and the related parameters of sequence generation are obtained.

In another example, the repetition factor and sequence generation parameters may be determined according to the ratio of the timing advance to the symbol length. In this case, a look-up table as shown in Table 3 may be used.

TABLE 3

Still Another Example of Possible Lookup Table

| Timing Advance/symbol Length | Repetition Factor | Sequence-related Parameters |
|---|---|---|
| 0~L1 | 2 | Parameter 1 |
| L1~L2 | 2 | Parameter 2 |
| L2~L3 | 4 | Parameter 1 |
| L3~L4 | 4 | Parameter 2 |
| ... | ... | ... |

In Table 3, L1, L2, L3 and L4 each are the ratio of the timing advance to the symbol length. L1, L2, L3 and L4 each may be a positive number less than 1.

The terminal may determine the symbol structure (including the symbol length) according to the subcarrier spacing and other configurations configured by the base station; and after acquiring the timing advance, according to the ratio of the timing advance to the symbol length and the lookup table shown in Table 3, the repetition factor and the related parameters for sequence generation are acquired.

In some embodiments of the present disclosure, by the adapting the comb structure for the first reference signal and/or the second reference signal, an appropriate repetition factor of the comb structure may be selected based on the timing misalignment or the timing advance, so the timing misalignment caused by different timing advances can be adapted.

It should be noted that although the above description of the embodiments for configuring the comb structure of the reference signal (e.g., the first reference signal used for self-interference channel estimation and/or the second reference signal at the corresponding position of the receive signal) is directed to the scenario of communication between the terminal and the base station, the embodiment of the present disclosure is not limited thereto. For example, the above method may also be applied to the scenario where an IAB node communicates with an IAB donor. In this case, the "terminal" described in the above embodiments may refer to the "IAB node", and the "base station" may refer to the "IAB donor".

The design and configuration for the first reference signal used for self-interference channel estimation and the second reference signal at the corresponding position of the receive signal according to some embodiments of the present disclosure is described above. Methods and apparatuses for self-interference channel estimation according to some embodiments of the present disclosure will be described below.

FIG. 12 illustrates a flowchart of a method for self-interference cancellation according to some embodiments of the present disclosure. For example, the method 1200 may be used to perform self-interference cancellation by a network device operating in the full duplex mode. For example, the network device may be a base station or a terminal. For another example, the network device may be an IAB node or an IAB donor.

With reference to FIG. 12, in step S1210, a signal is truncated based on a detection window of which length is less than the symbol length.

In some implementations, referring to FIG. 4A, a signal received by a network device operating in a full duplex mode includes a signal transmitted from another network device (the receive signal in FIG. 4A) (referred to herein as "receive signal") and a self-interference signal received due to self-interference by the transmit signal.

At step S1210, the signal is truncated by the detection window to obtain the truncated signal (i.e., the signal within the detection). For example, the length of the detection window is less than the symbol length.

In some implementations, the length of the detection window is ½ or ¼ of the symbol length (e.g., the OFDM symbol length).

In some implementations, the position (e.g., the starting point) of the detection window may be determined based on the timing of the receive signal.

Continuing to refer to FIG. 12, in step S1220, self-interference cancellation is performed based on the truncated signal and a first reference signal which is carried by the transmit signal and used for self-interference channel estimation, and the first reference signal has a comb structure in the frequency domain.

At step S1220, for example, the self-interference cancellation may be performed based on the truncated signal and the local first reference signal. In some embodiments of the present disclosure, the term "local first reference signal" may refer to a locally generated first reference signal. For example, referring to FIG. 4A, when self-interference cancellation is performed at the network device 40, the "local first reference signal" may refer to the first reference signal generated at the network device 40.

In some implementations, the repetition factor of the comb structure for the first reference signal may be an integer power of 2, where the repetition factor is the difference between the indexes of two adjacent occupied subcarriers in the comb structure.

In some embodiments, a symbol in the receive signal, which corresponds to a symbol of the first reference signal, is a muting symbol. For example, it may be ensured that a time domain index (e.g., a symbol index, a slot index or a mini-slot index) of a muting symbol in the receive signal is consistent with a time domain index of the first reference signal used for self-interference channel estimation, that is, the time domain index of the muting symbol in the receive signal corresponds to the time domain index of the first reference signal, thereby reducing the influence of inter-symbol interference on the accuracy of self-interference channel estimation caused by timing misalignment. For the method for configuring the muting symbol in the receive signal various embodiments described previously may be referred to.

In some implementations, a second reference signal in the receive signal, at a time domain index corresponding to a time domain index of the first reference signal, has a comb structure in the frequency domain, where the second reference signal is carried by the receive signal and used for channel estimation of the receive signal, and the repetition factor of the comb structure for the first reference signal is the same as that for the second reference signal.

In some implementations, a root sequence used to generate the first reference signal is the same as a root sequence used to generate the second reference signal, and a cyclic shift used to generate the first reference signal is different from a cyclic shift used to generate the second reference signal.

In some examples, the cyclic shift for generating the first reference signal and the cyclic shift for generating the second reference signal are determined based on one or more of a timing advance, a cyclic prefix (CP) length and the symbol length.

In some examples, the root sequence and the cyclic shift for generating the first reference signal, and the root sequence and the cyclic shift for generating the second reference signal are configured respectively.

For example, the root sequence and the cyclic shift for the first reference signal, and the root sequence and the cyclic shift for the second reference signal may be configured respectively, through downlink control information of a downlink control channel or through a higher layer signaling. Alternatively, the root sequence for both the first reference signal and the second reference signal may be configured through downlink control information in a downlink control channel or through a higher layer signaling, and the cyclic shift for the first reference signal and the cyclic shift for the second reference signal may be configured respectively, through downlink control information in a downlink control channel or through a higher layer signaling. In the case where the root sequence for the first reference signal is different from the root sequence for the second reference signal, the root sequence for the first reference signal and the root sequence for the second reference signal may be configured, through downlink control information in a downlink control channel or through a higher layer signaling. In this case, the cyclic shift for the first reference signal and the cyclic shift for the second reference signal may not be configured.

In some examples, the root sequence and the cyclic shift for generating the first reference signal are configured together with the root sequence and the cyclic shift for generating the second reference signal.

For example, the root sequence and the cyclic shift for the first reference signal may be configured together with the root sequence and the cyclic shift for the second reference signal, through downlink control information in a downlink control channel or through higher layer signaling. For example, the cyclic shift for the first reference signal and the cyclic shift for the second reference signal may be configured using a unified look-up table, and the root sequences for both the first reference signal and the second reference signal may be separately configured. In addition, in the case where the cyclic shift for the first reference signal and the cyclic shift for the second reference signal are configured using the unified lookup table, the cyclic shift for the first reference signal and the cyclic shift for the second reference signal may be selected in the lookup table based on the configured information.

In some examples, the root sequence and the cyclic shift for generating the first reference signal and the root sequence and the cyclic shift for generating the second reference signal are configured based on a predefined rule.

For example, the relationship between the cyclic shift for the first reference signal and the cyclic shift for the second reference signal may be predefined or predetermined. In this case, one of the cyclic shift for the first reference signal and the cyclic shift for the second reference signal may be configured, and the configuration for the other one may be acquired according to the predefined or predetermined relationship.

In some implementations, the first reference signal and the second reference signal may be generated based on ZC sequences or GOLD sequences.

For example, the repetition factor of the comb structure for the first reference signal and the repetition factor of the comb structure for the second reference signal may be determined based on one or more of the timing advance, the CP length and the symbol length.

In some implementations, the offset of the comb structure for the first reference signal is different from the offset of the comb structure for the second reference signal. The offset of the comb structure is related to the initial position index of occupied subcarriers.

In some examples, the difference between the offset of the comb structure for the first reference signal and the offset of the comb structure for the second reference signal is an even.

In some examples, the repetition factor and the offset of the comb structure of the first reference signal and the repetition factor and the offset of the comb structure of the second reference signal are configured respectively.

For example, the repetition factor and the offset of comb structure may be configured for the first reference signal and the second reference signal respectively through downlink control information in the downlink control channel or through higher layer signaling.

In some examples, the repetition factor and the offset of the comb structure of the first reference signal and the repetition factor and the offset of the comb structure of the second reference signal are configured based on a predefined rule.

For example, the relationship between the offset of the comb structure used by the first reference signal and the offset of the comb structure used by the second reference signal may be predefined or predetermined. In this case, it is needed to configure only one of the offset of the comb structure used by the first reference signal, and the offset of the comb structure used by the second reference signal.

In some implementations, the repetition factor of the comb structure for the first reference signal and the repetition factor of the comb structure for the second reference signal are determined based on one or more of the timing advance, the cyclic prefix (CP) length and the symbol length.

For the method for designing and configuring the first reference signal and the second reference signal, various embodiments described previously may be referred to.

In some implementations, in the case where the position of the detection window is determined based on the timing of the receive signal, performing self-interference cancellation based on the detected signal and the local first reference signal may include: processing the local first reference signal based on the timing advance to generate the processed first reference signal; and performing self-interference cancellation based on the processed first reference signal and the detected signal. For example, referring to FIG. 11A, taking into account that the position of the detection window is somewhat offset from the first reference signal, the local first reference signal may be cyclically shifted according to the timing advance to obtain the final first reference signal used for self-interference channel estimation.

In some implementations, the step S1220 may include performing self-interference channel estimation based on the detected signal and the local first reference signal to obtain an estimation of the self-interference channel, and performing self-interference cancellation based on the transmit signal and the estimation of the self-interference channel.

For example, the self-interference channel estimation may be performed based on the signal truncated by the detection window and the local first reference signal.

For example, a method for time domain channel estimation may be used to estimate the self-interference channel. For example, the self-interference channel may be estimated based on minimum mean square error estimation (MMSE) in time domain or based on a Rake receiver to obtain an estimation of the self-interference channel.

For example, performing self-interference cancellation based on the estimation of the self-interference channel for the transmit signal may include reconstructing the self-interference signal based on the estimation of the transmit signal and the self-interference channel, and obtaining a signal after self-interference cancellation based on the reconstructed self-interference signal and the receive signal.

For example, after the self-interference channel estimation is completed, the time-domain self-interference signal may be reconstructed according to the estimation of the self-interference channel and the transmit signal. The reconstructed time-domain self-interference signal can be expressed by convolution $SI_{est}$ of the time-domain transmission signal x and the time-domain channel estimation $\hat{h}$ for the self-interference channel, as shown in the following equation:

$$SI_{est} = \hat{h} \otimes x$$

In the above equation, the operator "$\otimes$" represents a linear convolution operation. The reconstructed time-domain self-interference signal is then subtracted from the time-domain receive signal to obtain the result after digital self-interference cancellation.

The method for self-interference cancellation according to some embodiments of the present disclosure has been described above with reference to FIG. 12.

In some cases, there are nonlinear effects caused by non-ideal devices in actual circuits. In this case, it may be necessary to consider the influence of the nonlinear effects when performing signal processing (e.g., self-interference cancellation when performing signal reception.)

Taking into account the influence of the nonlinear effects, some embodiments of the present disclosure provide a method for modeling, estimating and processing the nonlinear effect caused by non-ideal devices by adopting a polynomial model. It should be noted that the modeling, estimating and processing methods described below may be combined with the above-described methods for self-interference cancellation according to various embodiments of the present disclosure, or as a portion thereof, or implemented as a portion of an apparatus for self-interference cancellation to be described later.

In some embodiments of the present disclosure, linear components and nonlinear components in a signal may be modeled at the same time in the following manner.

Assuming that the original signal is x[n], where n is the time domain index, the signal $x_{NL}[n]$ caused by nonlinearity caused by non-ideal devices in the actual circuit can be given, for example, by the following polynomial:

$$x_{NL}[n] = \sum_{p=1,3,5,\ldots}^{\infty} w_{NL}^{(p)} x[n] |x[n]|^{p-1}$$

where p is the order of the polynomial, $w_{NL}^{(p)}$ is the coefficient of the p-th order term, and $|\cdot|$ indicates modulo. For example, $|x[n]|^{p-1}$ represents the (p−1) power of the module of x[n]. In some examples, the order p of the polynomial may be a positive odd, for example, with respect to nonlinear modeling problems. For example, "p=1" may correspond to a linear component, and "p>1" may correspond to a nonlinear component. In some examples, the coefficient $w_{NL}^{(p)}$ of the p-th order term may change with time. For example, the coefficient $w_{NL}^{(p)}$ of the p-th order term may be regarded as being fixed for a certain data reception, taking into account that the non-linearity changes slowly with time.

For example, the signal y[n] received by the receiving end after passing through a channel may be expressed as:

$$y[n] = \Sigma_{p=1,3,5,\ldots\infty} h_{SI}^p[n] \circledast w_{NL}^{(p)} x[n]|x[n]|^{p-1} + w[n]$$

where the operator "⊚" represents a convolution operation, $h_{SI}^p[n]$ represents the channel coefficient, and w[n] represents noise.

If the channel contains L paths (that is, the number of multipaths is L), the channel vector $h_{SI}^p$ may be expressed as $n_{SI}^p = [h_{SI}^p[0], \ldots, h_{SI}^p[L-1]]^T$, where L may be a positive integer. In addition, by expanding the convolution operation described above, the signal y[n] may be expressed as:

$$y[n] = \sum_{p=1,3,5,\ldots}^{\infty} \sum_{l=0}^{L-1} h_{SI}^p[l] w_{NL}^{(p)} x[n-l]|x[n-l]|^{p-1} + w[n]$$

The above equation may be further expressed as the following matrix form:

$$y = \begin{bmatrix} y[N_{CP}] \\ y[N_{CP}+1] \\ \ldots \\ y[N_w-1] \end{bmatrix} =$$

$$\sum_{p=1,3,5,\ldots}^{\infty} \begin{bmatrix} x[N_{CP}] \cdot |x[N_{CP}]|^{p-1} & x[N_{CP}-1] \cdot |x[N_{CP}-1]|^{p-1} & \ldots & x[N_{CP}-L+1] \cdot |x[N_{CP}-L+1]|^{p-1} \\ x[N_{CP}+1] \cdot |x[N_{CP}+1]|^{p-1} & x[N_{CP}] \cdot |x[N_{CP}]|^{p-1} & \ldots & x[N_{CP}-L+2] \cdot |x[N_{CP}-L+2]|^{p-1} \\ \ldots & \ldots & \ldots & \ldots \\ x[N_w-1] \cdot |x[N_w-1]|^{p-1} & x[N_w-2] \cdot |x[N_w-2]|^{p-1} & \ldots & x[N_w-L] \cdot |x[N_w-L]|^{p-1} \end{bmatrix}$$

$$\begin{bmatrix} h_{SI}^{(p)}[0] \\ h_{SI}^{(p)}[1] \\ \ldots \\ h_{SI}^{(p)}[L-1] \end{bmatrix} w_{PA}^{(p)} + w$$

In the above equation, y is the matrix form of the signal y[n], $N_{CP}$ is the length of the cyclic prefix, $N_w$ is the length of the time domain detection window required for time domain channel estimation, and w is the matrix form of the noise w[n].

For convenience of description, matrix $X^{(p)}$ may be defined as:

For convenience of description, equivalent channel vector $h_{SI}^{(p)}$ may be defined as:

$$h_{SI}^{(p)} = \begin{bmatrix} h_{SI}^{(p)}[0] \\ h_{SI}^{(p)}[1] \\ \ldots \\ h_{SI}^{(p)}[L-1] \end{bmatrix} w_{NL}^{(p)}$$

On the basis of this, the receive signal y may be expressed as:

$$y = \sum_{p=1,3,5,\ldots}^{\infty} X^{(p)} h_{SI}^{(p)} + w$$

In some embodiments, after introducing the nonlinear component, it is necessary to estimate the channel coefficient vector $h_{SI}^{(p)}$ corresponding to each order component (including linear components and nonlinear components) by using the known time domain signal $X^{(p)}$. For example, the least square method or the least mean square error method may be used to estimate the channel coefficient vector corresponding to each order component.

For example, the receive signal y may be further expressed as:

$$y = X h_{SI} + w$$

where $$X = [X^{(1)} X^{(3)} X^{(5)}, \ldots], h_{SI} = [[h_{SI}^{(1)}]^T [h_{SI}^{(3)}]^T [h_{SI}^{(5)}]^T, \ldots]^T, \text{ and } [\cdot]^T$$

represents the transposition of a matrix. Accordingly, the estimation $\hat{h}_{SI}$ of the channel vector $h_{SI}$ for each order may be expressed by the following equation:

$$\hat{h}_{SI} = (X^H X)^{-1} X^H y$$

where $[\cdot]^{-1}$ represents the inverse of a matrix, and $[\cdot]^H$ represents the conjugate transpose of a matrix.

$$X^{(p)} = \begin{bmatrix} x[N_{CP}] \cdot |x[N_{CP}]|^{p-1} & x[N_{CP}-1] \cdot |x[N_{CP}-1]|^{p-1} & \ldots & x[N_{CP}-L+1] \cdot |x[N_{CP}-L+1]|^{p-1} \\ x[N_{CP}+1] \cdot |x[N_{CP}+1]|^{p-1} & x[N_{CP}] \cdot |x[N_{CP}]|^{p-1} & \ldots & x[N_{CP}-L+2] \cdot |x[N_{CP}-L+2]|^{p-1} \\ \ldots & \ldots & \ldots & \ldots \\ x[N_w-1] \cdot |x[N_w-1]|^{p-1} & x[N_w-2] \cdot |x[N_w-2]|^{p-1} & \ldots & x[N_w-L] \cdot |x[N_w-L]|^{p-1} \end{bmatrix}$$

It should be noted that in the channel estimation methods of practical systems, nonlinear modeling and channel estimation are generally performed by taking the third-order and fifth-order nonlinear components, which may meet the performance requirements of channel estimation in practical systems. That is, in some implementations described above, only p=1, 3, and 5 may be taken, where "p=1" corresponds to a linear component.

In addition, it should be noted that the method in the above embodiments may also be applied to the case of multiple antennas.

The method described in the above embodiments may be briefly described as follows, for example:
- processing the time-domain receive signal (e.g., removing cyclic prefix (CP)), while preserving the length of the time-domain signal to be processed;
- constructing a matrix X according to the number L of the multipaths of the channel to be estimated and the known time domain signal; and
- estimating channel coefficients corresponding to linear components and nonlinear components according to the matrix X and the receive signal y.

The above method is also applicable to the digital self-interference cancellation related to the embodiments of the present disclosure. At this time, the channel to be estimated is linear components and nonlinear components in the digital self-interference channel, and the known time-domain signal used may be the self-interference signal transmitted. On the basis of the above steps, the time-domain reconstruction and time-domain cancellation for the self-interference signal may be performed as follows:
- the time-domain self-interference signal ŷ is reconstructed, according to the known time-domain signal X, the channel coefficients $\hat{h}_{SI}$ corresponding to the estimated linear components and the estimated nonlinear components for respective orders, which is represented by the following equation:

$$\hat{y} = X\hat{h}_{SI}$$

It should be noted that the above reconstruction for the self-interference signal needs to consider the influence of cyclic prefix (CP). That is, during the reconstruction for the self-interference signal, for each symbol, the first L sampling points will be affected by the multipath delay from the previous symbol. Therefore, when calculating the reconstructed signal corresponding to the L sampling points, the influence of the previous symbol and the CP of the current symbol should be considered.

In some implementations, the time domain reconstruction and time domain cancellation of the self-interference signal further includes:
- subtracting the reconstructed time-domain self-interference signal ŷ from the time-domain receive signal to complete the digital self-interference cancellation.

In some implementations, when the design for the reference signal design and the corresponding method for digital self-interference cancellation provided in the foregoing embodiments of the present disclosure are implemented, the corresponding method needs to be adaptively adjusted as follows. In some examples, the length of the time-domain truncated signal (for example, the length of the detection window as in some embodiments above) is half of the FFT size. In some embodiments, the known time domain signal may be generated according to the generation method for the first reference signal described in the foregoing embodiments.

It should be noted that the method according to the above embodiments is also applicable to the case where there is only linear component but no nonlinear component, that is, the case where only p=1 is considered.

Some embodiments of using the time-domain channel estimation method to estimate the digital self-interference channel are described above. In other embodiments, the method for frequency domain channel estimation may also be used to estimate the digital self-interference channel. For example, after using the frequency domain channel estimation method to estimate the digital self-interference channel, the estimated channel may be converted into a time domain channel, and then the self-interference signal may be reconstructed and canceled in the time domain. Some implementations of using frequency domain channel estimation methods to estimate digital self-interference channels are described below.

Generally, the number of subcarriers occupied by signals is less than or even much less than FFT size, thus when performing the frequency domain channel estimation, only the channel estimation on subcarriers occupied by the signal can be estimated and obtained, but the channel estimation on subcarriers not occupied by the signal cannot be obtained. Therefore, it is necessary to use the frequency domain channel estimation results on some of the subcarriers to recover the time domain channel estimation.

On the basis of this, in some implementations of the present disclosure, signal estimation and recovery may be performed in the following manners:
- Signal truncation: for example, the CP may be removed according to the timing of the receive signal, and the time domain signal with the length of half of the FFT size may be truncated, inverse Fourier transform with half of the FFT size may be performed on the truncated time domain signal, and the frequency domain signal on the subcarrier occupied by the signal may be obtained.
- Frequency domain channel estimation: for example, the frequency domain channel estimation may be performed according to the frequency domain reference signal, in order to obtain the frequency domain channel estimation on the subcarrier occupied by the signal, in which the frequency domain channel estimation includes the channel estimation on the subcarrier occupied by the reference signal and the possible frequency domain interpolation.
- Let the channel estimation value obtained by frequency domain channel estimation be $\bar{h}_f = [h_f(0), \ldots, h_f(N_{BW}-1)]^T$, where $N_{BW}$ is the number of subcarriers occupied by the signal. It should be noted that the subcarriers occupied by the signal take index 0 as a starting point. The relationship between the frequency domain channel and the time domain channel may be expressed as:

$$\bar{h}_f = W_N^{-1} \bar{h}_t$$

where, $W_N$ represents an FFT matrix of a size N, and its inverse matrix $W_N^{-1}$ represents an IFFT matrix of a size N. $\bar{h}_t$ represents the time domain channel vector after padding zeros, where the number of non-zero values is determined by the number of the time domain channel multipaths. For example, if the number of the time domain channel multipaths is L, the first L values of the vector $\bar{h}_t$ are non-zero, and the last N-L values are 0s, where the vector $\bar{h}_f$ is the frequency domain channel corresponding to $\bar{h}_t$.

For example, if the frequency domain channel indexes occupied by the signal start from m to $n = m + N_{BW} - 1$, where $N_{BW}$ is the number of subcarriers of the frequency band occupied by the signal, the m-th element to the n-th element in the vector $\bar{h}_f$ may be obtained by frequency domain channel estimation; while the number of elements to be estimated in the time domain vector $\bar{h}_t$ (i.e., the number of sampling points) is L, the relationship between the frequency domain channel and the time channel may be further expressed as:

$$\bar{h}_f(m:n) = W_N^{-1}(m:n, 1:L)\bar{h}_t(1:L)$$

where $\bar{h}_f(m:n)$ represents a vector composed of the m-th element to the n-th element in vector $\bar{h}_f$, $\bar{h}_t(1:L)$ represents a vector composed of the first L elements in vector $\bar{h}_t$, and $W_N^{-1}(m:n, 1:L)$ represents a submatrix composed of the m-th row to the n-th row and the first column to the L-th column of the matrix $W_N^{-1}$. Furthermore, let $W = W_N^{-1}(m:n, 1:L)$, the estimation value $\hat{h}_t$ of $\bar{h}_t(1:L)$ may be expressed as:

$$\hat{h}_t = (W^H W)^{-1} W^H \bar{h}_f(m:n)$$

For example, the estimation value $\hat{h}_t$ may be used as the time-domain channel estimation converted from the frequency-domain channel estimation. After obtaining the time-domain channel estimation converted from the frequency-domain channel estimation, the time-domain self-interference signal may be reconstructed according to the above method, and the time-domain digital self-interference cancellation may be completed.

FIG. 13 illustrates a block diagram of an apparatus for self-interference cancellation according to some embodiments of the present disclosure. For example, the apparatus 1300 may be a base station or a terminal, or be implemented as a part of the base station or the terminal. Alternatively, the apparatus may be an IAB node or an IAB donor, or be implemented as a part of an IAB node or an IAB donor.

Referring to FIG. 13, the apparatus 1300 for self-interference cancellation according to some embodiments of the present disclosure may include a transceiver 1301 and a controller 1302. For example, the controller 1302 may be coupled to the transceiver 1301. The transceiver 1301 may be configured to transmit and receive signals, for example. The controller 1302 may be configured to perform the method for self-interference cancellation described above, for example.

FIG. 14 illustrates a block diagram of a configuration of a terminal according to some embodiments of the present disclosure.

Referring to FIG. 14, a terminal 1400 according to some embodiments of the present disclosure may include a transceiver 1401 and a controller 1402. For example, the controller 1402 may be coupled to the transceiver 1401. The transceiver 1401 may be configured to transmit and receive signals, for example. The controller 1402 may be configured to perform the method according to some embodiments described above, for example.

Although the terminal is illustrated as including separate functional blocks for convenience of explanation, the configuration of the terminal 1400 is not limited thereto. For example, the terminal 1400 may include a communication unit including a transceiver and a processor. The terminal 1400 may communicate with at least one network node by means of the communication unit.

FIG. 15 illustrates a block diagram of a configuration of a base station according to some embodiments of the present disclosure.

Referring to FIG. 15, a base station 1500 according to some embodiments of the present disclosure may include a transceiver 1501 and a controller 1502. For example, the controller 1502 may be coupled to the transceiver 1501. The transceiver 1501 may be configured to transmit and receive signals, for example. The controller 1502 may be configured to perform the method according to some embodiments described above, for example.

Although the base station 1500 is illustrated as including separate functional blocks for convenience of explanation, the configuration of the base station is not limited thereto. For example, the base station 1500 may include a communication unit including a transceiver and a processor. The base station 1500 may communicate with at least one network node by means of the communication unit.

FIG. 16 illustrates a block diagram of a configuration of a wireless communication system according to some embodiments of the present disclosure.

Referring to FIG. 16, a wireless communication system 1600 according to some embodiments of the present disclosure may include a terminal 1400 shown in FIG. 14 and a base station 1500 shown in FIG. 15. The terminal 1400 may communicate with the base station 1500 through a radio link.

FIG. 17 illustrates a block diagram of a configuration of an IAB node according to some embodiments of the present disclosure.

Referring to FIG. 17, an IAB node 1700 according to some embodiments of the present disclosure may include a transceiver 1701 and a controller 1702. For example, the controller 1702 may be coupled to the transceiver 1701. The transceiver 1701 may be configured to transmit and receive signals. For example, the controller 1702 may be configured to perform the method according to some embodiments described above.

While the IAB node 1700 is illustrated as having separate functional blocks for convenience of explanation, the configuration of the IAB node 1700 is not limited thereto. For example, the IAB node 1700 may include a communication unit including the transceiver and the processor. The IAB node 1700 may communicate with at least one network node by means of the communication unit.

FIG. 18 illustrates a block diagram of the configuration of an IAB donor according to some embodiments of the present disclosure.

Referring to FIG. 18, an IAB host 1800 according to some embodiments of the present disclosure may include a transceiver 1801 and a controller 1802. For example, the controller 1802 may be coupled to the transceiver 1801. The transceiver 1801 may be configured to transmit and receive signals, for example. The controller 1802 may be configured to perform the method according to some embodiments described above.

While the IAB donor 1800 is illustrated as including separate functional blocks for convenience of explanation, the configuration of the IAB donor 1800 is not limited thereto. For example, the IAB donor 1800 may include a communication unit including a transceiver and a processor. The IAB donor 1800 may communicate with at least one network node by means of the communication unit.

FIG. 19 illustrates a block diagram of a configuration of a wireless communication system according to some embodiments of the present disclosure.

Referring to FIG. 19, a wireless communication system 19 according to some embodiments of the present disclosure may include an IAB node 1700 shown in FIG. 17 and an IAB host 1800 shown in FIG. 18. The IAB node 1700 may communicate with the IAB host 1800 through a radio link.

At least part of the apparatus (e.g., modules or functions thereof) or the method (e.g., operations) according to various embodiments of the present disclosure may be implemented by an instruction which is stored in a computer-readable storage medium (e.g., the memory) in a form of a program module. When executed by a processor or controller, the instruction may enable the processor or controller to perform corresponding functions. The computer-readable medium may include, for example, a hard disk, a floppy disk, a magnetic media, an optical recording media, a DVD, a magneto-optical media, and the like. The instructions may include a code made by a compiler or a code which can be executed by an interpreter. The module or apparatus according to various embodiments of the present disclosure may include at least one or more of the aforementioned elements, some of the aforementioned elements may be omitted, or may further include other additional elements. Operations executed by the module, program module, or other elements according to various embodiments of the present disclosure may be executed sequentially, in parallel, repeatedly, or in a heuristic manner. Alternatively, at least some operations may be executed in a different order or may be omitted, or other operations may be added.

Hereinafter, some embodiments of a method and apparatus for transmitting signal and receiving signal among some embodiments of the present disclosure will be described with reference to FIGS. 20 to 37.

Self-interference cancellation technology may include antenna cancellation/isolation technology, radio frequency cancellation technology and digital-domain cancellation technology, in which the digital-domain cancellation technology refers to estimating a self-interference channel in a digital baseband, calculating a self-interference signal according to a known transmitted signal and the estimated self-interference channel, and then deleting the self-interference signal from a received signal. From the description of this process, it can be seen that the key point of the digital-domain cancellation technology lies in a degree of accuracy of self-interference channel estimation. And the performance of the self-interference channel estimation depends on a design of a physical reference signal.

Many factors need to be considered when designing a reference signal for self-interference channel estimation. First of all, the designed reference signal should take into account that it is not interfered by reception of an expected signal when using the reference signal for self-interference channel estimation, thus it is necessary to distinguish time-domain and/or frequency-domain physical resources between the reception of the expected signal and the transmission of the reference signal. Secondly, the designed reference signal should take into account possible timing misalignment between transmitting and receiving of a full-duplex communication node (such as a base station and a terminal). For example, in the existing NR, LTE and other systems, the uplink transmission of a terminal will be transmitted in advance relative to its downlink reception timing, and the time of the advanced transmission depends on a distance between the terminal and the base station, and different terminals have different time of the advanced transmission. Finally, the designed reference signal should take into account that the full-duplex communication node may perform multiple-layer transmission, thus it is necessary to support multiple antenna ports. Hereinafter, for convenience of description, an "antenna port" will be simply referred to as a "port".

Base stations involved in this disclosure include, but are not limited to, eNBs, gNBs, and IAB nodes, etc. And terminals involved in this disclosure include, but are not limited to, mobile terminals and IAB nodes, etc.

FIG. 20 is a diagram showing a full-duplex system 2000 according to some embodiments of the present disclosure. As shown in FIG. 1, the full-duplex system 2000 includes 4 IAB nodes IAB 2001, 2002, 2003 and 2004 that directly communicate with a base station 2020. A mobile terminal (MT) module of each IAB node has a full-duplex communication function. Although 4 IAB nodes are shown in FIG. 20, the number of IAB nodes is not limited thereto, and the full-duplex system 2000 may include more or less IAB nodes. In addition, the full-duplex system 2000 includes user terminals 2005 and 2007 that directly communicate with the base station 2020, and also includes user terminals 2006, 2008, 2009, 2010, and 2011 that directly communicate with the IAB nodes. This is only an example, and the number of user terminals is not limited thereto.

FIG. 21 illustrates a method for transmitting a first physical signal by a first device 3000 in a wireless communication system according to some embodiments of the present disclosure.

In which, the first device 3000 may be a base station, a terminal, an IAB node, and the like.

Referring to FIG. 21, at step 2100, the first device 3000 maps a sequence of each antenna port for the first physical signal to a same plurality of subcarriers on same one or more OFDM symbols based on a frequency-domain mapping pattern of the first physical signal.

Specifically, the first physical signal is a physical signal supporting multi-port configuration. The meaning of the physical signal includes, but is not limited to, a dedicated physical signal for self-interference cancellation; a physical signal that may be used for self-interference cancellation, such as a demodulation reference signal, including a demodulation reference signal for an uplink/downlink shared channel, a demodulation reference signal for an uplink/downlink control channel, a demodulation reference signal for a broadcast channel, etc.; a sounding reference signal (SRS); a channel state information reference signal (CSI-RS), etc.

At step 2120, the first device 3000 transmits the first physical signal.

Next, a mapping method of the first physical signal will be described in more detail with reference to FIG. 22.

FIG. 22 illustrates a method for transmitting a first physical signal by a first device in a wireless communication system according to seom embodiments of the present disclosure.

Referring to FIG. 22, at step 2200, the first device 3000 determines features of the first physical signal.

The features of the first physical signal include at least one of the followings: a time-domain/frequency-domain mapping pattern, a multi-port time-domain/frequency-domain orthogonal code, a multi-port sequence, a cyclic shift of the multi-port sequence, etc. of the first physical signal.

The features of the first physical signal can be determined based on two modes (Mode A and Mode B below).

Mode A: being based on obtained configuration information

The first device 3000 may determine the features of the first physical signal according to the obtained configuration information.

When the first device 3000 is a terminal, the first device 3000 may acquire configuration information from a base station. When the first device 3000 is a base station, the first device 3000 may configure the configuration information. When the first device 3000 is an IAB, the first device 3000 may acquire the configuration information from an IAB-Donor or a Parent IAB. The configuration information can be obtained via higher layer signaling and/or physical layer signaling (for example, downlink control signaling or uplink control signaling, etc.).

For example, the configuration information may indicate a type of the first physical signal. The type of the first physical signal indicated by the configuration information includes, but is not limited to, a multi-port physical signal with a frequency-domain mapping density of ½ (which will be described later with reference to FIG. 23); a multi-port physical signal with a frequency-domain mapping density of ¼ (which will be described later with reference to FIG. 26); a type of a physical signal and a reference signal supported in the existing NR, LTE evolution and LTE systems; or other physical signals used for self-interference channel estimation.

The first device 3000 may determine the type of the first physical signal according to the obtained configuration information, and then determine the features of the first physical signal according to the type of the first physical signal. The features of the first physical signal determined by the first device 3000 based on the type of the first physical signal include at least one of the followings: a time-domain/frequency-domain mapping pattern, a multi-port time-domain/frequency-domain orthogonal code, a multi-port sequence, a cyclic shift of the multi-port sequence, etc. of the first physical signal.

For another example, the configuration information may be configuration information indicating full-duplex or configuration information related to full-duplex. When the first device 3000 obtains configuration information for full-duplex, it determines to perform full-duplex transmission on physical resources for transmitting the first physical signal, and then adopts a multi-port physical signal with a frequency-domain mapping density of ½ or ¼; otherwise, when the first device 3000 does not obtain the full-duplex configuration information, or determines according to the configuration information for full-duplex not to perform the full-duplex transmission on the physical resources for transmitting the physical signal, a physical signal and a reference signal of the existing system, such as a demodulation reference signal Type A and a demodulation reference signal Type B, are adopted. The advantage of this mode is that an appropriate physical signal type may be selected according to different transmission modes such as full-duplex or non-full-duplex (e.g., TDD, FDD, etc.), so as to improve the utilization efficiency of physical resources, the performance of self-interference channel estimation, the performance of uplink/downlink channel estimation, etc. Otherwise, if a physical signal of the existing system is used for full-duplex transmission, the performance of self-interference channel estimation cannot be guaranteed; however, if a physical signal designed for full-duplex is used for non-full-duplex transmission, the utilization efficiency of physical resources is low, or the performance of uplink/downlink channel estimation cannot be guaranteed.

Mode B: being based on a number of ports for the first physical signal

The first device 3000 may determine the features of the first physical signal according to the number of ports for the first physical signal.

If it is determined that the first physical signal is transmitted in full-duplex, the first device 3000 may select a multi-port physical signal with a frequency-domain mapping density of ½ or ¼ according to the number of ports for the first physical signal; otherwise, the first device 3000 uses the physical signal and the reference signal of the existing system, such as the demodulation reference signal Type A, the demodulation reference signal Type B, etc., as previously described. After it is determined that the first physical signal is transmitted in full-duplex, when the maximum number of ports supported by the first physical signal is greater than $N_{th\_port}$, a multi port physical signal with a frequency-domain mapping density of ½ is adopted; when the maximum number of ports supported by the first physical signal is smaller than $N_{th\_port}$, a multi-port physical signal with a frequency-domain mapping density of ¼ is adopted. The advantage of this mode is that the utilization efficiencies of physical resources of multi-port physical signals with frequency-domain mapping density of ½ and ¼ are different, and both the utilization efficiencies of physical resources are related to the number of ports. Therefore, the system transmission rate may be improved by supporting the selection of a physical signal with a higher utilization efficiency of physical resources according to the number of ports.

By determining, by the first device 3000, the features of the first physical signal according to at least one of the obtained configuration information and the number of ports for the first physical signal, so as to flexibly use different types of physical signals according to the current scenario, a better self-interference channel estimation performance and/or uplink/downlink channel estimation performance may be achieved.

With continued reference to FIG. 22, at step 2220, the first device 3000 maps the sequence of each antenna port for the first physical signal to the same plurality of sub-carriers on the same one or more OFDM symbols based on the frequency-domain mapping pattern among the features of the first physical signal.

The present disclosure describes two frequency mapping patterns, where the first frequency mapping pattern is shown in FIG. 23 and the second frequency mapping pattern is shown in FIG. 26.

When the frequency-domain mapping pattern of the first physical signal is the first frequency-domain mapping pattern, all sequences of all antenna ports for the first physical signal are mapped to the plurality of subcarriers on the same one or more OFDM symbols at an interval of 1 subcarrier.

Specifically, when mapping the first physical signal supporting the multi-port configuration in the frequency-domain, the first physical signal may be mapped only on the sub-carriers with even indexes or only on the sub-carriers with odd indexes. That is, the frequency-domain mapping density of the first physical signal is ½, and the mapping is performed on every other subcarrier in the frequency-domain.

Preferably, assuming that an index value of the first subcarrier in a Physical Resource Block is 0, the first physical signal may be mapped on subcarriers with even indexes, and on the same OFDM symbols which the first physical signal are mapped to, sub-carriers with odd indexes in the same physical resource block are not used for the mapping of other ports for the first physical signal, that is, the frequency-domain mapping of any port for the first physical signal is performed on every other subcarrier from the first subcarrier in the allocated first physical resource block. FIG. 23 shows a schematic diagram of the first frequency-domain mapping pattern. Taking the first physical signal being mapped to a single physical resource block on a certain OFDM symbol as an example, the multi-port physical signal is mapped on subcarriers $2i$, $i=0, \ldots, 5$, while subcarriers $2i+1$, $i=0, \ldots, 5$ are not used for mapping of the physical signal. However, the present disclosure is not limited thereto, and the first physical signal may be mapped to a plurality of physical resource blocks on a plurality of OFDM symbols.

The advantage of adopting the first frequency-domain mapping pattern is that: according to characteristics of the Fourier transform, the Fourier transformed time-domain signal of the first physical signal mapped every other subcarrier from the first subcarrier in the frequency-domain is a repetition of a time-domain sequence with a length of half the Fourier size, so the self-interference channel estimation may use a reception window with the length of half the Fourier size to receive the first physical signal for a time-domain channel estimation. Note that a normal reception window (i.e., a reception window for an expected signal) of a reception end is with a length of the Fourier size. Using a reception window half the size of the normal reception window for the self-interference channel estimation may ensure that a full-duplex communication node may intercept a complete sequence in a smaller window within the normal reception window even when timing misalignment exists, as shown in FIG. 8, where CP represents a cyclic prefix of an OFDM symbol.

For the first physical signal mapped in frequency-domain according to the first frequency-domain mapping pattern, there is no signal transmission on the corresponding OFDM symbols in the transmission direction opposite to that of the first physical signal. The signal may be either an expected signal transmitted by at least one second device communicating with the first device 3000 and expected to be received by the first device 3000, or a signal transmitted by the at least one second device and not expected to be received by the first device 3000 (for example, a signal for self-interference channel estimation of the at least one second device). The second device may be a base station, a terminal, an IAB, etc. For example, when the first device 3000 is a terminal, the expected signal may be a downlink signal transmitted by the base station to the terminal. For another example, when the first device 3000 is an IAB, the expected signal may be a downlink signal transmitted to the IAB by a Parent IAB and/or an uplink signal transmitted to the IAB by a Child IAB. Specifically, when the first physical signal is a downlink physical signal, no uplink transmission of a signal is configured on the same OFDM symbol of the same wireless frame, the same subframe/slot/mini slot for transmission of the first physical signal; and/or when the first physical signal is an uplink physical signal, no downlink transmission of a signal is configured on the same OFDM symbol of the same wireless frame, the same subframe/slot/mini slot for transmission of the first physical signal. The advantage of this mode is that: when the first physical signal is used for self-interference channel estimation, there is no expected signal in a reception direction (i.e., a transmission direction opposite to that of the transmission of the first physical signal), which can ensure that the self-interference channel estimation is not interfered by reception of an expected signal, thus ensuring the accuracy of the self-interference channel estimation.

Further, the first physical signal and an unexpected signal transmitted by at least one second device communicating with the first device 3000 (for example, a signal for self-interference channel estimation of the at least one second device) may be mapped to a front end and a tail end (or, a tail end and a front end) of the allocated time-domain symbols, respectively. Specifically, the first physical signal may occupy the first N OFDM symbols in the allocated time-domain symbols, and the signal for self-interference channel estimation of the at least one second device may occupy the last M OFDM symbols in the allocated time-domain symbols, where N and M are integers greater than 0; alternatively, the first physical signal may occupy the last M OFDM symbols in the allocated time-domain symbols, and the signal for self-interference channel estimation of the at least one second device may occupy the first N OFDM symbols in the allocated time-domain symbols. Here, the first physical signal and the signal for self-interference channel estimation of the at least one second device may be an uplink/downlink demodulation reference signal, or some OFDM symbols of the uplink/downlink demodulation reference signal.

For example, when the first device 3000 is a terminal, the first physical signal transmitted by the terminal may occupy the first N OFDM symbols in the allocated time-domain symbols, and the signal for self-interference channel estimation of the base station transmitted by the base station may occupy the last M OFDM symbols in the allocated time-domain symbols; alternatively, the first physical signal transmitted by the terminal may occupy the last M OFDM symbols in the allocated time-domain symbols, and the signal transmitted by the base station for self-interference channel estimation of the base station may occupy the first N OFDM symbols in the allocated time-domain symbols.

Furthermore, in this scheme, the starting OFDM symbol of the uplink (or downlink) physical channel may be configured after N OFDM symbols of the downlink (or uplink) physical signal, and the ending OFDM symbol of the downlink (or uplink) physical channel may be configured before M OFDM symbols of the uplink (or downlink) physical signal.

FIG. 25 illustrates a time-domain resource allocation according to some embodiments of the present disclosure, in which the uplink physical signal occupies the first N OFDM symbols of uplink physical channel transmission and the downlink physical signal occupies the last M OFDM symbols of downlink physical channel transmission.

The advantage of this mapping mode is that: when it is necessary to ensure that there is no uplink transmission on the same OFDM symbol for downlink physical signal transmission and/or there is no downlink transmission on the same OFDM symbol for uplink physical signal transmission, letting the uplink (or downlink) physical signal be at the front end and the tail end of the uplink (or downlink) physical channel transmission respectively can be realized by configuring the time-domain resources for uplink/downlink physical channel, thus avoiding the influence on the existing configuration process and content caused by the independent configuration of non-transmission OFDM symbols and avoiding transmission interruption caused by the configuration of the non-transmission OFDM symbols in the downlink (or uplink) physical channel.

Sequences of different ports of the multi-port first physical signal with the above-mentioned first frequency-domain mapping pattern may be sequences multiplied by a frequency-domain code, and may be orthogonal sequences, and may be mapped on subcarriers with the same index in the same OFDM symbol. Particularly, the orthogonal sequences of different ports may be Zadoff-Chu (ZC) sequences with a same root sequence and different cyclic shifts, and values of the cyclic shifts of different ports are even numbers, and a physical signal of 6 ports at most may be supported. For example, the value of cyclic shift of a 2-port physical signal may be $N_{cs} \in \{0, 6\}$; the value of cyclic shift of a 3-port physical signal can be $N_{cs} \in \{0, 4, 8\}$; the value of cyclic shift of a 4-port physical signal may be $N_{cs} \in \{0, 4, 8, 10\}$ or $N_{cs} \in \{0, 2, 6, 10\}$; the value of cyclic shift of a 5-port physical signal may be $N_{cs} \in \{0, 2, 4, 6, 8\}$ or $N_{cs} \in \{0, 2, 4, 6, 8, 10\}$; the value of cyclic shift of a 6-port physical signal may be $N_{cs} \in \{0, 2, 4, 6, 8, 10\}$. Let k represents the k-th element in the physical signal sequence, then the cyclic shift phase of the k-th element is $$e^{j2\pi \frac{N_{cs} \cdot k}{12}}.$$

Characteristics of the ZC sequence ensure that sequences of different ports for the first physical signal are orthogonal in both time-domain and frequency-domain, and when the physical signal sequences of different ports with the same root sequence and different cyclic shifts are mapped on the resource elements with even subcarrier sequence numbers on the same OFDM symbol, the reception window for self-interference channel estimation shown in FIG. 8 may intercept complete time-domain sequences of physical signals of different ports. These sequences being orthogonal may ensure that the self-interference channel estimation of different ports does not interfere with each other, and self-interference channel estimation may be performed independently, thus reducing the complexity of channel estimation.

Alternatively, when the frequency-domain mapping pattern of the first physical signal is the second frequency-domain mapping pattern, all sequences of all antenna ports for the first physical signal are mapped to the plurality of subcarriers on the same one or more OFDM symbols at an interval of 3 subcarriers.

In this case, the first physical signal supporting the multi-port configuration is mapped every 4 subcarriers in the frequency-domain (that is, the frequency-domain mapping density of the first physical signal is ¼), that is, every other 3 subcarriers. Preferably, it is assumed that the index value of the first subcarrier in the physical resource block is 0, and all ports for the first physical signal are mapped on subcarriers whose index k satisfies k=4n,n=0,1, . . . ; or all ports for the physical signal are mapped on subcarriers whose index k satisfies k=4n+2,n=0,1, . . . . Taking the first physical signal being mapped to a single physical resource block on a certain OFDM symbol as an example, FIG. 26 gives a schematic diagram of the second frequency-domain mapping pattern. However, the present disclosure is not limited thereto, and the first physical signal may be mapped to a plurality of physical resource blocks on a plurality of OFDM symbols.

The frequency-domain mapping mode using the second frequency-domain mapping pattern has two advantages:

Advantage 1: according to characteristics of the Fourier transform, when the first physical signal is mapped on subcarriers whose subcarrier indexes satisfy k=4n, n=0,1, . . . or k=4n+2,n=0,1, . . . , the Fourier transformed time-domain signal is four repetitions of a time-domain sequence with a length of one quarter of the Fourier size, so the self-interference channel estimation may use a reception window with the length of half or one quarter of the Fourier size to receive the physical signal for time-domain channel estimation. Note that a normal reception window (i.e., a reception window for an expected signal) of a reception end is with a length of the Fourier size. Using a smaller reception window for self-interference channel estimation may ensure that a full-duplex communication node may intercept a complete sequence in a smaller window within the normal reception window even when timing misalignment exists. It is worth noting that when adopting the reception window with a length of half the Fourier size, applicable scenarios of this mode are the same as that of the first frequency-domain mapping pattern mentioned above, as shown in FIG. 24; however, when adopting the reception window with a length of one quarter of the Fourier size, this mode may be applied to scenarios with more serious timing misalignment, as shown in FIG. 27.

Advantage 2: the transmission of the first physical signal and the reception of the expected signal/second physical signal transmitted from at least one second device communicating with the first device 3000 may be distinguished by frequency division on the same OFDM symbol, so as to realize that when using the first physical signal for the self-interference channel estimation, no interference is caused by the reception of the expected signal. Specifically, according to characteristics of the Fourier transform and the time-domain sampling principle, when one of the transmission of the first physical signal and the reception of the expected signal/second physical signal is mapped on the subcarriers with indexes k=4n,n=0,1, . . . , while the other is mapped on the subcarriers with indexes k=4n+2,n=0, 1, . . . , when the first physical signal is used for the self-interference channel estimation in time-domain, energy of the expected signal at each time-domain sampling point of the first physical signal is 0, that is, no interference is caused by the reception of the expected signal/second physical signal. For example, the transmission of the first physical signal may be mapped on sub-carriers with indexes k=4n, n=0,1, . . . , and the reception of at least one of the expected signal and the second physical signal may be mapped on subcarriers with indexes k=4n+2,n=0,1, . . . . Herein, the expected signal may be a signal transmitted by at least one second device communicating with the first device 3000 and expected to be received by the first device 3000. Herein, the second physical signal is a signal transmitted by the at least one second device and not expected to be received by the first device 3000, for example, a physical channel or a physical signal used for self-interference channel estimation of the at least one second device.

Considering the advantage 2, when there is a full-duplex transmission of a base station and/or a full-duplex transmission of a terminal, the uplink and downlink physical signal mapping patterns are jointly designed to ensure the self-interference channel estimation performance of the base station and/or the terminal. Meanwhile, such joint design is also applicable to a full-duplex scenario for a parent link and a child link of an IAB base station, and at this time, it is a scheme of mapping patterns of parent-link downlink physical signal and child-link downlink physical signal, or a scheme of mapping patterns of parent-link uplink physical signal and child-link uplink physical signal, which may be realized by replacing the downlink physical signal with the child-link downlink physical signal/parent-link uplink physical signal and replacing the uplink physical signal with the child-link uplink physical signal/parent-link downlink physical signal, respectively. In the following, the jointly designed uplink and downlink physical signal mapping patterns will be explained by taking the full-duplex transmission scenario of the base station and/or terminal in a single cell as an example.

Specifically, the uplink multi-port physical signal and the downlink multi-port physical signal may be mapped on subcarriers with different indexes on the same OFDM symbol in time-domain. Specifically, when the uplink multi-port physical signal is mapped on subcarriers whose indexes satisfy k=4n,n=0,1, . . . , the downlink multi-port physical signal is mapped on subcarriers whose indexes satisfy k=4n+2,n=0,1, . . . ; or when the downlink multi-port physical signal is mapped on sub-carriers whose indexes satisfy k=4n,n=0,1, . . . , the uplink multi-port physical signal is mapped on subcarriers whose indexes satisfy k=4n+2,n=0,1, . . . . That is, when the uplink multi-port first physical signal is mapped on the subcarriers whose indexes satisfy k=4n,n=0,1, . . . , the downlink expected signal/second physical signal may be mapped on the subcarriers whose indexes satisfy k=4n+2,n=0,1, . . . ; or when the multi-port first physical signal of the downlink is mapped on the sub-carriers whose indexes satisfy k=4n,n=0,1, . . . , the uplink expected signal/second physical signal may be mapped on the sub-carriers whose indexes satisfy k=4n+2, n=0,1, . . . .

In addition, the scheme is not limited to mapping of the first physical signal, that is, the uplink/downlink physical signal may also be replaced by the uplink/downlink physical channel. For example, assuming that the base station performing full-duplex transmission uses a downlink demodulation reference signal for self-interference channel estimation, the downlink demodulation reference signal and the uplink physical channel (e.g., an uplink control channel, an uplink shared channel, etc.) may be configured on subcarriers with subcarrier indexes of k=4n,n=0,1, . . . and k=4n+2,n=0,1, . . . on the same OFDM symbol respectively, that is, on the same OFDM symbol as that for the downlink demodulation reference signal, the frequency-domain mapping mode of the uplink physical channel is also a mapping with a density of ¼, and the subcarrier indexes for the uplink physical channel differ from the subcarrier indexes for the downlink demodulation reference signal by 2.

Further, the first physical signal and an unexpected signal transmitted by at least one second device communicating with the first device 3000 (for example, a signal for self-interference channel estimation of the at least one second device) may be mapped to a front end and a tail end (or, a tail end and a front end) of the allocated time-domain symbols, respectively. Specifically, as shown in FIG. 25, the first physical signal may occupy the first N OFDM symbols in the allocated time-domain symbols, and the signal for self-interference channel estimation of the at least one second device may occupy the last M OFDM symbols in the allocated time-domain symbols, where N and M are integers greater than 0; alternatively, the first physical signal may occupy the last M OFDM symbols in the allocated time-domain symbols, and the signal for self-interference channel estimation of the at least one second device may occupy the first N OFDM symbols in the allocated time-domain symbols. Here, the first physical signal and the signal for self-interference channel estimation of the at least one second device may be an uplink/downlink demodulation reference signal, or some OFDM symbols of the uplink/downlink demodulation reference signal.

For example, when the first device 3000 is a terminal, the first physical signal transmitted by the terminal may occupy the first N OFDM symbols in the allocated time-domain symbols, and the signal for self-interference channel estimation of the base station transmitted by the base station may occupy the last M OFDM symbols in the allocated time-domain symbols; alternatively, the first physical signal transmitted by the terminal may occupy the last M OFDM symbols in the allocated time-domain symbols, and the signal transmitted by the base station for self-interference channel estimation of the base station may occupy the first N OFDM symbols in the allocated time-domain symbols.

Furthermore, in this scheme, the starting OFDM symbol of the uplink (or downlink) physical channel may be configured after N OFDM symbols of the downlink (or uplink) physical signal, and the ending OFDM symbol of the downlink (or uplink) physical channel may be configured before M OFDM symbols of the uplink (or downlink) physical signal.

The advantage of this mapping mode is that: when it is necessary to ensure that there is no uplink transmission on the same OFDM symbol for downlink physical signal transmission and/or there is no downlink transmission on the same OFDM symbol for uplink physical signal transmission, letting the uplink (or downlink) physical signal be at the front end and the tail end of the uplink (or downlink) physical channel transmission respectively can be realized by configuring the time-domain resources for uplink/downlink physical channel, thus avoiding the influence on the existing configuration process and content caused by the independent configuration of non-transmission OFDM symbols and avoiding transmission interruption caused by the configuration of the non-transmission OFDM symbols in the downlink (or uplink) physical channel.

Sequences of different ports of the multi-port first physical signal with the above-mentioned second frequency-domain mapping pattern may be sequences multiplied by a frequency-domain code, and may be orthogonal sequences, and may be mapped on subcarriers with the same index in the same OFDM symbol. Particularly, the orthogonal sequences of different ports may be ZC sequences with a same root sequence and different cyclic shifts. An example of the values of cyclic shift of different ports for the physical signal is that the values of cyclic shift of different ports are unrelated to the number of physical resource blocks for the transmission of the physical signal, and the values of cyclic shift are multiples of 4, and a physical signal of 3 ports at most may be supported. For example, the value of cyclic shift of a 2-port physical signal may be $N_{cs} \in \{0,4\}$, $N_{cs} \in \{0,8\}$, or $N_{cs} \in \{4,8\}$; the value of cyclic shift of a 3-port physical signal can be $N_{cs} \in \{0,4,8\}$. Let k represents the k-th element in the physical signal sequence, then the cyclic shift phase of the k-th element is $e^{j2\pi N_{cs} \cdot k/12}$. Another example of the values of cyclic shift of different ports for the physical signal is that the values of cyclic shift of different ports are related to the number of physical resource blocks for the transmission of the first physical signal, that is, the value of cyclic shift of respective port for the first physical signal is determined by the first device 1400 (e.g., a terminal) according to the number of physical resource blocks allocated for the transmission of the physical signal. For example, assuming that a maximum number of ports supported by the first physical signal on the same OFDM symbol by way of frequency-domain orthogonal sequence is $N_{port}$, and the number of allocated physical resource blocks for the transmission of the first physical signal is $N_{PRB}$, then the value of cyclic shift of port p=0, . . . , $N_{port}-1$ of the first physical signal is $$N_{cs} = \frac{3 \cdot N_{PRB}}{N_{port}} \cdot p.$$

Considering that $N_{cs}$ is an integer, $$N_{cs} = \left\lfloor \frac{3 \cdot N_{PRB}}{N_{port}} \cdot p \right\rfloor \text{ or } N_{cs} = \left\lceil \frac{3 \cdot N_{PRB}}{N_{port}} \cdot p \right\rceil$$

may be adopted. Let k represents the k-th element in the physical signal sequence, then the cyclic shift phase of the k-th element is $$e^{j2\pi \frac{N_{cs} \cdot k}{3 \cdot N_{PRB}}}.$$

The method for determining the values of cyclic shift of the ports for the first physical signal according to the number of physical resource blocks has the advantages that cyclic shifts of different ports may be determined according to an actual length of the sequence of the first physical signal, and the first physical signal may support transmission with more ports by way of orthogonal sequence under the condition of allowing long sequences (i.e., physical signals are allocated with many physical resource blocks), and the design of the value of cyclic shift $N_{cs}$ may ensure that the cyclic shift difference of different ports is as large as possible, thus ensuring the channel estimation performance of different ports. To sum up, through the above methods, the sequences of the first physical signal of different ports are ensured to be orthogonal in time-domain and frequency-domain by the characteristics of ZC sequences; and, when the sequences with the same root sequence and different cyclic shifts of different ports for the first physical signal are mapped on the resource elements with even subcarrier indexes on the same OFDM symbol, the reception window for self-interference channel estimation shown in FIG. 24 and FIG. 27 may intercept two or one complete time-domain sequence of different ports for the first physical signal, and these sequences being orthogonal may ensure that the self-interference channel estimation of different ports does not interfere with each other, and the estimation may be performed independently, thus reducing the complexity of channel estimation.

With continued reference to FIG. 22, at step 2240, the first device 3000 spreads the sequence of each antenna port for the first physical signal mapped to the same plurality of subcarriers on the same one or more OFDM symbols to at least two OFDM symbols by way of a time-domain code. Step 2240 is optional and may not be performed.

The above spreading will be discussed in two cases below.

Case 1. Time-Domain Code Spreading for the First Frequency-Domain Mapping Pattern:

After mapping the sequence of each antenna port for the first physical signal onto the same plurality of subcarriers on the same one or more OFDM symbols according to the first frequency-domain mapping pattern, optionally, the physical signals of different ports for the first physical signal may be mapped on the same subcarriers on different OFDM symbols by way of orthogonal code division multiplexing. Specifically, all frequency-domain symbols of the sequence of the first physical signal of the same port are multiplied by a same time-domain code (e.g., a time-domain orthogonal code) to spread to resource elements with subcarrier indexes of 2n, n=1, 2, . . . , on multiple OFDM symbols, and when the first physical signals of any two ports adopt a sequence of the same frequency-domain symbols, different time-domain orthogonal codes are used respectively. Herein, the meaning of the sequence of a certain port for the first physical signal includes: a sequence multiplied by the frequency-domain code, a cyclic-shifted sequence, or a same sequence used by all ports.

For example, let the sequence of port p for the first physical signal be r(k), where k represents the index of the subcarrier to which the first physical signal is mapped and k=2n,n=0,1, . . . . The time-domain orthogonal code of port p is denoted as w(l), where l represents the OFDM symbol index to which the sequence is mapped after spreading by way of a time-domain code. Then the symbol mapping of the sequence of port p for the first physical signal after spreading by way of time-domain code may be expressed as $s_p(k,l)=w(l)*r(k)$, where k=2n,n=0,1, . . . . FIG. 12 gives an example assuming that a code length of the time-domain orthogonal code is 2, the time-domain orthogonal code of port p may be $[w(l_1),w(l_2)]=[1,1]$, and the time-domain orthogonal code of port q for the first physical signal may be $[w(l_1),w(l_2)]=[1,1]$, and ports p and q use physical signal sequences with the same cyclic shift.

One advantage of introducing the time-domain orthogonal code to distinguish different ports for the physical signal is that the number of ports supported by the first physical signal may be further spread, for example, the physical signals of different ports can be distinguished on the same subcarriers in the same OFDM symbols by way of orthogonal sequences, and in this case, the maximum number of ports supported by the first physical signal is assumed to be S; at the same time, the first physical signal may be further spread on subcarriers with the same index on different OFDM symbols by way of time-domain orthogonal codes with a length of T, and then the configurable maximum number of ports supported by the first physical signal at this time is SXT. Another advantage is that adopting time-domain orthogonal codes to distinguish physical signals of different ports may ensure the time-domain orthogonal characteristics of physical signals of different ports. When the physical signals are used for time-domain self-interference channel estimation, the time-domain orthogonal characteristics of physical signals of different ports may ensure self-interference channel estimation for different ports to be performed independently, thus reducing the complexity of self-interference channel estimation.

Case 2. Time-Domain Code Spreading for the Second Frequency-Domain Mapping Pattern:

After mapping the sequence of each antenna port for the first physical signal onto the same plurality of subcarriers on the same one or more OFDM symbols according to the second frequency-domain mapping pattern, optionally, the physical signals of different ports for the first physical signal may be mapped on the same subcarriers on different OFDM symbols by way of orthogonal code division multiplexing. Specifically, all frequency-domain symbols of the sequence of the first physical signal of the same port are multiplied by a same time-domain code (e.g., a time-domain orthogonal code) to spread to resource elements with subcarrier indexes of k=4n,n=0,1, . . . or k=4n+2,n=0,1, . . . on multiple OFDM symbols, and when the first physical signals of any two ports adopt a sequence of same frequency-domain symbols, different time-domain orthogonal codes are used respectively. Herein, the meaning of the sequence of a certain port for the first physical signal includes: a physical signal sequence multiplied by the frequency-domain code, a cyclic-shifted physical signal sequence, or a same physical signal sequence used by all ports.

For example, let the sequence of port p for the first physical signal be r(k), where k represents the index of the subcarrier to which the first physical signal is mapped and k=4n,n=0,1, . . . . The time-domain orthogonal code of port p is denoted as w(l), where l represents the of the OFDM symbol to which the sequence is mapped after spreading by way of time-domain code. Then the symbol mapping of the sequence of port P for the first physical signal after spreading by way of time-domain code may be expressed as $s_p(k,l)=w(l)*r(k)$, where $k=4n, n=0,1,\ldots$. FIG. 13 gives an example assuming that a code length of the time-domain orthogonal code is 2, the time-domain orthogonal code of port p may be $[w(l_1),w(l_2)]=[1,1]$, and the time-domain orthogonal code of port q for the first physical signal may be $[w(l_1),w(l_2)]=[1,-1]$, and ports p and q use a physical signal sequence with the same cyclic shift.

One advantage of introducing the time-domain orthogonal code to distinguish different ports for the physical signal is that the number of ports supported by the first physical signal may be further spread, for example, the physical signals of different ports can be distinguished on the same subcarrier in the same OFDM symbol by way of orthogonal sequence, and in this case, the maximum number of ports supported by the first physical signal is assumed to be S; at the same time, the first physical signal may be further spread on subcarriers with the same index on different OFDM symbols by way of time-domain orthogonal codes with a length of T, and then the configurable maximum number of ports supported by the first physical signal at this time is SXT. Another advantage is that adopting time-domain orthogonal codes to distinguish physical signals of different ports may ensure the time-domain orthogonal characteristics of physical signals of different ports. When the physical signals are used for time-domain self-interference channel estimation, the time-domain orthogonal characteristics of physical signals of different ports may ensure self-interference channel estimation for different ports to be performed independently, thus reducing the complexity of self-interference channel estimation.

In addition, another idea to solve the possible timing misalignment between transmission and reception of a full-duplex communication node (such as a base station and a terminal) is to design a timing method of transmission and reception of the full-duplex communication node to synchronize the timing of transmission and reception of the full-duplex communication node, so that the reference signals of the existing system may be used for self-interference channel estimation without introducing new reference signals, including the first physical signal described in the present invention.

To ensure the synchronization of downlink transmission timing between different IAB nodes, an uplink timing advance indication may be transmitted to each node (for example, but not limited to a base station, an IAB node and a terminal). In case that the node is an IAB node, the transmission and reception operations are completed by different functional entities of the same IAB node, which include a DU and an MT.

On one hand, the uplink timing advance indication may be used to determine a time difference between the timing when the corresponding node performs downlink reception from its parent node and the timing when it performs downlink transmission to its child node. Optionally, the uplink timing advance indication may include an uplink timing advance command and an uplink timing advance offset. In this case, for example, a sum of the uplink timing advance command and the uplink timing advance offset may be used to determine the time difference between the timing when the corresponding node performs downlink reception from the parent node and the timing when it performs downlink transmission to the child node. For example, the sum of the uplink timing advance command and the uplink timing advance offset may be twice or other integer times or non-integer times of the time difference. Optionally, the uplink timing advance indication may be directly used to determine the time difference between the timing when the corresponding node performs downlink reception from the parent node and the timing when it performs downlink transmission to the child node. For example, the uplink timing advance indication may be twice or other integer times or non-integer times of the time difference. Therefore, by appropriately setting the uplink timing advance indication, it may be ensured that all nodes perform downlink transmission to their child nodes at the same time point, thus realizing the synchronization of downlink transmission timing among all nodes.

On the other hand, the uplink timing advance indication may also be used to determine a time difference between the timing when the corresponding node performs downlink reception from its parent node and the timing when it performs uplink transmission to the parent node. Optionally, the uplink timing advance indication may include an uplink timing advance command and an uplink timing advance offset. In this case, for example, a sum of the uplink timing advance command and the uplink timing advance offset may indicate the time difference between the timing when the corresponding node performs downlink reception from the parent node and the timing when it performs uplink transmission to the parent node. Optionally, the uplink timing advance indication may directly indicate the time difference between the timing when the corresponding node performs downlink reception from the parent node and the timing when it performs uplink transmission to the parent node. Therefore, the node can determine the time point of uplink transmission to its parent node. FIGS. 29B and 29C show transmission and reception timings between nodes according to some embodiments of the present disclosure. In FIGS. 29B and 29C, the base station is a parent node of IAB Node 1, IAB Node 1 is a parent node of IAB Node 2, while IAB Node 1 is a child node of the base station, and IAB Node 2 is a child node of IAB Node 1. Referring to FIG. 29B, for IAB Node 2, the uplink timing advance indication indicates a time difference between its downlink reception from the parent node (IAB Node 1) (i.e., downlink (reception) of Link 1) and its uplink transmission to the parent node (i.e., IAB Node 1) (i.e., uplink (transmission) of Link 1). Referring to FIG. 29C, for IAB Node 2, the sum of the uplink timing advance command and the uplink timing advance offset indicates the time difference between its downlink reception from the parent node (IAB Node 1) (i.e., downlink (reception) of Link 1) and its uplink transmission to the parent node (i.e., IAB Node 1) (i.e., uplink (transmission) of Link 1).

In the above method, the timing when a node performs uplink transmission to its parent node and the timing when the same node performs uplink reception from its child node may be misaligned. In order to ensure the synchronization between the timing when the node performs uplink transmission to its parent node and the timing when the same node performs uplink reception from its child node, additional information may be further provided for the node. At this time, the node still uses the above-mentioned uplink timing advance indication to determine the timing when it performs downlink transmission to the child node.

Optionally, the additional information may be an additional uplink timing advance offset different from the aforementioned uplink timing advance offset. In this case, the node may use a sum of the additional uplink timing advance offset and the uplink timing advance indication to determine the time difference between the timing when the node performs downlink reception from the parent node and the timing when it performs uplink transmission to the parent node. When the uplink timing advance indication includes an uplink timing advance command and an uplink timing advance offset, the node may use a sum of the additional uplink timing advance offset and the uplink timing advance command and the uplink timing advance offset to determine the time difference between the timing when the node performs downlink reception from the parent node and the timing when it performs uplink transmission to the parent node. When the uplink timing advance indication is not separated into an uplink timing advance command and an uplink timing advance offset, the node may use a sum of the additional uplink timing advance offset and the uplink timing advance indication to determine the time difference between the timing when the node performs downlink reception from the parent node and the timing when it performs uplink transmission to the parent node. Therefore, by appropriately setting the additional uplink timing advance offset, the synchronization between the timing when the node performs uplink transmission to its parent node and the timing when the same node performs uplink reception from its child node may be ensured.

FIG. 29D illustrates transmission and reception timings between nodes according to some embodiments of the present disclosure. In FIG. 29D, the base station is a parent node of IAB Node 1, IAB Node 1 is a parent node of IAB Node 2, while IAB Node 1 is a child node of the base station, and IAB Node 2 is a child node of IAB Node 1. Referring to FIG. 29D, for IAB Node 2, a sum of the uplink timing advance indication and the additional uplink timing advance offset (i.e., a sum of the uplink timing advance command, the uplink timing advance offset and the additional uplink timing advance offset) indicates the time difference between its downlink reception from the parent node (IAB Node 1) (i.e., downlink (reception) of Link 1) and its uplink transmission to the parent node (i.e., IAB Node 1) (i.e., uplink (transmission) of Link 1).

The way for the node to obtain the additional uplink timing advance offset may be one of the followings: the node receives a higher layer signaling to obtain the additional uplink timing advance offset; the node receives a random access response (Msg2) to obtain the additional uplink timing advance offset; the node receives a downlink control channel to obtain the additional uplink timing advance offset; the node receives a higher layer signaling to obtain the additional uplink timing advance offset; the node receives a downlink shared channel to obtain the additional uplink timing advance offset. For example, In case of that the node is an IAB, the additional uplink timing advance offset is obtained by an IAB-MT.

Furthermore, the node may also determine whether the timing of uplink transmission of the node to the parent node is related to the additional uplink timing advance offset according to a configuration signaling or a system rule. That is, the node may determine, whether to use only the uplink timing advance indication to determine the timing of uplink transmission to the parent node or to use the additional uplink timing advance offset in addition to the uplink timing advance indication to determine the timing of uplink transmission to the parent node, according to the configuration signaling or the system rule. Herein, the configuration includes at least one of the followings: the node obtains the uplink transmission timing mode indication in the downlink control channel; the node obtains an indication related to full-duplex, and for full-duplex transmission, determines the uplink transmission timing of the node at least according to the uplink timing advance indication and the additional uplink timing advance offset, otherwise, determines the uplink transmission timing of the node according to the uplink timing advance indication; the node obtains a timing mode indication of uplink transmission for the node in a specific slot/symbol. The system rule may be that, in case that the node is an IAB node, when an IAB MT performs uplink transmission and an IAB DU performs uplink reception, the uplink transmission timing of the IAB MT is determined at least according to the uplink timing advance indication and a second uplink timing advance offset; otherwise, the uplink transmission timing of the IAB MT is determined according to the uplink timing advance indication.

Optionally, the additional information may be an additional uplink timing advance command different from the aforementioned uplink timing advance command. In this case, for example, the node may use the sum of the additional uplink timing advance command and the uplink timing advance offset (included in the uplink timing advance indication) to determine the time difference between the timing when the node performs downlink reception from the parent node and the timing when it performs uplink transmission to the parent node. Optionally, the additional uplink timing advance command may be directly used to determine the time difference between the timing when the corresponding node performs downlink reception from the parent node and the timing when it performs uplink transmission to the parent node. Therefore, by appropriately setting the additional uplink timing advance command, the synchronization between the timing when the node performs uplink transmission to its parent node and the timing when the same node performs uplink reception from its child node may be ensured.

FIG. 29E illustrates transmission and reception timings between nodes according to some embodiments of the present disclosure. In FIG. 29E, the base station is a parent node of IAB Node 1, IAB Node 1 is a parent node of IAB Node 2, while IAB Node 1 is a child node of the base station, and IAB Node 2 is a child node of IAB Node 1. Referring to FIG. 29E, for IAB Node 2, a sum of the additional uplink timing advance command and the uplink timing advance offset (included in the uplink timing advance indication) indicates the time difference between its downlink reception from the parent node (IAB Node 1) (i.e., downlink (reception) of Link 1) and its uplink transmission to the parent node (i.e., IAB Node 1) (i.e., uplink (transmission) of Link 1).

The way for the node to obtain the additional uplink timing advance command may be one of the followings: the node receives a higher layer signaling to obtain the additional uplink timing advance command; the node receives a random access response (Msg2) to obtain the additional uplink timing advance command; the node receives a downlink control channel to obtain the additional uplink timing advance command; the node receives a higher layer signaling to obtain the additional uplink timing advance command; the node receives a downlink shared channel to obtain the additional uplink timing advance command. For example, In case that the node is an IAB, the additional uplink timing advance command is obtained by an IAB-MT.

Furthermore, the node may also determine whether the timing of uplink transmission of the node is related to the additional uplink timing advance command according to a configuration signaling or a system rule. That is, the node may determine, whether to use the uplink timing advance indication to determine the timing of uplink transmission to the parent node or to use the additional uplink timing advance command in addition to the uplink timing advance indication to determine the timing of uplink transmission to the parent node, according to the configuration signaling or the system rule. Herein, the configuration includes at least one of the followings: the node obtains the uplink transmission timing mode indication in the downlink control channel; the node obtains an indication related to full-duplex, and for full-duplex transmission, calculates the uplink transmission timing of the node according to the additional uplink timing advance command and the uplink timing advance offset, otherwise, calculates the uplink transmission timing of the node according to the uplink timing advance command and the uplink timing advance offset (i.e., the uplink timing advance indication); the node obtains a timing mode indication of uplink transmission for the node in a specific slot/symbol. The system rule may be that, in case that the node is an IAB node, when the IAB MT performs uplink transmission and the IAB DU performs uplink reception, the uplink transmission timing of the node is calculated according to the additional uplink timing advance command and the uplink timing advance offset; otherwise, the uplink transmission timing of the node is calculated according to the uplink timing advance command and the uplink timing advance offset (i.e., the uplink timing advance indication).

The method described above has the beneficial effect that by adding a configuration of the additional uplink timing advance offset or adding a configuration of the additional uplink timing advance command, the uplink transmission timing advance of the parent node of the node may be compensated, so that synchronization of the uplink transmission timing and the uplink reception timing of the parent node is ensured, and at the same time, consistency of the downlink transmission timing of multiple IAB nodes is ensured.

1. A method performed by a node in a wireless communication system, including:
   obtaining an uplink timing advance indication and additional information of the node; and
   determining a time difference between downlink reception of the node from its parent node and uplink transmission of the node to the parent node based on at least one of the uplink timing advance indication and the additional information.

2. The method according to claim 1, wherein the uplink timing advance indication includes an uplink timing advance command and an uplink timing advance offset, and
   the additional information includes an additional uplink timing advance offset.

3. The method according to claim 2, wherein when a first condition is satisfied, the node determines the time difference based on a sum of the uplink timing advance command, the uplink timing advance offset and the additional uplink timing advance offset, and
   when a second condition is satisfied, the node determines the time difference based on a sum of the uplink timing advance command and the uplink timing advance offset.

4. The method according to claim 1, wherein the uplink timing advance indication includes an uplink timing advance command and an uplink timing advance offset, and
   the additional information includes an additional uplink timing advance command.

5. The method according to claim 4, wherein when a first condition is satisfied, the node determines the time difference based on a sum of the additional uplink timing advance command and the uplink timing advance offset, and
   when a second condition is satisfied, the node determines the time difference based on a sum of the uplink timing advance command and the uplink timing advance offset.

6. The method according to any one of claims 1-5, wherein the first condition includes that at least one of a system signaling and a system rule indicates to determine the time difference using both the uplink timing advance indication and the additional information; and the second condition includes that at least one of the system signaling and the system rule indicates to determine the time difference using only the uplink timing advance indication.

7. The method according to claim 6, wherein the configuration signaling includes at least one of the followings: a timing mode indication of uplink transmission in a downlink control channel; an indication related to full-duplex; a timing mode indication of uplink transmission for a node in a specific slot/symbol, and
   the system rule includes: in case that the node is an IAB node, when an IAB MT performs uplink transmission and an IAB DU performs uplink reception, the first condition is satisfied, otherwise the second condition is satisfied.

8. A node in a wireless communication system, including:
   a transceiver configured to transmit and receive signals to and from external; and
   a processor configured to:
   control the transceiver to obtain an uplink timing advance indication and additional information of the node; and
   determine a time difference between downlink reception of the node from its parent node and uplink transmission of the node to the parent node based on at least one of the uplink timing advance indication and the additional information.

FIG. 30 is a block diagram showing a structure of a first device 3000 according to some embodiments of the present disclosure.

Referring to FIG. 30, the first device 3000 includes a transceiver 3010 and a processor 3020. The transceiver 3010 is configured to transmit and receive signals to and from the external. The processor 3020 is configured to map a sequence of each antenna port for a first physical signal to a same plurality of subcarriers on same one or more orthogonal frequency division multiplexing OFDM symbols based on a frequency-domain mapping pattern of the first physical signal, and control the transceiver 3010 to transmit the first physical signal. The first device 3000 may be implemented in the form of hardware, software, or a combination of hardware and software, so that it can perform all the methods described in the present disclosure.

With the development of terminal manufacturing technology and antenna miniaturization technology, a terminal may have a plurality of baseband modules, radio frequency modules and corresponding radio frequency antennas. Such a terminal will have a plurality of functional entities with terminal functions, and each functional entity may independently communicate with a base station. With the increase of the operation frequency band of the base station, the beam width will become very small, and the corresponding wire unit size will also decrease, so the base station needs and may have an ability to transmit multiple beams. Each functional entity of the terminal may access a corresponding beam of the base station through a respective beam, and each pair of beams may work independently, as shown in FIG. 31.

When the base station schedules the terminal, it is necessary to transmit scheduling information to functional entities of the terminal through the downlink control channel (PDCCH) on each beam, so that the functional entities accessing different beams independently perform a PDCCH blind detection. According to a traditional method, each beam can only have one DCI and corresponding PDCCH for downlink data transmission and one DCI and corresponding PDCCH for uplink data transmission at most. When performing the PDCCH blind detection, a functional entity of the terminal needs to perform rate matching and CRC check with a length of the DCI that possibly exists at each PDCCH candidate position. After the CRC check is passed, the functional entity may decide whether the detected DCI is used for downlink data transmission or uplink data transmission by the length of the DCI and the content in the DCI, and then only perform PDCCH blind detection for data transmission in the other direction at PDCCH candidate positions where the PDCCH blind detection has not been performed. For example, if a DCI for downlink data transmission is detected first, only DCIs for uplink data transmission will be detected at other PDCCH candidate positions, and vice versa.

In order to reduce a number of times of PDCCH blind detection in each transmission cycle, LTE and NR specified the DCI length in detail to ensure that there may be only two DCI lengths at each PDCCH candidate position, and limited the number of PDCCH candidate positions in each transmission cycle, that is, only 22 (23 in NR protocol). Therefore, the maximum number of times of PDCCH blind detection in each transmission cycle is 44 (46 in NR protocol). For a terminal with multiple terminal entities and capable of multi-beam communication with a base station, the maximum number of times of blind detection of all functional entities independently performing PDCCH blind detection will be an integer multiple of the maximum number of times of PDCCH blind detection of one functional entity, in which the integer multiple is equal to the number of functional entities the terminal has. For example, when there are two functional entities of the terminal performing two-beam communication with the base station, and the maximum number of times of blind detection of each PDCCH is 44, the maximum number of times of PDCCH blind detection for the terminal is 88. Since the PDCCH blind detection needs to be performed in each transmission cycle, the terminal will have a lot of resources for the PDCCH blind detection.

Since multiple functional entities all belong to the same terminal and may easily perform internal information interaction with each other, only one functional entity may be used to receive the scheduling information for all functional entities from the base station, and then transmit the scheduling information for other functional entities to the corresponding functional entities through internal information interaction, thus the maximum number of times of PDCCH blind detection at a terminal level may be effectively reduced. There is a need for a method for a functional entity of a terminal to receive all scheduling information of a base station.

The followings describe a method for a terminal to perform PDCCH blind detection in multi-beam communication.

FIG. 32 illustrates a method for detecting a PDCCH transmitted from a base station 2100 in a wireless communication system by a terminal 3600 according to some embodiments of the present disclosure. Wherein, the terminal 3600 is shown in FIG. 36.

At step 3200, a specific functional entity of the terminal 3600 detects a PDCCH at a current PDCCH candidate position based on each downlink control information (DCI) length in a DCI length set including at least two different DCI lengths.

In one subframe/slot, a specific functional entity of the terminal 3600 traverses PDCCH candidate positions in a certain order (which may be from a lower aggregation level to a higher aggregation level, from a higher aggregation level to a lower aggregation level, or any other order), and performs PDCCH blind detection at each PDCCH candidate position. Steps of the blind detection include performing rate dematching and CRC check with a DCI length.

After accessing the base station 3700, the terminal 3600 performs blind detection for the PDCCH with only one specific functional entity (i.e., only on one beam) in each subframe/slot to obtain the scheduling information from the base station 3700, where the schedule information includes at least one of downlink schedule information and uplink grant information. Wherein, the base station 3700 is shown in FIG. 37.

The downlink scheduling information is downlink control information for the terminal 3600 to receive downlink data (shortly referred to as downlink DCI). In this disclosure, it is intended that one PDCCH may carry one or more downlink scheduling information, and the downlink scheduling information may include one or more downlink DCIs.

The uplink grant information is downlink control information for the terminal 2000 to transmit uplink data (shortly referred to as uplink DCI). In this disclosure, it is intended that one PDCCH may carry one or more uplink grant information, and the uplink grant information may include one or more uplink DCIs.

In this disclosure, when the terminal 3600 and the base station 3700 perform full-duplex transmission, it is intended that the PDCCH carrying the downlink scheduling information and the PDCCH carrying the uplink grant information may be the same PDCCH.

To achieve the above purpose of transmitting multiple DCIs (multiple uplink DCIs and/or multiple downlink DCIs) in a same PDCCH, a new DCI format is defined, as shown in FIG. 33. A simple way to define the new DCI format is to splice one or more traditional unidirectional DCIs as sub-DCI fields. When a number of spliced traditional unidirectional DCIs is equal to 1, the new DCI format obtained by splicing is called a "single DCI"; while when the number of spliced traditional unidirectional DCIs is greater than 1, the new DCI format obtained by splicing is called a "composite DCI".

In the following description, lengths of all composite DCIs are set to be the same, and lengths of all single DCIs are set to be the same in this disclosure, so as to avoid increasing the maximum number of times of PDCCH blind detection. Although in this disclosure, composite DCIs with the same length and single DCIs with the same length (that is, a DCI length set containing two elements) are taken as an example, the present disclosure is not limited thereto, and may include multiple composite DCIs with different lengths, and may include multiple single DCIs with different lengths.

In this case, steps of the blind detection include performing rate de-matching and CRC check with each DCI length in the DCI length set including the two DCI lengths, i.e., the length of composite DCI and the length of single DCI.

In the composite DCI, a sub-DCI field may correspond to a traditional uplink DCI, a traditional downlink DCI, or a new DCI spliced by one or more unidirectional DCIs.

At step 3220, when a PDCCH carrying DCI of a corresponding first DCI type is detected at the current PDCCH candidate position based on a first DCI length in the DCI length set, the specific functional entity determines a new DCI length set based on an allocation indication field in the DCI format of the first DCI type.

Optionally, the first DCI may be a composite DCI type, and the composite DCI type may have multiple DCI formats, and each DCI format of the composite DCI type has multiple sub-DCI fields. Optionally, the first DCI type may also be a single DCI type, and the single DCI type may have multiple DCI formats, and the DCI format of the single DCI type has one sub-DCI field. Optionally, the first DCI length may be the length of a composite DCI type, and optionally, the first DCI length may also be the length of a single DCI type.

When the specific functional entity detects a PDCCH carrying DCI of the corresponding first DCI type (i.e., when the CRC check is passed), the following information may be obtained: (1) the type of DCI carried by the PDCCH may be obtained by the DCI length with which the CRC check is passed (i.e., the first DCI length), that is, whether the DCI carried is a composite DCI or a single DCI can be known; (2) the specific format of DCI carried by the PDCCH may be obtained by the value of a "format indication field" in the DCI format of the first DCI type.

A "format indication field" may be set in a composite DCI to indicate the format of the composite DCI, as shown in FIG. 33. For example, if the composite DCI formats are continuously numbered without repetition, a format indication field of a value of X1 indicates a composite DCI format with an index of X1. Through the format indication field, the terminal 3600 may know whether each sub-DCI field in the composite DCI is used for uplink data transmission, downlink data transmission or full-duplex data transmission. Optionally, the sub-DCI field for full-duplex data transmission may include a secondary DCI field for uplink data transmission and a secondary DCI field for downlink data transmission, in which each secondary DCI field corresponds to one unidirectional DCI. That is, a sub-DCI field for full-duplex data transmission may be spliced by one or more unidirectional DCIs.

Furthermore, a "format indication field" may be set in a single DCI to indicate the format of the single DCI, as shown in FIG. 33. For example, if the single DCI formats are continuously numbered without repetition, a format indication field of a value of X2 indicates a single DCI format with an index of X2. Through the format indication field, the terminal 3600 may know whether the only one sub-DCI field in the single DCI is used for uplink data transmission, downlink data transmission or full-duplex data transmission.

In addition, the composite DCI format and the single DCI format may also be added some other fields to realize different functions.

An "allocation indication field" may be set in the composite DCI and the single DCI to be used to determine a mapping relationship between each sub-DCI field in the composite DCI and the single DCI and the functional entities of the terminal 3600, and may also be used to determine whether the DCI length set needs to be updated. For example, a specific functional entity may determine whether to stop detecting PDCCHs carrying DCIs of the first DCI type on the current subframe/slot based on the allocation indication field, and delete the first DCI length from the DCI length set when it is determined to stop.

The followings describe two formats of the allocation indication fields, and describes how to determine whether to stop detecting PDCCHs carrying DCIs of the first DCI type for each format.

Format 1 (P+N):

The "allocation indication field" includes P+N bits, where the P bits indicate how many PDCCHs of a same type (i.e., PDCCHs carrying single DCIs or PDCCHs carrying composite DCIs) are transmitted by the base station 3700 for the terminal 3600 in the current subframe/slot. For example, when the first DCI type is a composite DCI type, the P bits indicate how many PDCCHs carrying the composite DCIs are transmitted by the base station 3700 for the terminal 3600 in the current subframe/slot. In another example, when the first DCI is a single DCI type, the P bits indicate how many PDCCHs carrying the single DCIs are transmitted by the base station 3700 for the terminal 3600 in the current subframe/slot.

The N bits are a bit bitmap, which indicates which functional entities of the terminal 3600 the DCI of the first DCI type carried on the currently detected PDCCH is transmitted to. Where N is an integer greater than 0 and N is equal to the number of functional entities of the terminal 3600. For example, when the n-th bit among the N bits is equal to 1 and the n-th bit is the m-th bit with a value equal to 1, a specific functional entity may know that the m-th sub-DCI field in the DCI format of the first DCI type carried on the currently detected PDCCH is transmitted to the n-th functional entity of the terminal 3600. Particularly, if the first DCI type is a single DCI, only one of the N bits has a value equal to 1 and m=1, and if the first DCI type is a composite DCI, the number of sub-DCI fields in the composite DCI is equal to the number of bits with a value equal to 1.

The method for the specific functional entity to determine whether to stop detecting PDCCHs carrying DCIs of the first DCI type when the allocation indication field adopts Format 1 is as followings:

When the number of PDCCHs carrying DCIs of the first DCI type having been detected by the terminal 3600 in the current subframe/slot is equal to the number of PDCCHs carrying DCIs of the first DCI type actually transmitted by the base station 2100 for the terminal 3600 in the current subframe/slot indicated by the P bits, the functional entity deletes the first DCI length from the DCI length set, so that blind detection is not performed for PDCCHs carrying DCIs of the first DCI type at other PDCCH candidate positions; and When the number of PDCCHs carrying DCIs of the first DCI type having been detected by the terminal 3600 in the current subframe/slot is smaller than the number of PDCCHs carrying DCIs of the first DCI type actually transmitted by the base station 2100 for the terminal 3600 in the current subframe/slot indicated by the P bits, the functional entity does not change the DCI length set, and continues to perform blind detection for PDCCHs carrying DCIs of the first DCI type at other PDCCH candidate positions.

For example, assuming that the terminal 3600 includes 4 functional entities, N=4 in the allocation indication field, and two sub-DCI fields are included in the composite DCI, the base station 3700 schedules the first functional entity of the terminal 2000 with a single DCI, and schedules the second and third functional entities of the terminal 3600 with a composite DCI, then a correspondence between the bit bitmap and the functional entities is shown in FIG. 34. With the P bits in Format 1, the functional entity may clearly know to which functional entity each sub-DCI field in the detected DCI (single DCI or composite DCI) is transmitted by the base station 3700.

Next, how the specific functional entity determines whether to stop detecting PDCCHs carrying DCIs of the first DCI type is described with an assumption that a PDCCH carrying DCI of the first DCI type detected by the specific functional entity is the first PDCCH detected by the specific functional entity. At this time, discussion is conducted with respect to two cases (Case 1 and Case 2).

Case 1 (the value of the P bits is equal to 1):

If a value read by a specific functional entity from the P bits in the allocation indication field in the DCI format of the first DCI type is equal to 1, the terminal 3600 may determine that the base station 3700 only transmitted one PDCCH carrying DCI of the first DCI type for all functional entities of the terminal 3600 in the current subframe/slot. Up to now, the specific functional entity has received all PDCCHs carrying DCIs of the first DCI type transmitted by the base station 3700 for all functional entities of the terminal 3600 in the current subframe/slot, so it can be determined to stop detecting PDCCHs carrying DCIs of the first DCI type. For example, when a specific functional entity performs PDCCH blind detection at other undetected PDCCH candidate positions, it may no longer use the first DCI length to perform blind detection for PDCCHs carrying DCIs of the first DCI type. Therefore, the specific functional entity may delete the first DCI length from the aforementioned DCI length set.

Case 2 (the value of the P bits is greater than 1):

If the value read by a specific functional entity from the P bits in the allocation indication field in the DCI format of the first DCI type is greater than 1, the terminal 3600 may determine that the base station 3700 transmitted more than one PDCCH carrying DCI of the first DCI type for all functional entities of the terminal 3600 in the current subframe/slot. Up to now, the specific functional entity has not received all PDCCHs carrying DCIs of the first DCI type transmitted by the base station 3700 for all functional entities of the terminal 3600 in the current subframe/slot yet, so it can be determined not to stop detecting PDCCHs carrying DCIs of the first DCI type. For example, when a specific functional entity performs PDCCH blind detection at other undetected PDCCH candidate positions, it may continue using the first DCI length to perform blind detection for PDCCHs carrying DCIs of the first DCI type. Therefore, the specific functional entity may not make any changes to the aforementioned DCI length set.

How to determine whether to stop detecting PDCCHs carrying DCIs of the first DCI type is discussed with respect to two cases above. When it is determined to stop detecting all types of PDCCHs (PDCCHs carrying the single DCIs and PDCCHs carrying the composite DCIs), the aforementioned DCI length set becomes an empty set, and the functional entity will no longer perform blind detection for any type of PDCCH at the remaining PDCCH candidate positions.

The advantage of adopting Format 1 is that, by comparing a number of detected PDCCHs of a certain type with a number of PDCCHs of the certain type actually transmitted by the base station 3700 indicated by the P bits, it can be decided whether there is missed PDCCH detection.

In Format 1, there is only one "allocation indication field".

Format 2 (1+N):

The "allocation indication field" includes 1+N bits, where the 1-bit directly indicates to stop or continue the detection of PDCCHs of a same type. When the 1-bit is 1, the functional entity determines that blind detection of PDCCHs of the same type needs to continued at other PDCCH candidate positions, and does not change the DCI length set; and when the 1-bit is 0, the functional entity determines that blind detection of PDCCHs of the same type is not performed at other PDCCH candidate positions, and deletes the DCI length of the DCI type carried on PDCCHs of the type from the DCI length set.

The N bits are a bit bitmap, which indicates which functional entities of the terminal 3600 the DCI of the first DCI type carried on the currently detected PDCCH is transmitted to. Where N is an integer greater than 0 and N is equal to the number of functional entities of the terminal 3600. For example, when the n-th bit among the N bits is equal to 1 and the n-th bit is the m-th bit with a value equal to 1, a specific functional entity may know that the m-th sub-DCI field in the DCI format of the first DCI type carried on the currently detected PDCCH is transmitted to the n-th functional entity of the terminal 3600. Particularly, if the first DCI type is a single DCI, only one of the N bits has a value equal to 1 and m=1, and if the first DCI type is a composite DCI, the number of sub-DCI fields in the composite DCI is equal to the number of bits with a value equal to 1.

The advantage of adopting Format 2 is that, compared with Format 1, Format 2 has less DCI overhead, and in case that other DCI contents have the same length, Format 2 has a lower DCI code rate and a lower false detection rate when performing detection. The larger the value of P is, the more the DCI overhead of Format 2 is reduced compared with Format 1.

However, Format 2 has two costs. The first cost is that a traversal order for each terminal 3600 traversing PDCCH candidates when performing PDCCH blind detection needs to be defined, and the value of the 1-bit of the allocation indication field needs to be set to 0 in the DCI carried by the last PDCCH of the same type in this order, and the value of the 1-bit of the allocation indication field needs to be set to 1 in the DCI carried by other PDCCHs of the same type.

For example, if a specific functional entity of the terminal 3600 is defined to traverse from a lower aggregation level to a higher aggregation level and from a lower frequency to a higher frequency, then, among all the PDCCHs carrying composite DCIs, the value of the 1-bit in the composite DCI that needs to be carried by the PDCCH with the highest aggregation level and the highest frequency is set to 0, and among all the PDCCHs carrying single DCIs, the value of the 1-bit in the single DCI that needs to be carried by the PDCCH with the highest aggregation level and highest frequency is set to 0, and the values of the 1-bit fields in DCIs carried by all other PDCCHs except these two PDCCHs are set to 1.

The second cost is that functional entities cannot know whether there is missed PDCCH detection.

There is only one "allocation indication field" in Format 2.

At step 3240, the specific functional entity detects the PDCCH at an undetected PDCCH candidate position based on each DCI length among the new DCI length set.

According to the decision obtained at step 3220, the specific functional entity continues or stops blind detection of PDCCHs of the same type at the remaining PDCCH candidate positions. As described at step 3220, after the specific functional entity determines to stop detecting PDCCHs of the same type, the DCI length of the DCI type carried by PDCCHs of this type (i.e., the first DCI length) is no longer included in the DCI length set, so that the specific functional entity performs blind detection of PDCCHs of other types using each DCI length in the new DCI length set at remaining PDCCH candidate positions.

Taking two DCI lengths (the composite DCI length and the single DCI length) as an example, after the specific functional entity determines to stop detecting PDCCHs carrying the composite DCIs, only the single DCI length is included in the DCI length set, so that the specific functional entity only uses the single DCI length for blind detection of PDCCHs carrying the single DCIs at remaining PDCCH candidate positions; similarly, after the specific functional entity determines to stop detecting PDCCHs carrying the single DCIs, only the composite DCI length is included in the DCI length set, so that the specific functional entity only uses the composite DCI length for blind detection of PDCCHs carrying the composite DCIs at remaining PDCCH candidate positions.

When the DCI length set becomes an empty set, that is, when the blind detection is no longer needed for PDCCHs of other types, the specific functional entity stops the blind detection for PDCCHs of all types and distributes all the detected scheduling information to the corresponding functional entities.

By adopting the PDCCH blind detection method above, the efficiency of PDCCH blind detection when the terminal 2000 performs multi-beam communication with the base station 3700 may be effectively improved, and the processing resources of the terminal 3600 may be saved and the power overhead may be reduced. The base station 3700 may also schedule multiple functional entities of the terminal 3600 with fewer PDCCHs, which reduces the power overhead of the base station 3700.

FIG. 35 is a flowchart showing a method for transmitting PDCCH from a base station 3700 to a terminal 3600 including a plurality of functional entities according to some embodiments of the present disclosure.

Referring to FIG. 35, at step 3500, the base station 3700 generates one or more PDCCHs. At step 3520, the base station 3700 transmits the one or more PDCCHs to the terminal 3600, where each PDCCH carries one DCI of one DCI type, which is of one DCI length in a DCI length set including at least two different DCI lengths, and DCIs of each DCI type have the same DCI length.

A DCI format of the DCI type may include an allocation indication field, which is configured to indicate to the terminal 3600 whether to stop detecting PDCCHs carrying DCIs of the DCI type, as shown in FIG. 33. The allocation indication field may include a first indication field, which indicates a total number of PDCCHs carrying DCIs of the DCI type transmitted by the base station 3700 for all functional entities of the terminal 3600, as shown in FIG. 34. The allocation indication field may include a first indication field, which is configured to indicate to the terminal 3600 whether to stop detecting PDCCHs carrying DCIs of the DCI type. The DCI format of the DCI type may include one or more sub-DCI fields. The DCI type may have one or more DCI formats. The DCI format of the DCI type may further include a bitmap field, which is configured to indicate to the terminal 3600 a correspondence between the one or more sub-DCI fields and the plurality of functional entities.

The DCI format of the DCI type may further include a format indication field, which is configured to indicate to the terminal 3600 whether each sub-DCI field of the one or more sub-DCI fields included in the DCI format of the DCI type is used for uplink data transmission, downlink data transmission or full-duplex data transmission respectively. The sub-DCI field for full-duplex data transmission further includes a secondary DCI field for uplink data transmission and a secondary DCI field for downlink data transmission.

The first DCI type may be a composite DCI type, which has a plurality of sub-DCI fields. Optionally, the first DCI type may be a single DCI type, which has one sub-DCI field. Optionally, the DCI length set includes a first DCI length and a second DCI length.

FIG. 36 is a block diagram showing a structure of a terminal 3600 according to some embodiments of the present disclosure.

Referring to FIG. 36, the terminal 2000 includes a transceiver 3610 and a processor 3620. The transceiver 3610 is configured to transmit and receive signals to and from the external. The processor 3620 is configured to: detect a PDCCH at a current PDCCH candidate position based on each DCI length in a DCI length set including at least two different DCI lengths; determine a new DCI length set based on an allocation indication field in a DCI format of a first DCI type when a PDCCH carrying DCI of the first DCI type is detected at the current PDCCH candidate position based on a first DCI length in the DCI length set; and detect the PDCCH at an undetected PDCCH candidate position based on each DCI length in the new DCI length set. The terminal 3600 may be implemented in the form of hardware, software, or a combination of hardware and software, so that it can perform all the methods described in the present disclosure.

FIG. 37 is a block diagram showing a structure of a base station 3700 according to some embodiments of the present disclosure.

Referring to FIG. 37, the base station 3700 includes a transceiver 3710 and a processor 3720. The transceiver 3710 is configured to transmit and receive signals to and from the external. The processor 3720 is configured to generate one or more PDCCHs and control the transceiver 3710 to transmit the generated one or more PDCCHs to the terminal 3600. The base station 3700 may be implemented in the form of hardware, software, or a combination of hardware and software, so that it can perform all the methods described in the present disclosure.

By designing a pattern, sequence, density, code division multiplexing mode and the like of a physical signal supporting multiple antenna ports, the present disclosure enables the physical signal to be used for self-interference channel estimation of multiple antenna ports for a full-duplex device with unsynchronized transmission and reception timings.

Various embodiments of the present disclosure may be implemented as computer readable codes embodied on a computer readable recording medium from a specific perspective. The computer readable recording medium is any data storage device that can store data readable by a computer system. Examples of the computer-readable recording medium may include read only memory (ROM), random access memory (RAM), optical disk read only memory (CD-ROM), magnetic tape, floppy disk, optical data storage device, carrier (e.g., data transmission via the Internet), and the like. The computer readable recording medium may be distributed through computer systems connected via a network, and thus the computer readable codes may be stored and executed in a distributed manner. Moreover, functional programs, codes, and code segments for implementing various embodiments of the present disclosure may be easily interpreted by those skilled in the art to which the embodiments of the present disclosure are applied.

It will be understood that embodiments of the present disclosure may be implemented in hardware, software, or combination of hardware and software. The software may be stored as program instructions or computer readable codes executable on a processor on a non-transitory computer readable medium. Examples of the non-transitory computer readable recording medium include magnetic storage media (e.g., ROM, floppy disk, hard disk, etc.) and optical recording media (e.g., CD-ROM, digital video disk (DVD), etc.). The non-transitory computer readable recording medium may also be distributed across network-coupled computer systems such that the computer readable codes are stored and executed in a distributed manner. The medium may be read by a computer, stored in a memory, and executed by a processor. Various embodiments may be implemented by a computer or a portable terminal including a controller and a memory, and the memory may be an example of a non-transitory computer readable recording medium adapted to store a program(s) having instructions to implement embodiments of the present disclosure. The present disclosure may be implemented by a program having codes for implementing the apparatuses and methods described in the claims, which is stored in a machine (or computer) readable storage medium. The program may be electronically carried on any medium, such as a communication signal transmitted via a wired or wireless connection, and the present disclosure suitably includes equivalents thereof.

What has been described above is only specific implementation of the present disclosure, but the scope of protection of the present disclosure is not limited to this. Any skilled in the art can make various changes or substitutions within the technical scope of the present disclosure, and these changes or substitutions should be encompassed within the scope of protection of the present disclosure. Therefore, the scope of protection of the present disclosure should refer to the scope of protection of the claims.

What have been described above are merely exemplary embodiments of the invention, and are not intended to limit the scope of protection of the invention, which is determined by the appended claims.

The invention claimed is:

1. A method for self-interference cancellation, comprising:
   truncating a signal based on a detection window, wherein the signal comprises a receive signal and a self-interference signal which is associated with a transmit signal, and a length of the detection window is less than a symbol length;
   performing self-interference channel estimation to obtain an estimation of a self-interference channel, based on the truncated signal and a first reference signal which is carried by the transmit signal and used for the self-interference channel estimation, wherein the first reference signal has a comb structure in a frequency domain; and
   performing self-interference cancellation based on the transmit signal and the estimation of the self-interference channel.

2. The method according to claim 1, wherein the length of the detection window is ½ or ¼ of the symbol length.

3. The method according to claim 1, wherein a repetition factor of the comb structure of the first reference signal is an integer power of 2, wherein the repetition factor is a difference between indexes of two adjacent occupied subcarriers in the comb structure.

4. The method according to claim 1, wherein a symbol of the receive signal of which a time domain index is same as that of a symbol of the first reference signal is a muting symbol.

5. The method according to claim 1, wherein the truncating of the signal based on the detection window comprises determining a position of the detection window based on a timing of the receive signal, and truncating the signal based on the position of the detection window and the length of the detection window, and
   wherein the performing of the self-interference channel estimation based on the detected signal and the first reference signal comprises processing the first reference signal based on a timing advance to generate the processed first reference signal, and performing the self-interference cancellation based on the processed first reference signal and the detected signal.

6. The method according to claim 1, wherein a second reference signal in the receive signal at a time domain index corresponding to a time domain index of the first reference signal has the comb structure in the frequency domain, wherein the second reference signal is carried by the receive signal and used for channel estimation of the receive signal, and the comb structure of the first reference signal has a repetition factor same as the comb structure of the second reference signal.

7. The method according to claim 6, wherein:
   a root sequence for generating the first reference signal is same as a root sequence for generating the second reference signal, and a cyclic shift for generating the first reference signal is different from a cyclic shift for generating the second reference signal; and
   the cyclic shift for generating the first reference signal and the cyclic shift for generating the second reference signal are determined based on one or more of a timing advance, a cyclic prefix CP length and the symbol length.

8. The method according to claim 7, wherein the root sequence and the cyclic shift for generating the first reference signal and the root sequence and the cyclic shift for generating the second reference signal are configured according to one of:
   the root sequence and the cyclic shift for generating the first reference signal, and the root sequence and the cyclic shift for generating the second reference signal being configured respectively;
   the root sequence and the cyclic shift for generating the first reference signal being configured together with the root sequence and the cyclic shift for generating the second reference signal; or
   the root sequence and the cyclic shift for generating the first reference signal, and the root sequence and the cyclic shift for generating the second reference signal being configured based on a predefined rule.

9. The method according to claim 6, wherein an offset of the comb structure of the first reference signal is different from an offset of the comb structure of the second reference signal.

10. The method according to claim 9, wherein a difference between the offset of the comb structure of the first reference signal and the offset of the comb structure of the second reference signal is an even.

11. The method according to claim 10, wherein the repetition factor and the offset of the comb structure of the first reference signal and the repetition factor and the offset of the comb structure of the second reference signal are configured according to one of:
   the repetition factor and the offset of the comb structure of the first reference signal, and the repetition factor and the offset of the comb structure of the second reference signal being configured respectively; or
   the repetition factor and the offset of the comb structure of the first reference signal, and the repetition factor and the offset of the comb structure of the second reference signal being configured based on a predefined rule.

12. The method of claim 1, wherein the performing of the self-interference cancellation based on the transmit signal and the estimation of the self-interference channel comprises:
- reconstructing the self-interference signal based on the transmit signal and the estimation of the self-interference channel; and
- obtaining a signal after self-interference cancellation based on the reconstructed self-interference signal and the receive signal.

13. An apparatus for self-interference cancellation, comprising:
- a transceiver configured to transmit and receive signals; and
- a controller configured to:
- truncate a signal based on a detection window, wherein the signal comprises a receive signal and a self-interference signal which is associated with a transmit signal, and a length of the detection window is less than a symbol length,
- perform self-interference channel estimation to obtain an estimation of a self-interference channel, based on the truncated signal and a first reference signal which is carried by the transmit signal and used for self-interference channel estimation, wherein the first reference signal has a comb structure in a frequency domain, and
- perform self-interference cancellation based on the transmit signal and the estimation of the self-interference channel.

14. A terminal comprising:
- a transceiver configured to transmit and receive signals; and
- a controller configured to:
- truncate a signal based on a detection window, wherein the signal comprises a receive signal and a self-interference signal which is associated with a transmit signal, and a length of the detection window is less than a symbol length,
- perform self-interference channel estimation to obtain an estimation of a self-interference channel, based on the truncated signal and a first reference signal which is carried by the transmit signal and used for self-interference channel estimation, wherein the first reference signal has a comb structure in frequency domain, and
- perform self-interference cancellation based on the transmit signal and the estimation of the self-interference channel.

15. A base station, comprising:
- a transceiver configured to transmit and receive signals; and
- a controller configured to:
- truncate a signal based on a detection window, wherein the signal comprises a receive signal and a self-interference signal which is associated with a transmit signal, and a length of the detection window is less than a symbol length,
- perform self-interference channel estimation to obtain an estimation of a self-interference channel, based on the truncated signal and a first reference signal which is carried by the transmit signal and used for self-interference channel estimation, wherein the first reference signal has a comb structure in a frequency domain, and
- perform self-interference cancellation based on the transmit signal and the estimation of the self-interference channel.

16. The apparatus according to claim 13, wherein the length of the detection window is ½ or ¼ of the symbol length.

17. The apparatus according to claim 13, wherein a repetition factor of the comb structure of the first reference signal is an integer power of 2, wherein the repetition factor is a difference between indexes of two adjacent occupied subcarriers in the comb structure.

18. The apparatus according to claim 13, wherein a symbol of the receive signal of which a time domain index is same as that of a symbol of the first reference signal is a muting symbol.

19. The apparatus according to claim 13, wherein the controller is further configured to:
- determine a position of the detection window based on a timing of the receive signal, and truncating the signal based on the position of the detection window and the length of the detection window, and
- process the first reference signal based on a timing advance to generate the processed first reference signal, and performing the self-interference cancellation based on the processed first reference signal and the detected signal.

20. The apparatus according to claim 13, wherein a second reference signal in the receive signal at a time domain index corresponding to a time domain index of the first reference signal has the comb structure in the frequency domain, wherein the second reference signal is carried by the receive signal and used for channel estimation of the receive signal, and the comb structure of the first reference signal has a repetition factor same as the comb structure of the second reference signal.

* * * * *